US009836257B2

(12) United States Patent
Chang et al.

(10) Patent No.: US 9,836,257 B2
(45) Date of Patent: Dec. 5, 2017

(54) MOBILE INFORMATION APPARATUS THAT INCLUDES INTELLIGENT WIRELESS DISPLAY, WIRELESS DIRECT DISPLAY, OR TRANSFER OF DIGITAL CONTENT FOR PLAYING OVER AIR THE DIGITAL CONTENT AT SMART TELEVISIONS, TELEVISION CONTROLLERS, OR AUDIO OUTPUT DEVICES

(75) Inventors: William Ho Chang, Vancouver, WA (US); Christina Ying Liu, Vancouver, WA (US)

(73) Assignee: Flexiworld Technologies, Inc., Vancouver, WA (US)

( * ) Notice: Subject to any disclaimer, the term of this patent is extended or adjusted under 35 U.S.C. 154(b) by 2380 days.

(21) Appl. No.: 10/053,765

(22) Filed: Jan. 18, 2002

(65) Prior Publication Data
US 2002/0097433 A1 Jul. 25, 2002

Related U.S. Application Data

(60) Provisional application No. 60/262,764, filed on Jan. 19, 2001.

(51) Int. Cl.
*G06F 3/12* (2006.01)
*G06K 15/02* (2006.01)
(Continued)

(52) U.S. Cl.
CPC ............ *G06F 3/1236* (2013.01); *G06F 3/122* (2013.01); *G06F 3/1203* (2013.01);
(Continued)

(58) Field of Classification Search
None
See application file for complete search history.

(56) References Cited

U.S. PATENT DOCUMENTS 3,629,493 A * 12/1971 Morgenfruh ................. 358/3.07
3,833,297 A * 9/1974 Swartz ............................ 353/85
(Continued)

FOREIGN PATENT DOCUMENTS

CN 1217503 A 5/1999
CN 01821101.1 4/2004
(Continued)

OTHER PUBLICATIONS

Bettstedder, Christian "A Comparison of Service Discovery Protocols and Implementation of the Service Location", Technische Universitat Munchen (TUM), Sep. 13, 2000, D-80290, Munich Germany.
(Continued)

*Primary Examiner* — Marcus T Riley
(74) *Attorney, Agent, or Firm* — Kolisch Hartwell, P.C.

(57) ABSTRACT

A method of transferring digital content from a mobile wireless information apparatus such as a smart phone, an information Pad, or a digital Pad to a wireless output device associated with a television by short range wireless communication. The method may include downloading video digital content from the Internet to the mobile wireless information apparatus and may open a short range wireless communication that is compatible with IEEE802.11 or with Bluetooth™ standard for output. The method may select a wireless output device associated with the television. Subsequently, the information apparatus may conform the digital content into an output data for transferring the output data over the short range wireless connection to the selected wireless output device associated with the television for output.

40 Claims, 14 Drawing Sheets

(51) Int. Cl.

| | | |
|---|---|---|
| *G06Q 20/10* | (2012.01) | |
| *H04L 29/08* | (2006.01) | |
| *H04N 1/44* | (2006.01) | |
| *H04N 7/16* | (2011.01) | |
| *H04W 8/00* | (2009.01) | |
| *H04W 12/06* | (2009.01) | |
| *H04W 12/08* | (2009.01) | |
| *H04W 76/02* | (2009.01) | |
| *H04N 1/00* | (2006.01) | |
| *H04N 1/32* | (2006.01) | |
| *H04W 4/00* | (2009.01) | |
| *H04W 84/12* | (2009.01) | |

(52) U.S. Cl.
CPC ............ *G06F 3/1205* (2013.01); *G06F 3/128* (2013.01); *G06F 3/1226* (2013.01); *G06F 3/1228* (2013.01); *G06F 3/1229* (2013.01); *G06F 3/1238* (2013.01); *G06F 3/1245* (2013.01); *G06F 3/1247* (2013.01); *G06F 3/1253* (2013.01); *G06F 3/1258* (2013.01); *G06F 3/1284* (2013.01); *G06F 3/1285* (2013.01); *G06F 3/1286* (2013.01); *G06F 3/1288* (2013.01); *G06F 3/1292* (2013.01); *G06K 15/02* (2013.01); *G06K 15/181* (2013.01); *G06K 15/1836* (2013.01); *G06Q 20/10* (2013.01); *H04L 67/16* (2013.01); *H04L 67/303* (2013.01); *H04N 1/00244* (2013.01); *H04N 1/00283* (2013.01); *H04N 1/00411* (2013.01); *H04N 1/00854* (2013.01); *H04N 1/00938* (2013.01); *H04N 1/32534* (2013.01); *H04N 1/32582* (2013.01); *H04N 1/442* (2013.01); *H04N 1/4413* (2013.01); *H04N 7/16* (2013.01); *H04W 8/005* (2013.01); *H04W 12/06* (2013.01); *H04W 12/08* (2013.01); *H04W 76/02* (2013.01); *G06F 3/1208* (2013.01); *H04W 4/008* (2013.01); *H04W 84/12* (2013.01); *Y02B 60/1271* (2013.01)

(56) References Cited

U.S. PATENT DOCUMENTS

| | | | | |
|---|---|---|---|---|
| 3,848,856 | A | * | 11/1974 | Reeber et al. ............... 358/527 |
| 4,262,301 | A | * | 4/1981 | Erlichman .................. 386/224 |
| 4,266,863 | A | * | 5/1981 | Hollingsworth et al. .... 396/558 |
| 4,291,956 | A | * | 9/1981 | Vogelgesang ............... 396/556 |
| 4,291,957 | A | * | 9/1981 | Hollingsworth ............. 396/556 |
| 4,301,599 | A | * | 11/1981 | Leay ............................. 33/277 |
| 4,335,955 | A | * | 6/1982 | Lopata ........................ 399/158 |
| 4,340,905 | A | * | 7/1982 | Balding ....................... 358/506 |
| 4,360,264 | A | * | 11/1982 | Baker et al. .................. 355/40 |
| 4,417,792 | A | * | 11/1983 | Martin ........................ 353/120 |
| 4,428,001 | A | * | 1/1984 | Yamamura et al. .......... 386/278 |
| 4,431,282 | A | * | 2/1984 | Martin ........................ 353/120 |
| 4,435,059 | A | * | 3/1984 | Gerber ........................ 396/257 |
| 4,495,490 | A | * | 1/1985 | Hopper et al. ............... 345/469 |
| 4,539,585 | A | * | 9/1985 | Spackova et al. ........... 382/100 |
| 4,541,010 | A | * | 9/1985 | Alston ......................... 348/283 |
| 4,553,835 | A | * | 11/1985 | Morgan, Jr. .................. 355/77 |
| 4,580,880 | A | * | 4/1986 | Watson ........................ 359/855 |
| 4,602,280 | A | * | 7/1986 | Maloomian .................. 382/100 |
| 4,603,330 | A | * | 7/1986 | Horne et al. ................. 345/467 |
| 4,758,881 | A | * | 7/1988 | Laspada ...................... 348/560 |
| 4,956,665 | A | * | 9/1990 | Niles ............................ 355/50 |
| 4,958,220 | A | * | 9/1990 | Alessi et al. ................. 358/527 |
| 4,979,032 | A | * | 12/1990 | Alessi et al. ................. 358/527 |
| 5,048,057 | A | | 9/1991 | Saleh |
| 5,166,809 | A | | 11/1992 | Surbrook |
| 5,220,674 | A | | 6/1993 | Morgan et al. |
| 5,228,118 | A | | 7/1993 | Sasaki |
| 5,257,097 | A | * | 10/1993 | Pineau et al. ............... 358/500 |
| 5,270,773 | A | | 12/1993 | Sklut et al. |
| 5,287,194 | A | * | 2/1994 | Lobiondo .................... 358/296 |
| 5,303,342 | A | * | 4/1994 | Edge ........................... 358/1.1 |
| 5,319,711 | A | | 6/1994 | Servi |
| 5,337,258 | A | | 8/1994 | Dennis |
| 5,353,388 | A | | 10/1994 | Motoyama |
| 5,404,433 | A | | 4/1995 | Hosugai |
| 5,412,798 | A | | 5/1995 | Garney |
| 5,467,434 | A | | 11/1995 | Hower, Jr. et al. |
| 5,475,507 | A | | 12/1995 | Suzuki et al. |
| 5,479,206 | A | * | 12/1995 | Ueno et al. .................. 348/211.5 |
| 5,485,634 | A | | 1/1996 | Weiser et al. |
| 5,490,287 | A | * | 2/1996 | Itoh ...................... H04W 52/367 |
| | | | | 358/442 |
| 5,515,480 | A | * | 5/1996 | Frazier ............... G06K 15/1209 |
| | | | | 358/1.1 |
| 5,519,641 | A | | 5/1996 | Beers et al. |
| 5,524,185 | A | * | 6/1996 | Na ......................... G06F 3/1293 |
| | | | | 358/1.15 |
| 5,537,107 | A | | 7/1996 | Funado |
| 5,537,517 | A | | 7/1996 | Wakabayashi et al. |
| 5,564,109 | A | | 10/1996 | Snyder et al. |
| 5,566,278 | A | | 10/1996 | Patel et al. |
| 5,568,595 | A | * | 10/1996 | Yosefi et al. ................. 345/426 |
| 5,580,177 | A | | 12/1996 | Gase et al. |
| 5,596,697 | A | | 1/1997 | Foster et al. |
| 5,604,843 | A | | 2/1997 | Shaw et al. |
| 5,613,123 | A | | 3/1997 | Tsang et al. |
| 5,613,124 | A | | 3/1997 | Atkinson et al. |
| 5,619,257 | A | * | 4/1997 | Reele et al. ................... 348/64 |
| 5,619,649 | A | | 4/1997 | Kovnat et al. |
| 5,625,757 | A | | 4/1997 | Kageyama et al. |
| 5,636,211 | A | * | 6/1997 | Newlin ..................... H04L 29/06 |
| | | | | 370/465 |
| 5,644,662 | A | * | 7/1997 | Vuylsteke ................... 382/302 |
| 5,664,243 | A | * | 9/1997 | Okada et al. ................. 396/246 |
| 5,675,717 | A | * | 10/1997 | Yamamoto .................. 358/1.9 |
| 5,687,332 | A | | 11/1997 | Kurahashi |
| 5,699,495 | A | | 12/1997 | Snipp |
| 5,710,557 | A | | 1/1998 | Schuette |
| 5,717,742 | A | | 2/1998 | Hyde-Thomson |
| 5,724,106 | A | | 3/1998 | Autry et al. |
| 5,737,501 | A | | 4/1998 | Tsunekawa |
| 5,739,928 | A | * | 4/1998 | Scott ............................ 358/520 |
| 5,748,859 | A | | 5/1998 | Takayangi et al. |
| 5,754,655 | A | | 5/1998 | Hughes |
| 5,757,952 | A | * | 5/1998 | Buytaert et al. .............. 382/132 |
| 5,761,480 | A | | 6/1998 | Fukada et al. |
| 5,796,394 | A | | 8/1998 | Wicks et al. |
| 5,802,314 | A | * | 9/1998 | Tullis et al. .................. 709/246 |
| 5,822,230 | A | | 10/1998 | Kikinis |
| 5,826,244 | A | | 10/1998 | Huberman |
| 5,831,664 | A | | 11/1998 | Wharton |
| 5,832,191 | A | | 11/1998 | Thorne |
| 5,838,320 | A | * | 11/1998 | Matthews, III et al. ..... 715/786 |
| 5,838,926 | A | | 11/1998 | Yamagishi |
| 5,845,078 | A | | 12/1998 | Tezuka et al. |
| 5,852,721 | A | | 12/1998 | Dillon et al. |
| 5,859,970 | A | | 1/1999 | Pleso |
| 5,862,321 | A | | 1/1999 | Lamming et al. |
| 5,867,633 | A | | 2/1999 | Taylor, III et al. |
| 5,870,723 | A | | 2/1999 | Pare, Jr. et al. |
| 5,880,858 | A | * | 3/1999 | Jin ............................... 358/487 |
| 5,881,213 | A | | 3/1999 | Shaw et al. |
| 5,903,832 | A | | 5/1999 | Seppanen et al. |
| 5,907,831 | A | | 5/1999 | Lotvin et al. |
| 5,911,044 | A | | 6/1999 | Lo et al. |
| 5,916,309 | A | | 6/1999 | Brown et al. |
| 5,917,542 | A | | 6/1999 | Moghadam |
| 5,926,104 | A | | 7/1999 | Robinson et al. |
| 5,930,466 | A | | 7/1999 | Rademacher |
| 5,931,919 | A | | 8/1999 | Thomas et al. |
| 5,933,498 | A | | 8/1999 | Schneck et al. |
| 5,937,112 | A | * | 8/1999 | Herregods et al. ........... 382/319 |
| 5,940,843 | A | | 8/1999 | Zucknovich et al. |
| 5,946,031 | A | * | 8/1999 | Douglas ..................... 348/207.99 |
| 5,946,110 | A | * | 8/1999 | Hu et al. ...................... 358/474 |
| 5,953,546 | A | * | 9/1999 | Okada et al. ................. 396/272 |

(56) References Cited

U.S. PATENT DOCUMENTS

| | | |
|---|---|---|
| 5,960,162 A * | 9/1999 | Yamamoto .................... 358/1.9 |
| 5,968,176 A | 10/1999 | Nessett et al. |
| 5,974,401 A | 10/1999 | Enomoto et al. |
| 5,978,560 A | 11/1999 | Tan et al. |
| 5,983,200 A | 11/1999 | Slotznick |
| 5,987,454 A * | 11/1999 | Hobbs |
| 5,993,047 A | 11/1999 | Novogrod et al. |
| 6,006,265 A * | 12/1999 | Rangan et al. ................ 709/226 |
| 6,009,464 A | 12/1999 | Hamilton et al. |
| 6,020,973 A | 2/2000 | Levine et al. |
| 6,023,715 A | 2/2000 | Burkes et al. |
| 6,034,621 A | 3/2000 | Kaufman |
| 6,035,214 A * | 3/2000 | Henderson ................ 455/556.1 |
| 6,043,898 A | 3/2000 | Jacobs |
| 6,046,820 A | 4/2000 | Konishi |
| 6,061,142 A | 5/2000 | Shim |
| 6,069,707 A * | 5/2000 | Pekelman .................... 358/1.6 |
| 6,070,185 A | 5/2000 | Anupam et al. |
| 6,072,595 A * | 6/2000 | Yoshiura ............ H04N 1/00307 358/400 |
| 6,076,076 A | 6/2000 | Gottfreid |
| 6,076,109 A * | 6/2000 | Kikinis ........................ 709/228 |
| 6,078,906 A | 6/2000 | Huberman |
| 6,087,060 A * | 7/2000 | Chase et al. .................. 430/201 |
| 6,088,450 A * | 7/2000 | Davis et al. .................. 713/182 |
| 6,101,291 A * | 8/2000 | Arney et al. ................. 382/293 |
| 6,138,178 A | 10/2000 | Watanabe |
| 6,141,659 A | 10/2000 | Barker et al. |
| 6,144,997 A * | 11/2000 | Lamming et al. ............ 709/217 |
| 6,145,031 A | 11/2000 | Mastie et al. |
| 6,148,346 A | 11/2000 | Hanson |
| 6,167,514 A | 12/2000 | Matsui et al. |
| 6,173,407 B1 | 1/2001 | Yoon et al. |
| 6,184,996 B1 | 2/2001 | Gase |
| 6,189,148 B1 | 2/2001 | Clark et al. |
| 6,189,993 B1 | 2/2001 | Mantell |
| 6,192,407 B1 | 2/2001 | Smith et al. |
| 6,195,564 B1 * | 2/2001 | Rydbeck et al. .............. 455/557 |
| 6,199,099 B1 * | 3/2001 | Gershman et al. ............ 709/203 |
| 6,199,106 B1 | 3/2001 | Shaw et al. |
| 6,201,611 B1 | 3/2001 | Carter et al. |
| 6,205,495 B1 | 3/2001 | Gilbert et al. |
| 6,211,858 B1 * | 4/2001 | Moon et al. ................... 715/771 |
| 6,215,483 B1 | 4/2001 | Zigmond |
| 6,215,494 B1 * | 4/2001 | Teo ............................... 345/418 |
| 6,223,059 B1 * | 4/2001 | Haestrup ....................... 455/566 |
| 6,225,993 B1 | 5/2001 | Lindblad et al. |
| 6,226,098 B1 * | 5/2001 | Kulakowski et al. ........ 358/1.14 |
| 6,233,611 B1 | 5/2001 | Ludtke et al. |
| 6,236,971 B1 | 5/2001 | Stefik et al. |
| 6,246,486 B1 | 6/2001 | Takahashi |
| 6,252,964 B1 * | 6/2001 | Wasilewski et al. ......... 380/282 |
| 6,255,961 B1 * | 7/2001 | Van Ryzin ............ H04B 1/202 340/12.22 |
| 6,256,666 B1 | 7/2001 | Singhal |
| 6,263,503 B1 * | 7/2001 | Margulis ........................ 725/81 |
| 6,285,357 B1 | 9/2001 | Kushiro et al. |
| 6,285,889 B1 | 9/2001 | Nykanen et al. |
| 6,288,790 B1 | 9/2001 | Yellepeddy et al. |
| 6,292,283 B1 | 9/2001 | Grandbois |
| 6,324,521 B1 | 11/2001 | Shiota et al. |
| 6,330,611 B1 | 12/2001 | Itoh et al. |
| 6,360,252 B1 | 3/2002 | Rudy et al. |
| 6,363,149 B1 * | 3/2002 | Candelore ...................... 380/45 |
| 6,363,452 B1 | 3/2002 | Lach |
| 6,366,912 B1 | 4/2002 | Wallent et al. |
| 6,366,965 B1 | 4/2002 | Binford et al. |
| 6,369,909 B1 | 4/2002 | Shima |
| 6,379,058 B1 | 4/2002 | Petteruti et al. |
| 6,385,305 B1 | 5/2002 | Gersberg et al. |
| 6,389,010 B1 | 5/2002 | Kubler et al. |
| 6,396,598 B1 | 5/2002 | Kashiwagi et al. |
| 6,418,439 B1 | 7/2002 | Papierniak et al. |
| 6,421,716 B1 | 7/2002 | Eldridge et al. |
| 6,421,748 B1 | 7/2002 | Lin et al. |
| 6,430,599 B1 | 8/2002 | Baker et al. |
| 6,434,535 B1 * | 8/2002 | Kupka et al. .................... 705/24 |
| 6,437,786 B1 | 8/2002 | Yasukawa |
| 6,442,375 B1 | 8/2002 | Parmentier |
| 6,449,052 B1 | 9/2002 | Sherer et al. |
| 6,452,692 B1 | 9/2002 | Yacoub |
| 6,453,127 B2 | 9/2002 | Wood et al. |
| 6,467,688 B1 * | 10/2002 | Goldman et al. ......... 235/472.01 |
| 6,473,070 B2 * | 10/2002 | Mishra et al. ................ 345/158 |
| 6,473,800 B1 | 10/2002 | Jerger et al. |
| 6,477,575 B1 | 11/2002 | Koeppel et al. |
| 6,480,292 B1 | 11/2002 | Sugiyama |
| 6,487,587 B1 | 11/2002 | Dubey |
| 6,487,599 B1 | 11/2002 | Smith et al. |
| 6,489,934 B1 * | 12/2002 | Klausner ........................ 345/1.1 |
| 6,493,104 B1 | 12/2002 | Cromer et al. |
| 6,496,855 B1 | 12/2002 | Hunt et al. |
| 6,510,235 B1 | 1/2003 | Shin et al. |
| 6,510,515 B1 | 1/2003 | Raith |
| 6,515,988 B1 | 2/2003 | Eldridge et al. |
| 6,526,129 B1 | 2/2003 | Beaton et al. |
| 6,529,522 B1 | 3/2003 | Ito et al. |
| 6,540,722 B1 | 4/2003 | Boyle et al. |
| 6,542,173 B1 * | 4/2003 | Buckley ........................ 715/841 |
| 6,542,491 B1 * | 4/2003 | Tari ................... H04L 29/12311 370/338 |
| 6,545,722 B1 * | 4/2003 | Schultheiss et al. ......... 348/552 |
| 6,546,387 B1 | 4/2003 | Triggs |
| 6,546,419 B1 | 4/2003 | Humpleman et al. |
| 6,553,240 B1 | 4/2003 | Dervarics |
| 6,553,431 B1 | 4/2003 | Yamamoto et al. |
| 6,556,313 B1 * | 4/2003 | Chang et al. .................. 358/1.9 |
| 6,577,861 B2 * | 6/2003 | Ogasawara .......... G06Q 20/108 370/352 |
| 6,578,072 B2 | 6/2003 | Watanabe et al. |
| 6,584,903 B2 | 7/2003 | Jacobs |
| 6,587,835 B1 * | 7/2003 | Treyz .................... G06Q 20/12 705/14.64 |
| 6,600,569 B1 | 7/2003 | Osada et al. |
| 6,601,108 B1 | 7/2003 | Marmor |
| 6,604,135 B1 | 8/2003 | Rogers et al. |
| 6,604,148 B1 | 8/2003 | Dennison |
| 6,607,314 B1 | 8/2003 | McCannon et al. |
| 6,608,928 B1 | 8/2003 | Queiroz |
| 6,618,039 B1 | 9/2003 | Grant et al. |
| 6,621,589 B1 | 9/2003 | Al-Kazily et al. |
| 6,622,015 B1 | 9/2003 | Himmel et al. |
| 6,623,527 B1 | 9/2003 | Hamzy |
| 6,628,302 B2 | 9/2003 | White et al. |
| 6,628,417 B1 | 9/2003 | Naito et al. |
| 6,633,346 B1 * | 10/2003 | Yamamoto .................... 348/744 |
| 6,633,395 B1 | 10/2003 | Tuchitoi et al. |
| 6,643,650 B1 | 11/2003 | Slaughter et al. |
| 6,654,135 B1 | 11/2003 | Mintani |
| 6,658,625 B1 | 12/2003 | Allen |
| 6,670,982 B2 | 12/2003 | Clough et al. |
| 6,671,068 B1 * | 12/2003 | Chang et al. ................... 358/1.9 |
| 6,678,004 B1 | 1/2004 | Schultheiss et al. |
| 6,678,751 B1 | 1/2004 | Hays et al. |
| 6,690,918 B2 * | 2/2004 | Evans ....................... H04W 8/18 379/201.02 |
| 6,694,371 B1 | 2/2004 | Sanai |
| 6,697,848 B2 | 2/2004 | Hamilton et al. |
| 6,701,009 B1 | 3/2004 | Makoto et al. |
| 6,705,781 B2 * | 3/2004 | Iwazaki ............................ 400/62 |
| 6,707,581 B1 | 3/2004 | Browning |
| 6,711,677 B1 * | 3/2004 | Wiegley ......................... 713/151 |
| 6,725,281 B1 | 4/2004 | Zintel et al. |
| 6,735,616 B1 | 5/2004 | Thompson et al. |
| 6,738,841 B1 | 5/2004 | Wolff |
| 6,741,871 B1 | 5/2004 | Siverbrook et al. |
| 6,745,229 B1 | 6/2004 | Gobin et al. |
| 6,748,195 B1 * | 6/2004 | Phillips .......................... 455/41.2 |
| 6,750,978 B1 | 6/2004 | Maarggraff et al. |
| 6,751,732 B2 | 6/2004 | Strobel et al. |
| 6,753,978 B1 | 6/2004 | Chang |
| 6,757,070 B1 | 6/2004 | Lin et al. |
| 6,760,745 B1 | 7/2004 | Tan et al. |
| 6,775,407 B1 | 8/2004 | Gindele et al. |

(56) References Cited

U.S. PATENT DOCUMENTS

| | | |
|---|---|---|
| 6,778,289 B1 | 8/2004 | Iwata |
| 6,785,727 B1 | 8/2004 | Yamazaki |
| 6,788,332 B1 | 9/2004 | Cook |
| 6,788,428 B1 | 9/2004 | Shimokawa |
| 6,789,228 B1 | 9/2004 | Merril et al. |
| 6,798,530 B1* | 9/2004 | Buckley ............... G06F 3/1204 358/1.1 |
| 6,801,692 B2 | 10/2004 | Nishimura et al. |
| 6,801,962 B2* | 10/2004 | Taniguchi ............ H04L 12/583 345/1.1 |
| 6,813,039 B1* | 11/2004 | Silverbrook et al. ........ 358/1.18 |
| 6,816,724 B1* | 11/2004 | Asikainen ............. G06Q 20/04 348/E5.002 |
| 6,819,919 B1* | 11/2004 | Tanaka ................. G06Q 10/10 342/357.31 |
| 6,826,632 B1 | 11/2004 | Wugofski |
| 6,839,775 B1 | 1/2005 | Kao et al. |
| 6,840,441 B2 | 1/2005 | Monaghan et al. |
| 6,856,430 B1* | 2/2005 | Gase ............................ 358/1.9 |
| 6,857,716 B1 | 2/2005 | Nagahashi |
| 6,859,197 B2 | 2/2005 | Klein et al. |
| 6,859,228 B1 | 2/2005 | Chang et al. |
| 6,859,937 B1 | 2/2005 | Narayan et al. |
| 6,889,385 B1 | 5/2005 | Rakib et al. |
| 6,892,251 B2 | 5/2005 | Anderson et al. |
| 6,895,444 B1 | 5/2005 | Weisshaar et al. |
| 6,915,124 B1* | 7/2005 | Kiessling et al. ............ 455/411 |
| 6,922,258 B2 | 7/2005 | Pineau |
| 6,941,014 B2 | 9/2005 | Lin et al. |
| 6,947,067 B2* | 9/2005 | Halttunen ............... H04L 29/06 348/14.02 |
| 6,947,995 B2 | 9/2005 | Chang et al. |
| 6,952,414 B1 | 10/2005 | Willig |
| 6,957,194 B2 | 10/2005 | Steflk et al. |
| 6,958,821 B1* | 10/2005 | McIntyre ..................... 358/1.12 |
| 6,980,319 B2 | 12/2005 | Ohta |
| 6,983,310 B2* | 1/2006 | Rouse .................. H04M 3/493 707/999.003 |
| 6,990,548 B1 | 1/2006 | Kaylor |
| 6,996,555 B2 | 2/2006 | Muto et al. |
| 7,016,062 B2* | 3/2006 | Ishizuka ............. G06Q 30/0613 358/1.15 |
| 7,024,200 B2* | 4/2006 | McKenna ................ H04W 4/08 455/445 |
| 7,028,102 B1 | 4/2006 | Larsson et al. |
| 7,039,445 B1* | 5/2006 | Yoshizawa .......... H04M 1/7253 343/754 |
| 7,058,356 B2 | 6/2006 | Slotznick |
| 7,076,534 B1 | 7/2006 | Cleron et al. |
| 7,088,691 B2 | 8/2006 | Fujita |
| 7,099,304 B2 | 8/2006 | Liu et al. |
| 7,133,845 B1 | 11/2006 | Ginter et al. |
| 7,133,846 B1 | 11/2006 | Ginter et al. |
| 7,143,356 B1 | 11/2006 | Shafrir et al. |
| 7,149,726 B1 | 12/2006 | Lingle et al. |
| 7,155,163 B2* | 12/2006 | Cannon et al. .............. 455/41.2 |
| 7,164,885 B2 | 1/2007 | Jonsson et al. |
| 7,180,614 B1 | 2/2007 | Senoo et al. |
| 7,197,531 B2* | 3/2007 | Anderson .......... H04N 1/00148 348/207.1 |
| 7,237,253 B1 | 6/2007 | Blackketter et al. |
| 7,239,346 B1 | 7/2007 | Priddy |
| 7,263,270 B1 | 8/2007 | Lapstun et al. |
| 7,272,788 B2* | 9/2007 | Anderson et al. ............ 715/210 |
| 7,318,086 B2 | 1/2008 | Chang et al. |
| 7,346,374 B2 | 3/2008 | Witkowski et al. |
| 7,348,961 B1 | 3/2008 | Shneidman |
| 7,359,714 B2 | 4/2008 | Parupudi et al. |
| 7,360,230 B1 | 4/2008 | Paz et al. |
| 7,366,468 B2* | 4/2008 | Yoshida ............... 455/41.3 |
| 7,370,090 B2 | 5/2008 | Nakaoka et al. |
| 7,403,510 B1* | 7/2008 | Miyake ............... H04M 1/7253 370/338 |
| 7,454,796 B2* | 11/2008 | Mazzagatte et al. ............ 726/28 |
| 7,460,853 B2 | 12/2008 | Toyoshima |
| 7,477,890 B1 | 1/2009 | Narayanaswami |
| 7,478,403 B1* | 1/2009 | Allavarpu et al. ............ 719/316 |
| 7,554,684 B1* | 6/2009 | Senoo et al. ................. 358/1.15 |
| 7,593,123 B2 | 9/2009 | Sugahara |
| 7,609,402 B2 | 10/2009 | Chang et al. |
| 7,660,460 B2* | 2/2010 | Wu et al. ..................... 382/162 |
| 7,743,133 B1* | 6/2010 | Motoyama et al. .......... 709/224 |
| RE41,416 E | 7/2010 | Liu et al. |
| RE41,487 E | 8/2010 | Liu et al. |
| RE41,532 E | 8/2010 | Liu et al. |
| RE41,689 E | 9/2010 | Liu et al. |
| 7,805,720 B2 | 9/2010 | Chang et al. |
| RE41,882 E | 10/2010 | Liu et al. |
| 7,908,401 B2 | 3/2011 | Chang et al. |
| 7,929,950 B1 | 4/2011 | Rao et al. |
| 7,941,541 B2 | 5/2011 | Chang et al. |
| 7,944,577 B2 | 5/2011 | Chang et al. |
| 7,949,223 B2 | 5/2011 | Shiohara |
| 7,953,818 B2 | 5/2011 | Chang et al. |
| 7,986,298 B1* | 7/2011 | Dulaney et al. .............. 345/156 |
| RE42,725 E | 9/2011 | Chang et al. |
| RE42,828 E | 10/2011 | Liu et al. |
| 8,086,961 B2* | 12/2011 | Saeki et al. .................... 715/274 |
| RE43,181 E | 2/2012 | Liu et al. |
| 8,169,649 B2 | 5/2012 | Chang et al. |
| 8,184,324 B2 | 5/2012 | Chang et al. |
| 8,285,802 B2* | 10/2012 | Chang ................. H04L 12/2805 358/1.15 |
| 8,296,757 B2 | 10/2012 | Chang |
| 8,332,521 B2 | 12/2012 | Chang et al. |
| 8,533,352 B2 | 9/2013 | Chang |
| 8,595,717 B2 | 11/2013 | Chang et al. |
| 8,630,000 B2 | 1/2014 | Chang et al. |
| 8,705,097 B2 | 4/2014 | Chang et al. |
| 8,711,408 B2 | 4/2014 | Chang et al. |
| 8,964,220 B2 | 2/2015 | Chang et al. |
| 8,972,610 B2 | 3/2015 | Chang |
| 8,989,064 B2* | 3/2015 | Chang ................. G06F 3/1245 358/1.1 |
| 9,015,329 B2 | 4/2015 | Chang et al. |
| 9,036,181 B2 | 5/2015 | Chang et al. |
| 9,037,088 B2 | 5/2015 | Chang et al. |
| 9,042,811 B2 | 5/2015 | Chang et al. |
| 9,043,482 B2 | 5/2015 | Chang |
| 9,069,510 B2 | 6/2015 | Chang et al. |
| 9,092,177 B2 | 7/2015 | Chang et al. |
| 9,110,622 B2 | 8/2015 | Chang et al. |
| 9,164,718 B2 | 10/2015 | Chang et al. |
| 9,298,407 B2 | 3/2016 | Chang et al. |
| 9,383,956 B2 | 7/2016 | Chang et al. |
| 9,389,822 B2 | 7/2016 | Chang et al. |
| 2001/0011302 A1 | 8/2001 | Son |
| 2001/0012281 A1 | 8/2001 | Hall et al. |
| 2001/0015717 A1* | 8/2001 | Mishra et al. ................. 345/156 |
| 2001/0029531 A1 | 10/2001 | Ohta |
| 2001/0032254 A1 | 10/2001 | Hawkins |
| 2001/0034222 A1 | 10/2001 | Roustaei et al. |
| 2001/0055951 A1 | 12/2001 | Slotznick |
| 2002/0012329 A1 | 1/2002 | Atkinson et al. |
| 2002/0017827 A1 | 2/2002 | Zuppero et al. |
| 2002/0026492 A1 | 2/2002 | Fujita |
| 2002/0038612 A1 | 4/2002 | Iwazaki |
| 2002/0042263 A1 | 4/2002 | Ishikawa |
| 2002/0049839 A1 | 4/2002 | Miida et al. |
| 2002/0057452 A1 | 5/2002 | Yoshino |
| 2002/0059489 A1 | 5/2002 | Davis et al. |
| 2002/0062398 A1 | 5/2002 | Chang et al. |
| 2002/0062406 A1 | 5/2002 | Chang et al. |
| 2002/0065873 A1* | 5/2002 | Ishizuka ............. G06Q 30/0613 709/203 |
| 2002/0077980 A1 | 6/2002 | Chang |
| 2002/0078101 A1 | 6/2002 | Chang et al. |
| 2002/0081993 A1 | 6/2002 | Toyoshima |
| 2002/0087622 A1* | 7/2002 | Anderson .......... H04N 1/00148 709/203 |
| 2002/0090912 A1* | 7/2002 | Cannon et al. ................. 455/41 |
| 2002/0092029 A1 | 7/2002 | Smith |
| 2002/0097408 A1 | 7/2002 | Chang et al. |

(56) References Cited

U.S. PATENT DOCUMENTS

| | | |
|---|---|---|
| 2002/0097415 A1 | 7/2002 | Chang et al. |
| 2002/0097416 A1 | 7/2002 | Chang et al. |
| 2002/0097417 A1 | 7/2002 | Chang et al. |
| 2002/0097418 A1 | 7/2002 | Chang et al. |
| 2002/0097419 A1 | 7/2002 | Chang et al. |
| 2002/0097433 A1* | 7/2002 | Chang .............. G06F 3/1245 358/1.15 |
| 2002/0099884 A1 | 7/2002 | Chang et al. |
| 2002/0178272 A1 | 11/2002 | Igarashi et al. |
| 2002/0194302 A1 | 12/2002 | Blumberg |
| 2003/0002072 A1 | 1/2003 | Berkema et al. |
| 2003/0013483 A1 | 1/2003 | Ausems et al. |
| 2003/0013484 A1 | 1/2003 | Nishimura et al. |
| 2003/0061606 A1* | 3/2003 | Hartwig ............ H04B 1/20 725/25 |
| 2003/0120754 A1 | 6/2003 | Muto et al. |
| 2003/0122934 A1 | 7/2003 | Shiohara |
| 2003/0128272 A1 | 7/2003 | Clough |
| 2003/0160993 A1 | 8/2003 | Kang |
| 2004/0057075 A1 | 3/2004 | Stewart et al. |
| 2005/0125664 A1 | 6/2005 | Berkema et al. |
| 2005/0204176 A1 | 9/2005 | Togawa |
| 2005/0210120 A1 | 9/2005 | Yukie et al. |
| 2005/0222963 A1 | 10/2005 | Johnson |
| 2007/0125860 A1 | 6/2007 | Lapstun et al. |
| 2007/0129109 A1 | 6/2007 | Silverbrook et al. |
| 2007/0133073 A1* | 6/2007 | Shida et al. ............ 358/527 |
| 2008/0007482 A1* | 1/2008 | Morioka ............... 345/1.1 |
| 2008/0049253 A1* | 2/2008 | Chang et al. ........... 358/1.15 |
| 2008/0049651 A1 | 2/2008 | Chang |
| 2008/0201236 A1 | 8/2008 | Field et al. |
| 2008/0218776 A1* | 9/2008 | Takami et al. .......... 358/1.6 |
| 2008/0318602 A1 | 12/2008 | Chang et al. |
| 2009/0002760 A1 | 1/2009 | Chang et al. |
| 2009/0070411 A1 | 3/2009 | Chang et al. |
| 2009/0094457 A1 | 4/2009 | Lapstun et al. |
| 2009/0180142 A1 | 7/2009 | Suzuki et al. |
| 2009/0290182 A1* | 11/2009 | Hashimoto et al. ........ 358/1.9 |
| 2010/0039660 A1* | 2/2010 | Chang et al. .......... 358/1.14 |
| 2010/0039669 A1* | 2/2010 | Chang et al. .......... 358/1.15 |
| 2010/0201996 A1* | 8/2010 | Chang et al. ............ 358/1.2 |
| 2010/0203824 A1* | 8/2010 | Chang et al. ........... 455/3.06 |
| 2010/0227550 A1* | 9/2010 | Chang et al. ............ 455/39 |
| 2011/0016280 A1 | 1/2011 | Chang et al. |
| 2011/0034150 A1 | 2/2011 | Chang et al. |
| 2011/0035682 A1 | 2/2011 | Chang et al. |
| 2011/0138378 A1 | 6/2011 | Chang et al. |
| 2011/0167166 A1 | 7/2011 | Chang |
| 2011/0167175 A1 | 7/2011 | Chang |
| 2011/0197159 A1 | 8/2011 | Chaganti et al. |
| 2011/0211226 A1 | 9/2011 | Chang et al. |
| 2011/0279829 A1 | 11/2011 | Chang et al. |
| 2011/0279863 A1 | 11/2011 | Chang et al. |
| 2012/0226777 A1 | 9/2012 | Shanahan |
| 2012/0230315 A1 | 9/2012 | Chang et al. |
| 2012/0258700 A1 | 10/2012 | Chang et al. |
| 2013/0095887 A1 | 4/2013 | Chang et al. |
| 2013/0103775 A1 | 4/2013 | Chang et al. |
| 2013/0104052 A1 | 4/2013 | Chang et al. |
| 2013/0109353 A1 | 5/2013 | Chang et al. |
| 2014/0018130 A1 | 1/2014 | Chang |
| 2014/0082604 A1 | 3/2014 | Chang et al. |
| 2015/0356561 A1 | 12/2015 | Chang et al. |
| 2015/0356564 A1 | 12/2015 | Chang et al. |
| 2015/0356565 A1 | 12/2015 | Chang et al. |
| 2015/0363763 A1 | 12/2015 | Chang et al. |
| 2015/0381612 A1 | 12/2015 | Chang et al. |
| 2016/0011836 A1 | 1/2016 | Chang et al. |
| 2016/0174068 A1 | 6/2016 | Chang et al. |
| 2016/0239232 A1 | 8/2016 | Chang et al. |
| 2016/0239243 A1 | 8/2016 | Chang et al. |
| 2017/0039009 A1 | 2/2017 | Chang et al. |
| 2017/0064746 A1 | 3/2017 | Chang et al. |
| 2017/0075636 A1 | 3/2017 | Chang et al. |
| 2017/0078521 A1 | 3/2017 | Chang et al. |
| 2017/0185376 A1 | 6/2017 | Chang et al. |
| 2017/0228202 A1 | 8/2017 | Chang et al. |
| 2017/0249116 A1 | 8/2017 | Chang et al. |

FOREIGN PATENT DOCUMENTS

| | | |
|---|---|---|
| CN | 02806907 | 10/2004 |
| CN | 100334577 | 8/2007 |
| CN | 20101044809.3 | 9/2010 |
| CN | 201010144167.7 | 9/2010 |
| CN | 201010444174 | 9/2010 |
| EP | 0691619 A2 | 10/1996 |
| EP | 0738949 A1 | 10/1996 |
| EP | 0738979 | 10/1996 |
| EP | 0952513 A1 | 10/1999 |
| GB | 2332764 | 6/1999 |
| JP | 11316658 | 11/1999 |
| WO | 200195096 | 12/2001 |
| WO | 200195097 | 12/2001 |
| WO | 02/84928 | 10/2002 |

OTHER PUBLICATIONS

U.S Patent and Trademark Office, Notice of Allowance and Fee(s) Due for U.S. Appl. No. 10/053,651, dated Jun. 15, 2009, 11 pages.

U.S Patent and Trademark Office, Notice of Allowance and Fee(s) Due for U.S. Appl. No. 12/606,178, dated Sep. 7, 2011, 15 pages.

U.S Patent and Trademark Office, Notice of Allowance and Fee(s) Due for U.S. Appl. No. 12/581,868, dated Jan. 20, 2012, 35 pages.

U.S Patent and Trademark Office, Notice of Allowance and Fee(s) Due for U.S. Appl. No. 11/933,031, dated May 9, 2012, 60 pages.

U.S Patent and Trademark Office, Notice of Allowance and Fee(s) Due for U.S. Appl. No. 12/907,865, dated Jun. 11, 2012, 37 pages.

U.S Patent and Trademark Office, Notice of Allowance and Fee(s) Due for U.S. Appl. No. 12/903,048, dated Jul. 17, 2012, 43 pages.

USPTO; Office Action, U.S. Appl. No. 10/053,654; dated Nov. 29, 2005; 23 pages.

USPTO; Office Action, U.S. Appl. No. 10/053,654; dated Sep. 8, 2006; 26 pages.

USPTO; Office Action, U.S. Appl. No. 11/929,445; dated Nov. 21, 2012; 21 pages.

USPTO; Office Action, U.S. Appl. No. 11/929,445; dated Apr. 25, 2012; 17 pages.

USPTO; Office Action, U.S. Appl. No. 11/929,445; dated Feb. 15, 2011; 12 pages.

USPTO; Office Action, U.S. Appl. No. 11/929,445; dated Jul. 20, 2010; 14 pages.

USPTO; Office Action, U.S. Appl. No. 11/929,445; dated Dec. 24, 2009; 14 pages.

USPTO; Office Action, U.S. Appl. No. 12/783,504; dated Nov. 21, 2012; 25 pages.

USPTO; Office Action, U.S. Appl. No. 12/783,504; dated Apr. 15, 2011; 17 pages.

USPTO; Office Action, U.S. Appl. No. 12/783,504; dated Oct. 4, 2010; 14 pages.

USPTO; Office Action, U.S. Appl. No. 12/581,868; dated Dec. 20, 2010; 16 pages.

USPTO; Office Action, U.S. Appl. No. 12,606,178; dated Jan. 20, 2011; 19 pages.

USPTO; Notice of Allowance, U.S. Appl. No. 12/903,048; dated Jul. 17, 2012; 11 pages.

USPTO; Office Action, U.S. Appl. No. 13/108,922; dated Nov. 5, 2012; 46 pages.

USPTO; Office Action, U.S. Appl. No. 13/103,958; dated Nov. 16, 2012; 6 pages.

House, C and Quon, D; "An on-line communication print service for the demanding client"; Proceedings of the 11th Annual International Conference on Systems Documentation (Waterloo, Ontario, Canada); Oct. 5-8, 1993; SIGDOC '93 ACM, New York NY; pp. 135-139.

Bisdikian, C, et al; "WISAP: A Wireless Personal Access Network for Handheld Computing Devices"; Personal Communications, IEEE [see also IEEE Wireless Communications], vol. 5 No. 6; Dec. 1998; pp. 18-25.

(56) References Cited

OTHER PUBLICATIONS

European Patent Office, Examination Report for EP Application No. 01985549.3, dated Oct. 26, 2010, 4 pages.
Haynie, Dave, The Zorro III Bus Specification, Mar. 20, 1991, 60 pages, Document Revision 1.10, Commodore-Amiga Inc.
Miller, "Mapping Salutation Architecture APIs to Bluetooth Service Discovery Layer," Jul. 1, 1999, Version 1.0.
Schulyer et al, Solutions to Sharing Local Printers: LAN Systems Inc., LANSpool, $395 per Server PC Week 1989, vol. 6, No. 39, pp. 75(2), see entire document.
Screenshots from Microsoft® NT™, Figures 5-7, 1998, 3 pages.
Screenshots from Microsoft® Word 2000, Figures 1-4, 1999, 4 pages.
State Intellectual Property Office of China; Office Action for CN028069072; dated Jul. 3, 2009; 5 pages including English-language summary.
State Intellectual Property Office of China; First Office Action for CN1217503 (publication No. 20100144809.3); dated Nov. 30, 2010; 18 pages including English-language summary and claims.
State Intellectual Property Office of China; Decision to Grant for CN1217503 (publication No. 201010144809.3); dated Jan. 12, 2012; 3 pages including English-language summary.
State Intellectual Property Office of China; First Office Action for CN20100144174.7; dated Feb. 23, 2011; 8 pages including English-language summary.
State Intellectual Property Office of China; Second Office Action for CN20100144174.7; dated Apr. 5, 2012; 6 pages including English-language summary.
State Intellectual Property Office of China; Third Office Action for CN20100144174.7; dated Nov. 5, 2012; 9 pages including English-language summary and claims.
State Intellectual Property Office of China; First Office Action for CN20100144167.7; dated Apr. 13, 2011; 22 pages including English-language summary and claims.
State Intellectual Property Office of China; Second Office Action for CN20100144167.7; dated May 3, 2012; 10 pages including English-language summary.
U.S. Patent and Trademark Office, Notice of Allowance and Fee(s) Due for U.S. Appl. No. 10/053,651, dated Jun. 15, 2009, 11 pages.
USPTO; "Notice of Allowance" for U.S. Appl. No. 10/016,223; dated Dec. 29, 2010; 28 pages.
USPTO, Notice of Allowance regarding U.S. Appl. No. 11/933,005, dated Jan. 12, 2011, 19 pages.
USPTO, Notice of Allowance regarding U.S. Appl. No. 09/992,183, dated Jan. 25, 2011, 34 pages.
USPTO; "Notice of Allowance" for U.S. 12/907,865; dated Mar. 18, 2011; 22 pages.
USPTO, Office Action regarding U.S. Appl. No. 09/992,413, dated Sep. 14, 2011, 29 pages.
USPTO, Office Action regarding U.S. Appl. No. 12/204,695, dated Sep. 15, 2011, 29 pages.
USPTO; Office Action, U.S. Appl. No. 12/783,504; dated Mar. 30, 2012; 17 pages.
USPTO; Office Action, U.S. Appl. No. 12/764,015; dated Apr. 24, 2012; 17 pages.
USPTO; Office Action, U.S. Appl. No. 12/764,032; dated Apr. 25, 2012; 18 pages.
USPTO; Office Action, U.S. Appl. No. 12/764,032; dated Nov. 21, 2012; 22 pages.
USPTO; Office Action, U.S. Appl. No. 12/783,504; dated Nov. 21, 2012; 17 pages.
USPTO; Office Action, U.S. Appl. No. 12/764,015; dated Dec. 18, 2012; 22 pages.
U.S. Receiving Office, International Search Report regarding International Application No. PCT/US01/43796, Mar. 20, 2002, 3 pages.
U.S. Receiving Office, International Preliminary Examination Report regarding International Application No. PCT/US01/43796, Jan. 15, 2003, 5 pages.
World Intellectual Property Organization (King Y. Poon, authorized officer); "International Search Report" for application No. PCT/US2001/48057 (publication No. WO 2002/041118); dated Jan. 6, 2003; 3 pages. The '057 and '223 applications both claim priority to U.S. Appl. No. 60/245,101.
The (King Y. Poon, authorized officer); "Corrected International Preliminary Examination Report" for application No. PCT/US2001/48057 (publication No. WO 2002/041118); dated Aug. 24, 2004; 11 pages. The '247 and '223 applications both claim priority to U.S. Appl. No. 60/245,101.
WIPO (Tod Kupstas, authorized officer); "International Search Report" for application No. PCT/US01/46247 (publication No. WO 2002/046867) dated Jun. 7, 2002; 4 pages. The '247 and '233 applications both claim priority to U.S. Appl. No. 60/245,101.
WIPO (Glenton Burgess, authorized officer); "International Search Report" for application No. PCT/US01/46247 (publication No. WO 2002/046867); dated Jul. 24, 2002; 3 pages. The '247 and '223 applications both claim priority to U.S. Appl. No. 60/245,101.
U.S. Patent and Trademark Office; Notice of Allowance regarding U.S. Appl. No. 11/929,501; dated Apr. 12, 2013; 38 pages.
U.S. Patent and Trademark Office; Office Action regarding U.S. Appl. No. 12/783,504; dated Jul. 8, 2013; 39 pages.
U.S. Patent and Trademark Office, Office action regarding U.S. Appl. No. 11/929,501, dated Dec. 24, 2009, 36 pages.
U.S. Patent and Trademark Office, Office action regarding U.S. Appl. No. 11/929,501, dated Aug. 18, 2010, 30 pages.
U.S. Patent and Trademark Office, Office action regarding U.S. Appl. No. 12/764,015, dated Nov. 12, 2010, 30 pages.
U.S. Patent and Trademark Office, Office action regarding U.S. Appl. No. 12/764,032, dated Dec. 9, 2010, 28 pages.
U.S. Patent and Trademark Office, Office action regarding U.S. Appl. No. 11/929,501, dated Feb. 17, 2011, 26 pages.
U.S. Patent and Trademark Office, Office action regarding U.S. Appl. No. 12/764,032, dated Jun. 27, 2011, 28 pages.
U.S. Patent and Trademark Office, Office action regarding U.S. Appl. No. 12/764,015, dated Jul. 12, 2011, 31 pages.
U.S. Patent and Trademark Office, Office action regarding U.S. Appl. No. 11/929,501, dated Jun. 13, 2012, 46 pages.
U.S. Patent and Trademark Office, Notice of Allowance regarding U.S. Appl. No. 11/929,501, dated Apr. 12, 2013, 51 pages.
U.S. Patent and Trademark Office, Office action regarding U.S. Appl. No. 12/764,015, dated Aug. 23, 2013, 49 pages.
U.S. Patent and Trademark Office, Office action regarding U.S. Appl. No. 11/929,445, dated Sep. 23, 2013, 34 pages.
U.S. Patent and Trademark Office, Office action regarding U.S. Appl. No. 12/764,032, dated Oct. 1, 2013, 60 pages.
U.S. Patent and Trademark Office, Office Action for U.S. Appl. No. 13/476,947, dated Dec. 23, 2013, 20 pages.
State Intellectual Property Office, Office Action for Chinese Application No. 201010144167.7, dated Feb. 4, 2013, 7 pages.
State Intellectual Property Office, Office Action for Chinese Application No. 201010144174.7, dated Jul. 24, 2013, 5 pages.
U.S. Patent and Trademark Office, Office Action for U.S. Appl. No. 11/929,445, dated Feb.11, 2014, 31 pages.
U.S. Patent and Trademark Office, Office Action for U.S. Appl. No. 12/783,504, dated Mar. 6, 2014, 29 pages.
U.S. Patent and Trademark Office, Office Action for U.S. Appl. No. 10/053,651, dated Aug. 23, 2006, 5 pages.
U.S. Patent and Trademark Office, Notice of Allowance for U.S. Appl. No. 10/053,651, dated Dec. 8, 2008, 11 pages.
U.S. Patent and Trademark Office, Notice of Allowance for U.S. Appl. No. 10/053,651, dated Mar. 10, 2009, 20 pages.
U.S. Patent and Trademark Office, Notice of Allowance for U.S. Appl. No. 12/581,868, dated Sep. 2, 2011, 6 pages.
U.S. Patent and Trademark Office, Notice of Allowance for U.S. Appl. No. 12/606,178, dated Jan. 27, 2012, 50 pages.
U.S. Patent and Trademark Office, Office Action for U.S. Appl. No. 11/929,501, dated Jun. 13, 2012, 38 pages.
U.S. Patent and Trademark Office, Office Action for U.S. Appl. No. 12/764,015, dated Dec. 18, 2012, 23 pages.
U.S. Patent and Trademark Office, Notice of Allowance for U.S. Appl. No. 11/929,501, dated Jan. 3, 2013, 20 pages.
U.S. Patent and Trademark Office, Notice of Allowance for U.S. Appl. No. 11/929,501, dated Sep. 3, 2013, 19 pages.

(56) References Cited

OTHER PUBLICATIONS

U.S. Patent and Trademark Office, Notice of Allowance for U.S. Appl. No. 12/764,015, dated Apr. 4, 2014, 54 pages.
U.S. Patent and Trademark Office, Notice of Allowance for U.S. Appl. No. 13/477,987, dated Feb. 25, 2014, 104 pages.
U.S. Appl. No. 60/224,701 dated Aug. 11, 2000.
U.S. Appl. No. 60/22,7878 dated Aug. 25, 2000.
U.S. Appl. No. 60/243,654 dated Oct. 26, 2000.
U.S. Appl. No. 60/208,967 dated Jun. 2, 2000.
U.S. Appl. No. 60/220,047 dated Jul. 21, 2000.
U.S. Appl. No. 60/239,320 dated Oct. 10, 2000.
State Intellectual Property Office, Office Action for Chinese Application No. 201010144167.7, dated Feb. 8, 2014, 4 pages.
State Intellectual Property Office of China, Fifth Office Action for CN201010144174.7, dated Apr. 16, 2014, 7 pages.
U.S. Patent and Trademark Office, Notice of Allowance for U.S. Appl. No. 12/764,015, dated Apr. 28, 2014, 51 pages.
U.S. Patent and Trademark Office, Notice of Allowance for U.S. Appl. No. 11/929,445, dated Jun. 25, 2014, 61 pages.
U.S. Patent and Trademark Office, Office Action for U.S. Appl. No. 13/476,947, dated Jun. 26, 2014, 85 pages.
State Intellectual Property Office of China, Notice of Allowance for Chinese Patent Application No. 201010144167.7, dated Jul. 24, 2014, 3 pages.
U.S. Patent and Trademark Office, Notice of Allowance for U.S. Appl. No. 13/477,987, dated Jun. 6, 2014, 26 pages.
U.S. Patent and Trademark Office, Notice of Allowance for U.S. Appl. No. 12/764,015, dated Sep. 11, 2014, 29 pages.
U.S. Patent and Trademark Office, Notice of Allowance for U.S. Appl. No. 12/764,032, dated Sep. 12, 2014, 29 pages.
U.S. Patent and Trademark Office, Notice of Allowance for U.S. Appl. No. 13/477,987, dated Sep. 26, 2014, 42 pages.
U.S. Patent and Trademark Office, Notice of Allowance for U.S. Appl. No. 11/929,445, dated Oct. 24, 2014, 33 pages.
U.S. Patent and Trademark Office, Notice of Allowance for U.S. Appl. No. 12/783,504, dated Nov. 7, 2014, 45 pages.
U.S. Patent and Trademark Office, Notice of Allowance for U.S. Appl. No. 12/783,504, dated Aug. 29, 2014, 78 pages.
U.S. Patent and Trademark Office, Notice of Allowance for U.S. Appl. No. 12/764,015, dated Dec. 18, 2014, 29 pages.
U.S. Patent and Trademark Office, Notice of Allowance for U.S. Appl. No. 12/764,032, dated Dec. 31, 2014, 38 pages.
U.S. Patent and Trademark Office, Notice of Allowance for U.S. Appl. No. 13/476,947, dated Jan. 8, 2015, 55 pages.
U.S. Patent and Trademark Office, Supplemental Notice of Allowability for U.S. Appl. No. 13/477,987, dated Jan. 21, 2015, 7 pages.
U.S. Patent and Trademark Office, Corrected Notice of Allowability for U.S. Appl. No. 12/783,504, dated Mar. 5, 2015, 26 pages.
U.S. Patent and Trademark Office, Notice of Allowance for U.S. Appl. No. 12/783,504, dated Apr. 24, 2015, 36 pages.
U.S. Patent and Trademark Office, Office Action for U.S. Appl. No. 15/051,534, dated Sep. 15, 2016, 77 pages.
U.S. Patent and Trademark Office, Office Action for U.S. Appl. No. 15/359,147, dated Dec. 30, 2016, 76 pages.
European Patent Office, Examination Report for European Patent Application No. 01985549.3, dated Jan. 10, 2017, 10 pages.
U.S. Patent and Trademark Office, Final Office Action for U.S. Appl. No. 15/051,534, dated May 4, 2017, 12 pages.
U.S. Patent and Trademark Office, Notice of Allowance for U.S. Appl. No. 15/359,147, dated Jul. 25, 2017, 13 pages.
U.S. Patent and Trademark Office, Notice of Allowance for U.S. Appl. No. 15/051,534, dated Jul. 27, 2017, 18 pages.

\* cited by examiner

MOBILE INFORMATION APPARATUS THAT INCLUDES INTELLIGENT WIRELESS DISPLAY, WIRELESS DIRECT DISPLAY, OR TRANSFER OF DIGITAL CONTENT FOR PLAYING OVER AIR THE DIGITAL CONTENT AT SMART TELEVISIONS, TELEVISION CONTROLLERS, OR AUDIO OUTPUT DEVICES

CROSS REFERENCE TO RELATED APPLICATION

This application claims benefit of Provisional Application No. 60/262,764 filed Jan. 19, 2001, the entire disclosure of which is hereby incorporated by reference for all purposes.

TECHNICAL FIELD OF THE INVENTION

Present invention relates to providing content to an output device and, in particular, to providing universal output in which an information apparatus can pervasively output content to an output device without the need to install a dedicated device dependent driver or applications for each output device.

BACKGROUND OF THE INVENTION

The present invention relates to universal data output and, in particular, to providing a new data output method and a new raster image process for information apparatuses and output devices.

As described herein, information apparatuses refer generally to computing devices, which include both stationary computers and mobile computing devices (pervasive devices). Examples of such information apparatuses include, without limitation, desktop computers, laptop computers, networked computers, palmtop computers (hand-held computers), personal digital assistants (PDAs), Internet enabled mobile phones, smart phones, pagers, digital capturing devices (e.g., digital cameras and video cameras), Internet appliances, e-books, information pads, and digital or web pads. Output devices may include, without limitation, fax machines, printers, copiers, image and/or video display devices (e.g., televisions, monitors and projectors), and audio output devices.

For simplicity and convenience, hereafter, the following descriptions may refer to an output device as a printer and an output process as printing. However, it should be understood that the term printer and printing used in the discussion of present invention refer to one embodiment used as a specific example to simplify the description of the invention. The references to printer and printing used here are intended to be applied or extended to the larger scope and definition of output devices and should not be construed as restricting the scope and practice of present invention.

Fueled by an ever-increasing bandwidth, processing power, wireless mobile devices, and wireless software applications, millions of users are or will be creating, downloading, and transmitting content and information using their pervasive or mobile computing devices. As a result, there is a need to allow users to conveniently output content and information from their pervasive computing devices to any output device. As an example, people need to directly and conveniently output from their pervasive information apparatus, without depending on synchronizing with a stationary computer (e.g., desktop personal computer) for printing.

To illustrate, a mobile worker at an airport receiving e-mail in his hand-held computer may want to walk up to a nearby printer or fax machine to have his e-mail printed. In addition, the mobile worker may also want to print a copy of his to-do list, appointment book, business card, and his flight schedule from his mobile device. As another example, a user visiting an e-commerce site using his mobile device may want to print out transaction confirmation. In still another example, a user who takes a picture with a digital camera may want to easily print it out to a nearby printer. In any of the above cases, the mobile user may want to simply walk up to a printer and conveniently print a file (word processing document, PDF, HTML etc) that is stored on the mobile device or downloaded from a network (e.g., Internet, corporate network).

Conventionally, an output device (e.g., a printer) is connected to an information apparatus via a wired connection such as a cable line. A wireless connection is also possible by using, for example, radio communication or infrared communication. Regardless of wired or wireless connection, a user must first install in the information apparatus an output device driver (e.g., printer driver in the case the output device is a printer) corresponding to a particular output device model and make. Using a device-dependent or specific driver, the information apparatus may process output content or digital document into a specific output device's input requirements (e.g., printer input requirements). The output device's input requirements correspond to the type of input that the output device (e.g., a printer) understands. For example, a printer's input requirement may include printer specific input format (e.g., one or more of an image, graphics or text format or language). Therefore, an output data (or print data in the case the output device is a printer) herein refers to data that is acceptable for input to an associated output device. Examples of input requirements may include, without limitation, audio format, video format, file format, data format, encoding, language (e.g., page description language, markup language etc), instructions, protocols or data that can be understood or used by a particular output device make and model.

Input requirements may be based on proprietary or published standards or a combination of the two. An output device's input requirements are, therefore, in general, device dependent. Different output device models may have their own input requirements specified, designed or adopted by the output device manufacturer (e.g., the printer manufacturer) according to a specification for optimal operation. Consequently, different output devices usually require use of specific output device drivers (e.g., printer drivers) for accurate output (e.g., printing). Sometimes, instead of using a device driver (e.g., printer driver), the device driving feature may be included as part of an application software.

Installation of a device driver (e.g., printer driver) or application may be accomplished by, for example, manual installation using a CD or floppy disk supplied by the printer manufacturer. Or alternatively, a user may be able to download a particular driver or application from a network. For a home or office user, this installation process may take anywhere from several minutes to several hours depending on the type of driver and user's sophistication level with computing devices and networks. Even with plug-and-play driver installation, the user is still required to execute a multi-step process for each printer or output device.

This installation and configuration process adds a degree of complexity and work to end-users who may otherwise spend their time doing other productive or enjoyable work. Moreover, many unsophisticated users may be discouraged from adding new peripherals (e.g., printers, scanners, etc.) to their home computers or networks to avoid the inconvenience of installation and configuration. It is therefore desirable that an information apparatus can output to more than one output device without the inconvenience of installing multiple dedicated device dependent drivers.

In addition, conventional output or printing methods may pose significantly higher challenges and difficulties for mobile device users than for home and office users. The requirement for pre-installation of a device-dependent driver diminishes the benefit and concept of mobile (pervasive) computing and output. For example, a mobile user may want to print or output e-mail, PowerPoint® presentation documents, web pages, or other documents at an airport, gas station, convenience store, kiosk, hotel, conference room, office, home, etc. It is highly unlikely that the user would find at any of these locations a printer of the same make and model as is at the user's base station. As a consequence, under the conventional printing method, the user would have to install and configure a printer driver each time at each such remote location before printing. It is usually not a viable option given the hundreds, or even thousands of printer models in use, and the limited storage, memory space, and processing power of the information apparatus.

Moreover, the user may not want to be bothered with looking for a driver or downloading it and installing it just to print out or display one page of email at the airport. This is certainly an undesirable and discouraging process to promote pervasive or mobile computing. Therefore, a more convenient printing method is needed in support of the pervasive computing paradigm where a user can simply walk up to an output device (e.g., printer or display device) and easily output a digital document without having to install or pre-install a particular output device driver (e.g., printer driver).

Another challenge for mobile users is that many mobile information apparatuses have limited memory space, processing capacity and power. These limitations are more apparent for small and low-cost mobile devices including, for example, PDAs, mobile phones, screen phones, pagers, e-books, Internet Pads, Internet appliances etc. Limited memory space poses difficulties in installing and running large or complex printer or device drivers, not to mention multiple drivers for a variety of printers and output devices. Slow processing speed and limited power supply create difficulties driving an output device. For example, processing or converting a digital document into output data by a small mobile information apparatus may be so slow that it is not suitable for productive output. Intensive processing may also drain or consume power or battery resources. Therefore, a method is needed so that a small mobile device, with limited processing capabilities, can still reasonably output content to various output devices.

To output or render content (e.g. digital document) to an output device, a raster image processing (RIP) operation on the content is usually required. RIP operation can be computationally intensive and may include (1) a rasterization operation, (2) a color space conversion, and (3) a halftoning operation. RIP may also include other operations such as scaling, segmentation, color matching, color correction, GCR (Grey component replacement), Black generation, image enhancement compression/decompression, encoding/decoding, encryption/decryption GCR, image enhancement among others.

Rasterization operation in RIP involves converting objects and descriptions (e.g. graphics, text etc) included in the content into an image form suitable for output. Rasterization may include additional operations such as scaling and interpolation operations for matching a specific output size and resolution. Color space conversion in RIP includes converting an input color space description into a suitable color space required for rendering at an output device (e.g. RGB to CMYK conversion). Digital halftoning is an imaging technique for rendering continuous tone images using fewer luminance and chrominance levels. Halftoning operations such as error diffusion can be computationally intensive and are included when the output device's bit depth (e.g. bits per pixel) is smaller than the input raster image bit depth.

Conventionally, RIP operations are included either in an information apparatus, or as part of an output device or output system (e.g. in a printer controller). FIG. 1A illustrates a flow diagram of a conventional data output method 102 in which RIP 110 is implemented in the information apparatus. Output devices that do not include a printer controller to perform complex RIP operations, such as a lower-cost, lower speed inkjet printer, normally employ data output method 102. In data output method 102, an information apparatus obtains content (e.g. a digital document) in step 100 for rendering or output at an output device. The information apparatus may includes an application (e.g. device driver), which implements RIP operation 110. The information apparatus generates an output data in step 120 and transmits the output data to the output device in step 130 for rendering. The output data relating to the content is in an acceptable form (e.g. in an appropriate output size and resolution) to the output engine (e.g. display engine, printer engine etc.) included in the output device. The output data in a conventional output method 102 is usually device dependent.

One drawback for the data output method 102 of FIG. 1A is that the information apparatus performs most if not the entire raster image processing operations 110 required for output. The RIP operations may require intensive computation. Many information apparatus such as mobile information device might have insufficient computing power and/or memory to carry out at an acceptable speed the RIP operations 110 required in an output process.

Another drawback for the conventional data output method 102 of FIG. 1A is that the generated output data is device dependent and therefore is typically not very portable to other output devices. As a result, the information apparatus may need to install multiple applications or device drivers for multiple output devices, which may further complicate its feasibility for use in information apparatuses with limited memory, storage and processing power.

FIG. 1B illustrates a flow diagram of another conventional data output method 104 in which the RIP is implemented in an output device. An example of an output device that implements process 104 is a high-speed laser printer which includes a printer controller for performing RIP operations and an output engine (e.g. printer engine) for rendering content. Printer controller may be internally installed or externally connected to an output device (printer in this example). In data output method 104, an information apparatus obtains content for output in step 100 and generates in step 160 an output data or print data for transmitting to the output device in step 170. Print data includes information related to the content and is usually encoded in a page description language (PDL) such as PostScript and PCL etc. In step 180, the printer receives the output data or print data (in a PDL). In step 190, a printer controller included in the printer interprets the PDL, performs RIP operations, and generates a printer-engine print data that is in a form acceptable to the printer engine (e.g. a raster image in an appropriate output size, bit depth, color space and resolution). In step 150 the printer engine renders the content with the printer-engine print data.

It will be understood that a reference to print data or output data including a language, such as PDL, should be interpreted as meaning that the print data or output data is encoded using that language. Correspondingly, a reference to a data output process generating a language, such as PDL, should be interpreted as meaning that the data output process encodes data using that language.

There are many drawbacks in the conventional data output method 104 shown in FIG. 1B. These drawbacks are especially apparent for mobile computing devices with limited processing power and memory. One such drawback is that the output data or print data, which include a page description language (PDL) such as PostScript or PCL, can be very complex. Generating complex PDL may increase memory and processing requirements for an information apparatus. Furthermore, interpreting, decoding and then raster image processing complex PDL can increase computation, decrease printing speed, and increase the cost of the output device or its printer controller.

Another drawback is that the output data that includes PDL can creates a very large file size that would increase memory and storage requirements for the information apparatus, the output device and/or the printer controller etc. Large file size may also increase the bandwidth required in the communication link between the information apparatus and the output device.

Finally, to rasterize text in an output device, a printer controller may need to include multiple fonts. When a special font or international characters is not included or missing in the printer controller, the rendering or output can potentially become inaccurate or inconsistent.

SUMMARY OF THE INVENTION

Accordingly, this invention provides a convenient universal data output method in which an information apparatus and an output device or system share the raster image processing operations. Moreover, the new data output method eliminates the need to install a plurality of device-dependent dedicated drivers or applications in the information apparatus in order to output to a plurality of output devices.

In accordance with present invention, an electronic system and method of pervasive and universal output allow an information apparatus to output content conveniently to virtually any output device. The information apparatus may be equipped with a central processing unit, input/output control unit, storage unit, memory unit, and wired or wireless communication unit or adapters. The information apparatus preferably includes a client application that may be implemented as a software application, a helper application, or a device driver (a printer driver in case of a printer). The client application may include management and control capabilities with hardware and software components including, for example, one or more communication chipsets residing in its host information apparatus.

The client application in the information apparatus may be capable of communicating with, managing and synchronizing data or software components with an output device equipped with an output controller of present invention.

Rendering content in an output device refers to printing an image of the content onto an substrate in the case of a printing device; displaying an image of the content in the case of a displaying device; playing an audio representation of the content in a voice or sound output device or system.

An output controller may be a circuit board, card or software components residing in an output device. Alternatively, the output controller may be connected externally to an output device as an external component or "box." The output controller may be implemented with one or more combinations of embedded processor, software, firmware, ASIC, DSP, FPGA, system on a chip, special chipsets, among others. In another embodiment, the functionality of the output controller may be provided by application software running on a PC, workstation or server connected externally to an output device.

In conventional data output method 102 as described with reference to FIG. 1A, an information apparatus transmits output data to an output device for rendering. Output data corresponds to content intended for output and is mostly raster image processed (RIPed) and therefore is device dependent because raster image processing is a typical device dependent operation. Output data may be encoded or compressed with one or more compression or encoding techniques. In present invention, an information apparatus generates an intermediate output data for transmitting to an output device. The intermediate output data includes a rasterized image corresponding to the content; however, device dependent image processing operations of a RIP (e.g. color matching and halftoning) have not been performed. As a result, an intermediate output data is more device independent and is more portable than the output data generated by output method with reference to FIG. 1A.

In one implementation of this invention, the intermediate output data includes MRC (Mixed raster content) format, encoding and compression techniques, which further provides improved image quality and compression ratio compared to conventional image encoding and compression techniques.

In an example of raster image process and data output method of the present invention, a client application such as a printer driver is included in an information apparatus and performs part of raster image processing operation such as rasterization on the content. The information apparatus generates an intermediate output data that includes an output image corresponding to the content and sends the intermediate output data to an output device or an output system for rendering. An output controller application or component included in the output device or output system implements the remaining part of the raster image processing operations such as digital halftoning, color correction among others.

Unlike conventional raster image processing methods, this invention provides a more balanced distribution of the raster image processing computational load between the Information apparatus and the output device or the output system. Computational intensive image processing operations such as digital halftoning and color space conversions can be implemented in the output device or output system. Consequently, this new raster image processing method reduces the processing and memory requirements for the information apparatus when compared to conventional data output methods described with reference to FIG. 1A in which the entire raster image process is implemented in the information apparatus. Additionally, in this invention, a client application or device driver included in the information apparatus, which performs part of the raster image processing operation, can have a smaller size compared to a conventional output application included in the information apparatus, which performs raster image processing operation.

In another implementation, the present invention provides an information apparatus with output capability that is more universally accepted by a plurality of output devices. The information apparatus, which includes a client application, generates an intermediate output data that may include device independent attributes. An output controller includes components to interpret and process the intermediate output data. The information apparatus can output content to different output devices or output systems that include the output controller even when those output devices are of different brand, make, model and with different output engine and input data requirements. Unlike conventional output methods, a user does not need to preinstall in the information apparatus multiple dedicated device dependent drivers or applications for each output device.

The combination of a smaller-sized client application, a reduced computational requirement in the information apparatus, and a more universal data output method acceptable for rendering at a plurality of output devices enable mobile devices with less memory space and processing capabilities to implement data output functions which otherwise would be difficulty to implement with conventional output methods.

In addition, this invention can reduce the cost of an output device or an output system compared to conventional output methods 104 that include a page description language (PDL) printer controller. In the present invention, an information apparatus generates and sends an intermediate output data to an output device or system. The intermediate output data in one preferred embodiment includes a rasterized output image corresponding to the content intended for output. An output controller included in an output device or an output system decodes and processes the intermediate output data for output, without performing complex interpretation and rasterization compared to conventional methods described in process 104. In comparison, the conventional data output process 104 generates complex PDL and sends this PDL from an information apparatus to an output device that includes a printer controller (e.g. a PostScript controller or a PCL5 controller among others). Interpretation and raster image processing of a PDL have much higher computational requirements compared to decoding and processing the intermediate output data of this invention that include rasterized output image or images. Implementing a conventional printer controller with, for example, PDL increases component cost (e.g. memories, storages, ICs, software and processors etc.) when compared to using the output controller included in the data output method of this present invention.

Furthermore, an output data that includes PDL can create a large file size compared to an intermediate output data that includes rasterized output image. The data output method for this invention comparatively transmits a smaller output data from an information apparatus to an output device. Smaller output data size can speed up transmission, lower communication bandwidth, and reduce memory requirements. Finally, this invention can provide a convenient method to render content at an output device with or without connection to a static network. In conventional network printing, both information apparatus and output device must be connected to a static network. In this invention, through local communication and synchronization between an information apparatus and an output device, installation of hardware and software to maintain static network connectivity may not be necessary to enable the rendering of content to an output device.

According to the several aspects of the present invention there is provided the subject matter defined in the appended independent claims.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
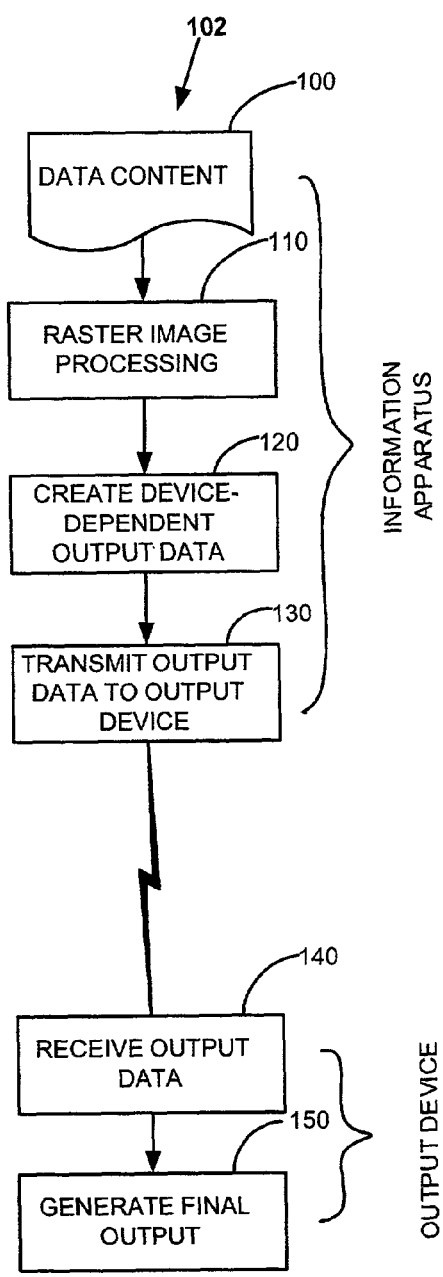
FIG. 1A is a flow diagram of a conventional data output method and its corresponding raster image process in accordance with prior art.
FIG. 1B is a flow diagram of a second conventional data output method and its corresponding raster image process for an output device that includes a conventional printer controller in accordance with prior art.
Figure 1:
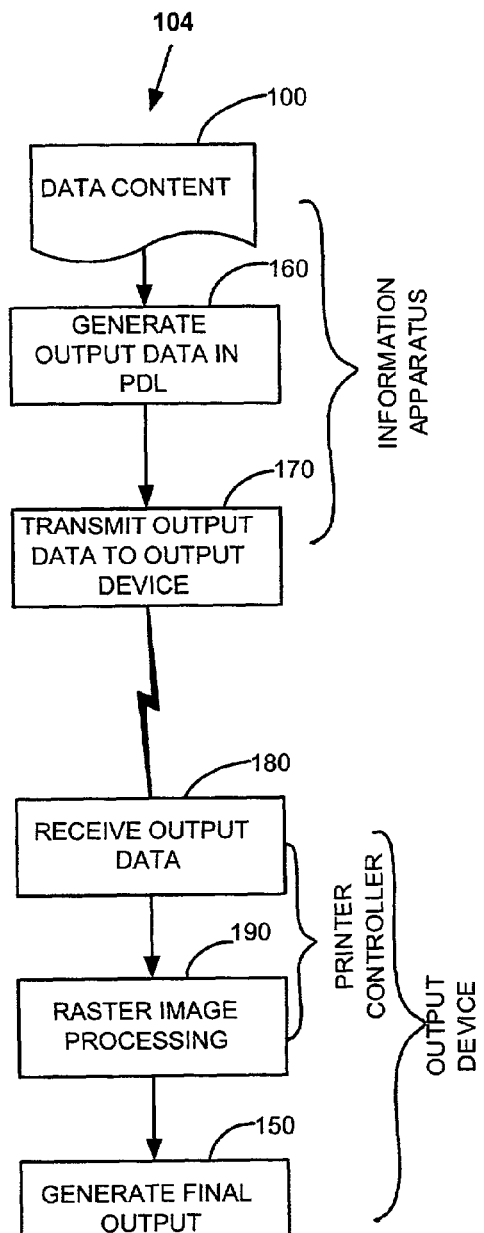

Sets forth below are definitions of terms that are used in describing implementations of the present invention. These definitions are provided to facilitate understanding and illustration of implementations of the present invention and should in no way be construed as limiting the scope of the invention to a particular example, class, or category.

Output Device Profile (Or Object)

An output device profile (or object) includes software and data entity, which encapsulates within itself both data and attributes describing an output device and instructions for operating that data and attributes. An output device profile may reside in different hardware environments or platforms or applications, and may be transported in the form of a file, a message, a software object or component among other forms and techniques. For simplicity of discussion, a profile or object may also include, for example, the concept of software components that may have varying granularity and can consist of one class, a composite of classes, or an entire application.

The term profile or object used herein is not limited to software or data as its media. Any entity containing information, descriptions, attributes, data, instructions etc. in any computer-readable form or medium such as hardware, software, files based on or including voice, text, graphics, image, or video information, electronic signals in analog or digital form, etc., are all valid forms of profile and object definition.

A profile or object may also contain in one of its fields or attributes a reference or pointer to another profile or object, or a reference or pointer to data and or content. A reference to a profile or object may include one or more, or a combination of pointers, identifiers, names, paths, addresses or any descriptions relating to a location where an object, profile, data, or content can be found.

An output device profile may contain one or more attributes that may identify and describe, for example, the capabilities and functionalities of a particular output device such as a printer. An output device profile may be stored in the memory component of an output device, an information apparatus or in a network node. A network node includes any device, server or storage location that is connected to the network. As described below in greater detail, an information apparatus requesting output service may communicate with an output device. During such local service negotiation, at least a partial output device profile may be uploaded to the information apparatus from the output device. By obtaining the output device profile (or printer profile in the case of a printer), the information apparatus may learn about the capability, compatibility, identification, and service provided by the output device.

As an example, an output device profile may contain one or more of the following fields and or attribute descriptions. Each of following fields may be optional, and furthermore, each of the following fields or attributes may or may not exist in a particular implementation (e.g., may be empty or NULL):

Identification of an output device (e.g., brand, model, registration, IP address etc.)

Services and feature sets provided by an output device (e.g., color or grayscale output, laser or inkjet, duplex, output quality, price per page, quality of service, etc.)

Type of input languages, formats, output data and/or input requirements (e.g., PostScript, PCL, XML, RTL, etc.) supported by an output device.

Device specific or dependent parameters and information (e.g., communication protocols, color space, color management methods and rendering intents, resolution, halftoning methods, dpi (dots-per-inch), bit depth, page size, printing speed, number of independent colors channels or ink etc.)

Data and tables needed for image processing such as color table, halftone table, scale factor, encoding/decoding parameters and methods, compression and decompression parameters and method etc.

Another profile which contain parameters and information about the output device and its service (e.g. color profiles, halftoning profiles, communication profiles, rasterization profiles, quality of service etc.).

Payment information on a plurality of services provided by an output device.

Information or security requirements and type of authentication an output device supports.

Date and version of the output device profile, history of its modification and updates.

Software components containing algorithms or instructions or data, which may be uploaded to run in an information apparatus. For example, a graphical user interface (GUI) software component may be uploaded to an information apparatus. The software component may be incorporated into or launched in the information apparatus by a client application of present invention to capture a user's preferences (e.g., print quality, page layout, number of copies, number of cards per page, etc.). In another example, software components may include methods, instructions or executables for compression/decompression, encoding/decoding, color matching or correction, segmentation, scaling, halftoning, encryption/decryption among others.

Pointer or reference to one or more output device parameters, including one or more of the above described output device profile or object fields and or attribute descriptions. For example, a more up-to-date or original version of output device parameters may sometimes be stored in a network node (any device, server or storage location that is connected to the network), or within the information apparatus where it can be obtained by the client application. An output device profile may include pointer or pointers to these output device parameters.

Content (Or Data Content, Digital Content, Output Content)

Content (or data content, digital content, output content) is the data intended for output, which may include texts, graphics, images, forms, videos, audio among other content types. Content may include the data itself or a reference to that data. Content may be in any format, language, encoding or combination, and it can be in a format, language or encoding that is partially or totally proprietary. A digital document is an example of content that may include attributes and fields that describe the digital document itself and or reference or references to the digital document or documents. Examples of a digital document may be any one or combination of file types: HTML, VHTML, PostScript, PCL, XML, PDF, MS Word, PowerPoint, JPEG, MPEG, GIF, PNG, WML, VWML, CHTML, HDML, ASCII, 2-byte international coded characters, etc. Content may be used interchangeably with the term data content, output content or digital content in the descriptions of present invention.

Intermediate Output Data

Output data (or print data in case of a printer) is the electronic data sent from an information apparatus to an output device. Output data is related to the content intended for output and may be encoded in a variety of formats and languages (e.g. postscript, PCL, XML), which may include compressed or encrypted data. Some output device manufacturers may also include in the output data (or print data) a combination of proprietary or non-proprietary languages, formats, encoding, compression, encryption etc.

Intermediate output data is the output data of the present invention, and it includes the broader definition of an output file or data generated by an information apparatus, or a client application or device driver included in the information apparatus. An intermediate output data may contain text, vector graphics, images, video, audio, symbols, forms or combination and can be encoded with one or more of a page description language, a markup language, a graphics format, an imaging format, a metafile among others. An intermediate output data may also contain instructions (e.g. output preferences) and descriptions (e.g. data layout) among others. Part or all of an intermediate output data may be compressed, encrypted or tagged.

In a preferred embodiment of this invention, intermediate output data contains rasterized image data. For example, vector graphics and text information or objects that are not in image form included in content can be rasterized or conformed into image data in an information apparatus and included in an intermediate output data. Device dependent image processing operations of a RIP such as digital halftoning and color space conversions can be implemented at an output device or an output system.

The intermediate output data can be device dependent or device independent. In one implementation, the rasterized output image is device dependent if the rasterization parameters used, such as resolution, scale factor, bit depth, output size and or color space are device dependent. In another implementation of this invention, the rasterized image may be device independent if the rasterization parameters used are device independent. Rasterization parameter can become device independent when those parameters include a set of predetermined or predefined rasterization parameters based on a standard or a specification. With predefined or device independent rasterization parameters, a client application of present invention can rasterize at least a portion of the content and generate a device independent image or images included in the intermediate output data. By doing so, the intermediate output data may become device independent and therefore, become universally acceptable with output devices that have been pre-configured to accept the intermediate output data.

One advantage of rasterizing or converting text and graphics information into image data at the information apparatus is that the output device or printer controller no longer needs to perform complex rasterization operation nor do they need to include multiple fonts. Therefore, employing the intermediate output data and the data output method described herein could potentially reduce the cost and complexity of an output controller, printer controller and or output device.

One form of image data encoding is known as mixed raster content, or MRC. Typically, an image stored in MRC includes more than one image or bitmap layers. In MRC, an image can be segmented in different layers based on segmentation criteria such as background and foreground, luminance and chrominance among others. For example, an MRC may include three layers with a background layer, a foreground layer and a toggle or selector layer. The three layers are coextensive and may include different resolution, encoding and compression. The foreground and background layers may each contain additional layers, depending on the manner in which the respective part of the image is segmented based on the segmentation criteria, component or channels of a color model, image encoding representation (HLS, RGB, CMYK, YCC, LAB etc) among others. The toggle layer may designate, for each point, whether the foreground or background layer is effective. Each layer in a MRC can have different bit depths, resolution, color space, which allow, for example, the foreground layer to be compressed differently from the background layer. The MRC form of image data has previously been used to minimize storage requirements. Further, an MRC format has been proposed for use in color image fax transmission.

In one embodiment of present invention, the intermediate output data includes one or more rasterized output images that employ MRC format, encoding and or related compression method. In this implementation, different layers in the output image can have different resolutions and may include different compression techniques. Different information such as chrominance and luminance and or foreground and background information in the original content (e.g. digital document) can be segmented and compressed with different compression or encoding techniques. Segmented elements or object information in the original content can also be stored in different image layers and with different resolution. Therefore, with MRC, there is opportunity to reduce output data file size, retain greater image information, increase compression ratio, and improve image quality when compared to other conventional image encoding and compression techniques. Implementations of rasterization, raster image processing and intermediate output data that include MRC encoding in the present invention are described in more detail below.

Rasterization

Rasterization is an operation by which graphics and text in a digital document are converted to image data. For image data included in the digital document, rasterization may include scaling and interpolation. The rasterization operation is characterized by rasterization parameters including, among others bit depth and resolution. A given rasterization operation may be characterized by several more rasterization parameters, including output size, color space, color channels etc. Values of one or more of the rasterization parameters employed in a rasterization operation may be specified by default; values of one or more of the rasterization parameters may be supplied to the information apparatus as components of a rasterization vector. In a given application, the rasterization vector may specify a value of only one rasterization parameter, default values being employed for other rasterization parameters used in the rasterization operation. In another application the rasterization vector may specify values of more than one, but less than all, rasterization parameters, default values being employed for at least one other rasterization parameter used in the rasterization operation. And in yet another application the rasterization vector may specify values of all the rasterization parameters used in the rasterization operation.

Figure 2A:
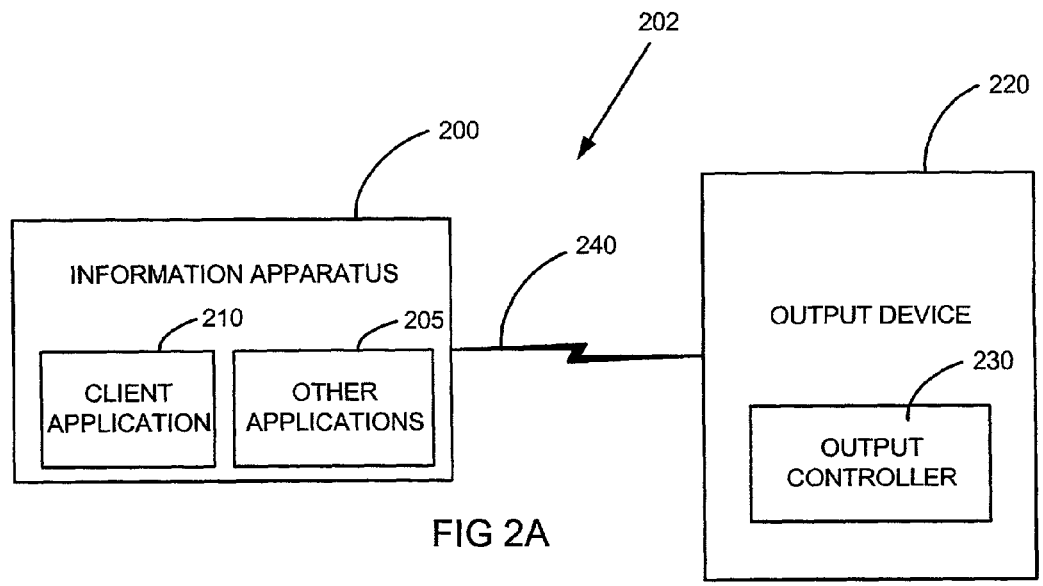
FIGS. 2A and 2B are block diagrams illustrating components of an operating environment that can implement the process and apparatus of the present invention.
Figure 2B:
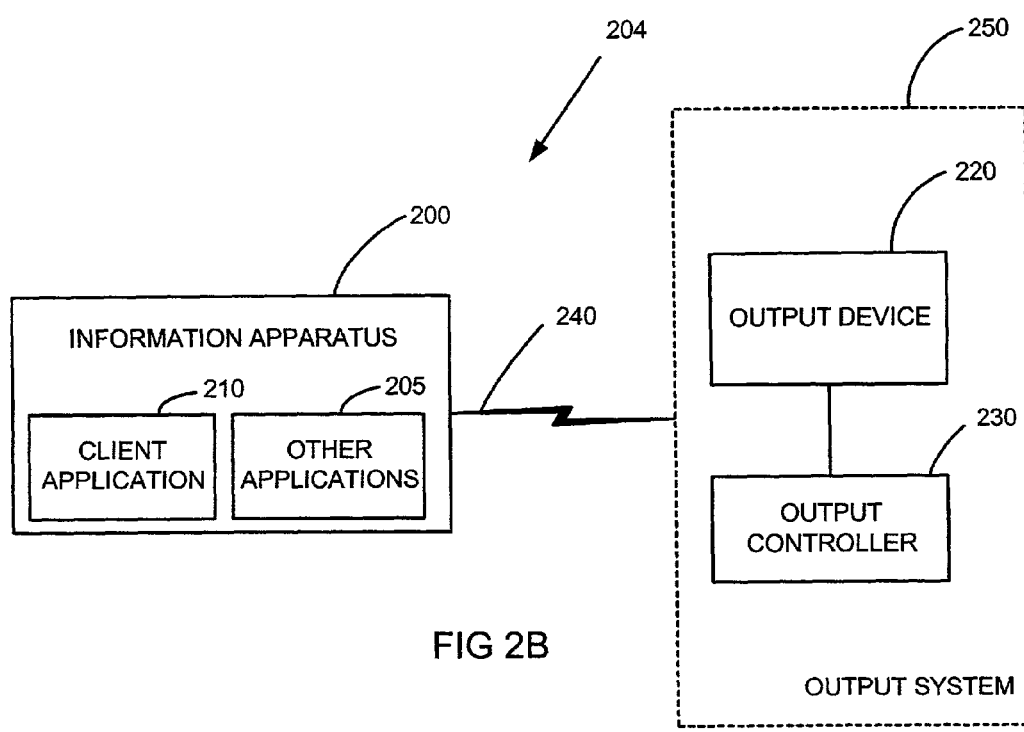

FIGS. 2A and 2B are block diagrams illustrating components of an operating environment that can implement the process and apparatus of present invention. FIG. 2A shows an electronic system which includes an information apparatus 200 and an output device 220. The output device 220 includes an output controller 230. FIG. 2B illustrates a second implementation of an electronic system that includes an information apparatus 200 and an output system 250. The output system 250 includes an output device 220 and an output controller 230 which may be externally connected to, or otherwise associated with, the output device 220 in the output system 250.

Information apparatus 200 is a computing device with processing capability. In one embodiment, information apparatus 200 may be a mobile computing device such as palmtop computer, handheld device, laptop computer, personal digital assistant (PDA), smart phone, screen phone, e-book, Internet pad, communication pad, Internet appliance, pager, digital camera, etc. It is possible that information apparatus 200 may also include a static computing device such as a desktop computer, workstation, server, etc.

Figure 3A:
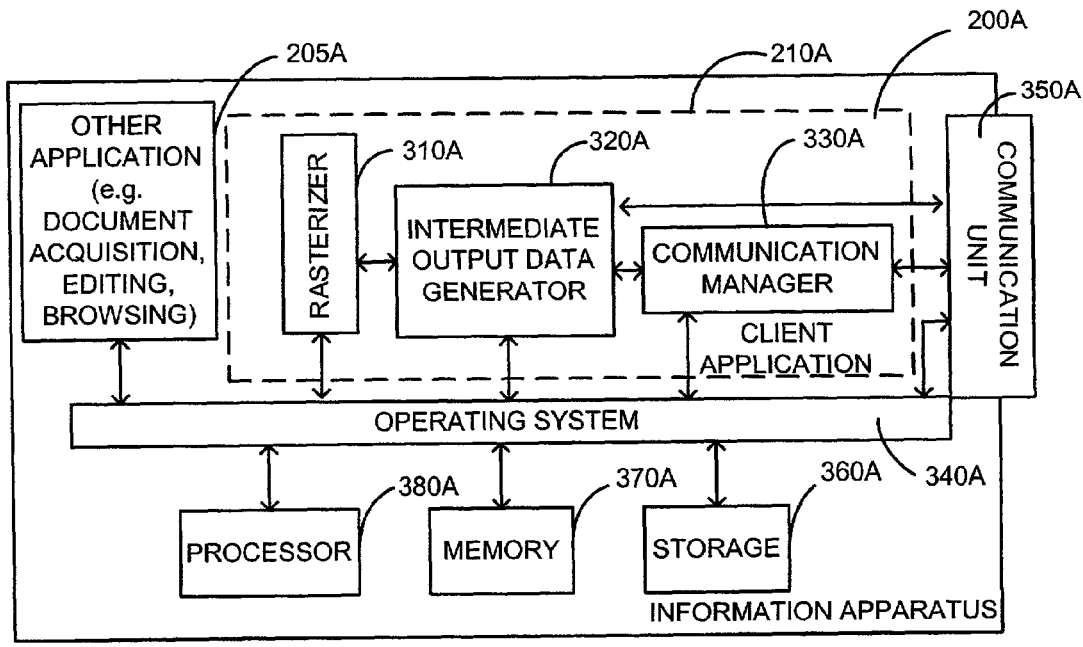
FIG. 3A is a schematic block diagram illustrating hardware/software components of an information apparatus implementation in accordance with present invention. The information apparatus includes an operating system.
Figure 3B:
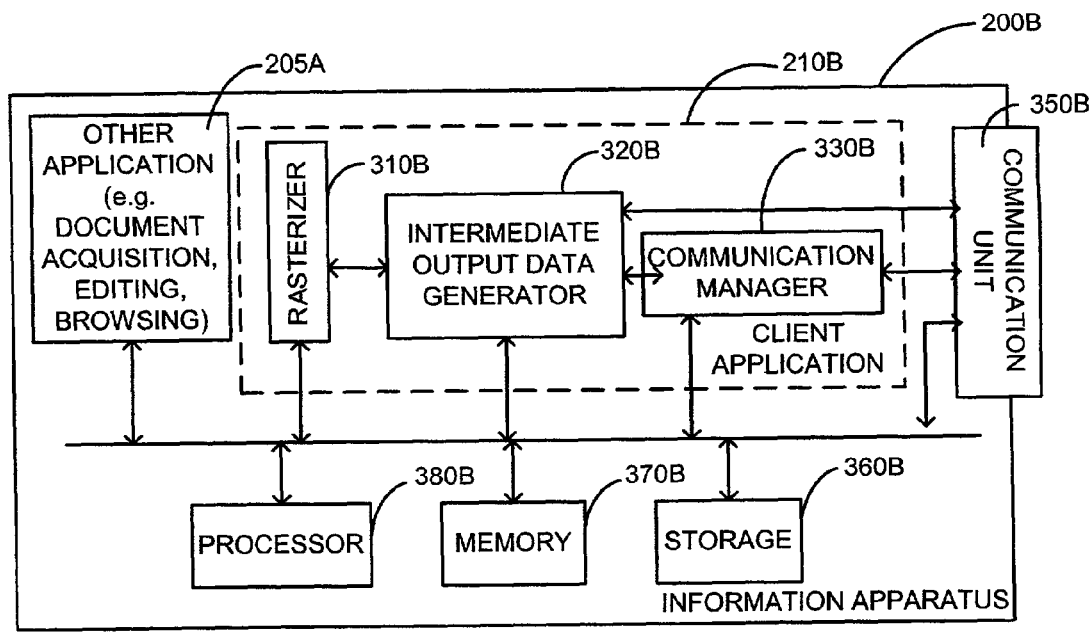
FIG. 3B is a second schematic block diagram illustrating hardware/software components of an information apparatus implementation in accordance with present invention.

FIGS. 3A and 3B are block diagrams illustrating examples of hardware/software components included in an information apparatus 200 of present invention.

Information apparatus 200 may contain components such as a processing unit 380, a memory unit 370, an optional storage unit 360 and an input/output control unit (e.g. communication manager 330). Information apparatus 200 may include an interface (not shown) for interaction with users. The interface may be implemented with software or hardware or a combination. Examples of such interfaces include, without limitation, one or more of a mouse, a keyboard, a touch-sensitive or non-touch-sensitive screen, push buttons, soft keys, a stylus, a speaker, a microphone, etc.

Information apparatus 200 typically contains one or more network communication unit 350 that interfaces with other electronic devices such as network node (not shown), output device 220, and output system 230. The network communication unit may be implemented with hardware (e.g., silicon chipsets, antenna), software (e.g., protocol stacks, applications) or a combination.

In one embodiment of the present invention, communication interface 240 between information apparatus 200 and output device 220 or output system 250 is a wireless communication interface such as a short-range radio interface including those implemented according to the Bluetooth or IEEE 802.11 standard. The communication interface may also be realized by other standards and/or means of wireless communication that may include radio, infrared, cellular, ultrasonic, hydrophonic among others for accessing one or more network node and/or devices. Wired line connections such as serial or parallel interface, USB interface and fire wire (IEEE 1394) interface, among others, may also be included. Connection to a local network such as an Ethernet or a token Ring network, among others, may also be implemented in the present invention for local communication between information apparatus 200 and output device 220. Examples of hardware/software components of communication units 350 that may be used to implement wireless interface between the information apparatus 200 and the output device 220 are described in more detail with reference to FIGS. 8A and 8B below.

For simplicity, FIG. 3 illustrates one implementation where an information apparatus 200 includes one communication unit 350. However, it should be noted that an information apparatus 200 may contain more than one communication unit 350 in order to support different interfaces, protocols, and/or communication standards with different devices and/or network nodes. For example, information apparatus 200 may communicate with one output device 220 through a Bluetooth standard interface or through an IEEE 802.11 standard interface while communicating with another output device 220 through a parallel cable interface. The information apparatus 200 may also be coupled to a wired or wireless network (e.g. the Internet or corporate network) to send, receive and/or download information.

Information apparatus 200 may be a dedicated device (e.g., email terminal, web terminal, digital camera, e-book, web pads, Internet appliances etc.) with functionalities that are pre-configured by manufacturers. Alternatively, information apparatus 200 may allow users to install additional hardware components and or application software 205 to expand its functionality.

Information apparatus 200 may contain a plurality of applications 205 to implement its feature sets and functionalities. As an example, a document browsing or editing application may be implemented to help user view and perhaps edit, partially or entirely, digital documents written in certain format or language (e.g., page description language, markup language, etc.). Digital documents may be stored locally in the information apparatus 200 or in a network node (e.g., in content server). An example of a document browsing application is an Internet browser such as Internet Explorer, Netscape Navigator, or a WAP browser. Such browsers may retrieve and display content (e.g. digital content) written in mark-up languages such as HTML, WML, XML, CHTML, HDML, among others. Other examples of software applications in the information apparatus 200 may include a document editing software such as Microsoft Word™ which also allows users to view and or edit digital documents that have various file extensions (e.g., doc, rtf, html, XML etc.) whether stored locally in the information apparatus 200 or in a network node. Still, other example of software applications 205 may include image acquisition and editing software.

As illustrated previously with reference to FIG. 1, there are many difficulties in providing output capability to an information apparatus 200 that has limited memory and processing capability. To address theses difficulties, information apparatus 200 includes a client application 210 that helps provide the universal data output capability of the present invention. Client application 210 may include software and data that can be executed by the processing unit 380 of information apparatus 200. Client application 210 may be implemented as a stand-alone software application or as a part of or feature of another software application, or in the form of a device driver, which may be invoked, shared and used by other application software 205 in the information apparatus 200. Client application 210 may also include components to invoke other applications 205 (e.g., a document browsing application, editing application, data and/or image acquisition application, a communication manager, a output manager etc.) to provide certain feature sets, as described below. FIG. 3 illustrates a configuration where the client application 210 is a separate application from the other application 205 such as the case when the client application is a device driver; however, it should be noted that the client application 210 can be combined or being part of the other application not shown in FIG. 3. Client application 210 may be variously implemented in an information apparatus 200 and may run on different operating systems or platforms. The client application 210 may also run in an environment with no operating system. For example, FIG.

3A illustrates an implementation where the information apparatus 200A includes an operating system 340A; while FIG. 3B illustrates an implementation where the information apparatus 200B does not include an operating system.

Client application 210 includes a rasterization component 310 to conform content into one or more raster output images according to one or more rasterization parameters; an intermediate output data generator component 320 that generates and/or encodes intermediate output data that includes the one or more output images; and a communications manager 330 that manages the communication and interaction with an output device 220 or system 250 or output controller 230. Communications manager can be implemented as part of the client application 210 (shown in FIG. 3) or as a separate application (not shown). Components in a client application can be implemented in software, hardware or combination. As an example, client application 210 may include or utilize one or more of the following:

Components or operations to obtain content (e.g. digital document) for output. The client application 210 may obtain a digital document from other applications 205 (e.g. document browsing application, content creation and editing application, etc.), or the client application 210 may provide its own capability for user to browse, edit and or select a digital document.

Components or operations to rasterize content that includes text, graphics and images among others objects or elements into one or more raster images according to a set of rasterization parameters such as scale factor, output size, bit depth, color space and resolution. The rasterization parameters may be obtained in various ways, for example, from an output device profile uploaded from an output device 220, or stored locally in information apparatus 200, or manually inputted by a user. Alternatively, rasterization parameters may be based on a predefined standard or specification stored in the information apparatus 200 as a set of defaults, or hard-coded in the client application 210, or calculated by the client application 210 after communicating with an output device 220, output controller 230, and/or a user.

Components or operations to generate intermediate output data that includes at least one rasterized output image corresponding to the content (e.g. digital document). This process may further include one or combination of compression, encoding, encryption and color correction among others. The intermediate output data may include, for example, images, instructions, documents and or format descriptions, color profiles among others.

Components or operations to transmit the intermediate output data to an output device 220 or system 250 through wired or wireless communication link 240.

The client application 210 may also optionally include or utilize one or more of the following components or operations:

Components or operations to communicate with one or more output devices 220 to upload an output device profile.

Components or operations to communicate directly or indirectly (such as through an operating system or component or object model, messages, file transfer etc.) with other applications 205 residing in the same information apparatus 200 to obtain objects, data, and or content needed, or related to the pervasive output process of present invention (e.g. obtain a digital document for printing).

Components or operations to manage and utilize directly or indirectly functionalities provided by hardware components (e.g. communication unit 350) residing in its host information apparatus 200.

Components or operations to provide a graphical user interface (GUI) in host information apparatus to interact with user.

Components or operations to obtain user preferences. For example, a user may directly input his or her preferences through a GUI. A set of default values may also be employed. Default values may be pre-set or may be obtained by information apparatus 200 as result of communicating and negotiating with an output device 220 or output controller 230.

Figure 12:
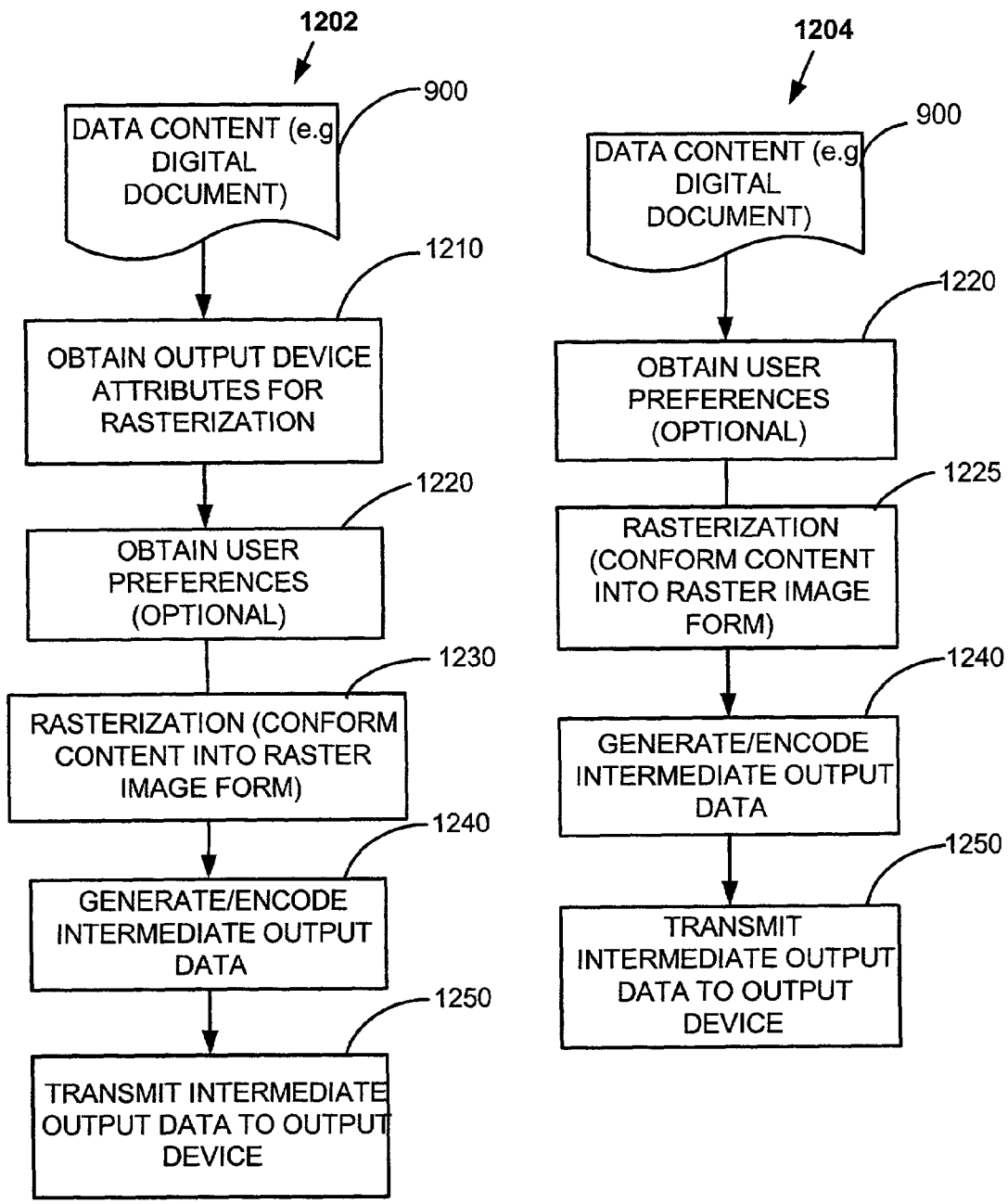
FIGS. 12A and 12B are flow diagrams of exemplary client application process included in the output process of FIG. 10.

The above functionalities and process of client application 210 of present invention are described in further detail in the client application process with reference to FIG. 12.

Output device 220 is an electronic system capable of outputting digital content regardless of whether the output medium is substrate (e.g., paper), display, projection, or sound. A typical example of output device 220 is a printer, which outputs digital documents containing text, graphics, image or any combination onto a substrate. Output device 220 may also be a display device capable of displaying still images or video, such as, without limitation, televisions, monitors, and projectors. Output device 220 can also be a device capable of outputting sound. Any device capable of playing or reading digital content in audio (e.g., music) or data (e.g., text or document) formats is also a possible output device 220.

A printer is frequently referred to herein as an example of an output device to simplify discussion or as the primary output device 220 in a particular implementation. However, it should be recognized that present invention applies also to other output devices 220 such as fax machines, digital copiers, display screens, monitors, televisions, projectors, voice output devices, among others.

Rendering content with an output device 220 refers to outputting the content on a specific output medium (e.g., papers, display screens etc). For example, rendering content with a printer generates an image on a substrate; rendering content with a display device generates an image on a screen; and rendering content with an audio output device generates sound.

A conventional printing system in general includes a raster image processor and a printer engine. A printer engine includes memory buffer, marking engine among other components. The raster image processor converts content into an image form suitable for printing; the memory buffer holds the rasterized image ready for printing; and the marking engine transfers colorant to substrate (e.g., paper).

The raster image processor may be located within an output device (e.g. included in a printer controller 410) or externally implemented (in an information apparatus 200, external controller, servers etc). Raster image processor can be implemented as hardware, software, or a combination (not shown). As an example, raster image processor may be implemented in a software application or device driver in the information apparatus 200. Examples of raster image processing operations include image and graphics interpretation, rasterization, scaling, segmentation, color space transformation, image enhancement, color correction, halftoning, compression etc.

FIG. 4A illustrates a block diagram of one conventional printing system or printer 400A that includes a printer controller 410 and a printer engine 420A. The printer controller 410 includes an interpreter 402 and a raster image processor 406, and the printer engine 420 includes memory buffer 424A and a marking engine 426A.

Marking engine may use any of a variety of different technologies to transfer a rasterized image to paper or other media or, in other words, to transfer colorant to a substrate. The different marking or printing technologies that may be used include both impact and non-impact printing. Examples of impact printing may include dot matrix, teletype, daisywheel, etc. Non-impact printing technologies may include inkjet, laser, electrostatic, thermal, dye sublimation, etc.

The marking engine 426 and memory buffer 424 of a printer form its printer engine 420, which may also include additional circuitry and components, such as firmware, software or chips or chipsets for decoding and signal conversion, etc. Input to a printer engine 420 is usually a final rasterized printer-engine print data generated by a raster image processor 406. Such input is usually device dependent and printer or printer engine specific. The printer engine 420 may take this device dependent input and generate or render output pages (e.g. with ink on a substrate).

When a raster image processor is located inside an output device 220, it is usually included in a printer controller 410 (as shown in FIG. 4A). A printer controller 410 may interpret, rasterize, and convert input print data in the form of a page description language (e.g., PostScript, PCL), markup language (e.g., XML, HTML) or other special document format or language (e.g. PDF, EMF) into printer-engine print data which is a final format, language or instruction that printer engine 420A can understand.

Print data sent to a printer with printer controller 410 is usually in a form (e.g. postscript) that requires further interpretation, processing or conversion. A printer controller 410 receives the print data, interprets, process, and converts the print data into a form that can be understood by the printer engine 420A. Regardless of the type of print data, conventionally, a user may need a device-specific driver in his or her information apparatus 200 in order to output the proper language, format, or file that can be accepted by a specific printer or output device 220.

FIG. 4B illustrates another conventional output device 400B. Output device 400B may be a printing device, a display device, a projection device, or a sound device. In the case that the output device is a printing device or a printer, the printer with reference to FIG. 4B does not include a printer controller 410. As an example, printer 400B may be a low-cost printer such as a desktop inkjet printer. RIP operations in this example may be implemented in a software application or in a device driver included in an information apparatus 200. The information apparatus 200 generates device dependent output data (or print data in case of a printer) by rasterizing and converting a digital document into output data (e.g. into a compressed CMKY data with one or more bits per pixel) that can be understood by an output engine (or printer engine in case of a printer) 420B.

Regardless of type or sophistication level, different output device 220 conventionally needs different printer drivers or output management applications in an information apparatus 200 to provide output capability. Some mobile devices with limited memory and processing power may have difficulty storing multiple device drivers or perform computational intensive RIP operations. It may also be infeasible to install a new device dependent or specific printer driver each time there is a need to print to a new printer. To overcome these difficulties, present invention provides several improvements to output device 220 or output system 250 as described in detail next.

In present invention, output device 220 may include an output controller 230 to help managing communication and negotiation processes with an information apparatus 200 and to process output data. Output controller 230 may include dedicated hardware or software or combination of both for at least one output device 220. Output controller 230 may be internally installed, or externally connected to one or more output devices 220. The output controller 230 is sometimes referred to as a print server or output server.

FIGS. 5A and 5B illustrate two exemplary internal implementations of the output controller 230 of present invention. FIG. 5A illustrates the implementation of an output controller 230 inside a conventional printer with reference to FIG. 4A, which includes a conventional printer controller 410 (5A). The output controller 230(5A) includes an interpreter 510A component for decoding the intermediate output data of present invention; and a converter component 530A for converting one or more decoded output images into a printer-controller print data that is suitable for input to the printer controller 410(5A). An optional image processing component 520A may be included in the output controller 230(5A).

FIG. 5B illustrates the implementation of an output controller 230 included internally in a conventional output device 220 with reference to FIG. 4B, which does not include a printer controller. The output controller 230(5B) includes an interpreter 510B component for decoding the intermediate output data of present invention; an image processor 520B component for performing one or more image processing operations such as color space conversion, color matching and digital halftoning; and an optional encoder 530B component to conform the processed output images into an output-engine output data that is suitable for input to the output engine 420B if the result of the image processing is not already in required form suitable for the output engine 420B.

In one implementation, output device 220 may include a communication unit 550 or adapter to interface with information apparatus 200. Output device 220 may sometimes include more than one communication unit 550 in order to support different interfaces, protocols, or communication standards with different devices. For example, output device 220 may communicate with a first information apparatus 200 through a Bluetooth interface while communicating with a second information apparatus 200 through a parallel interface. Examples of hardware components of a wireless communication unit are described in greater detail below with reference to FIGS. 8A and 8B.

Figure 5:
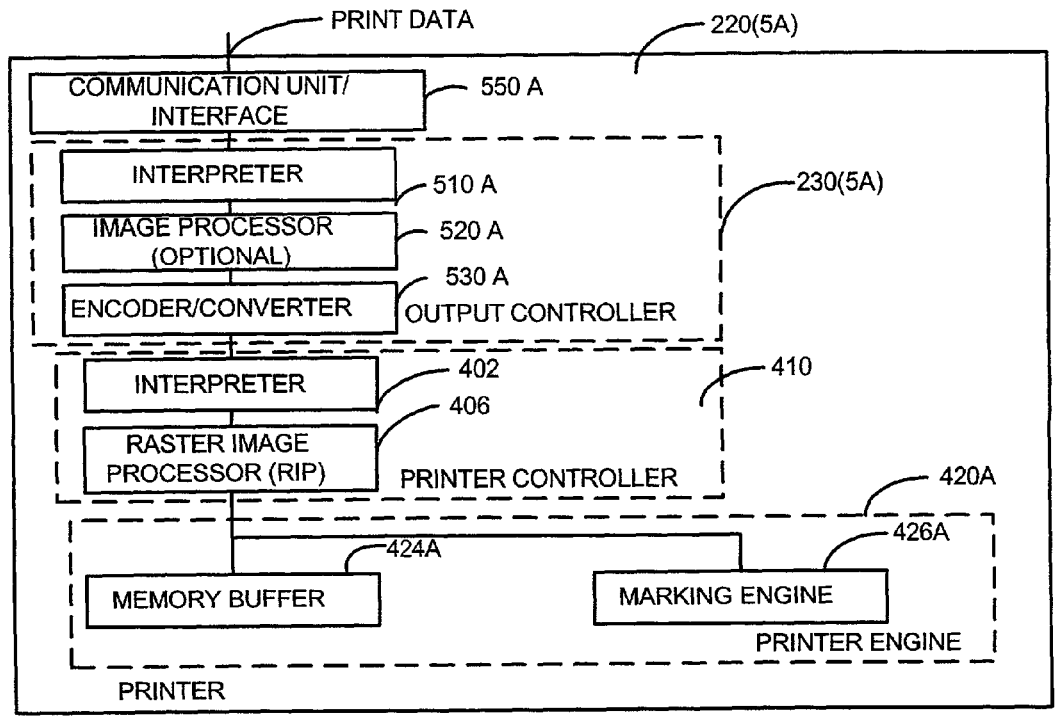
FIG. 5A is a schematic block diagram of a printing system or printer with a conventional printer controller and an output controller in accordance with present invention.
FIG. 5B is a schematic block diagram of a second output system or output device that includes an output controller in accordance with present invention.
Figure 5:
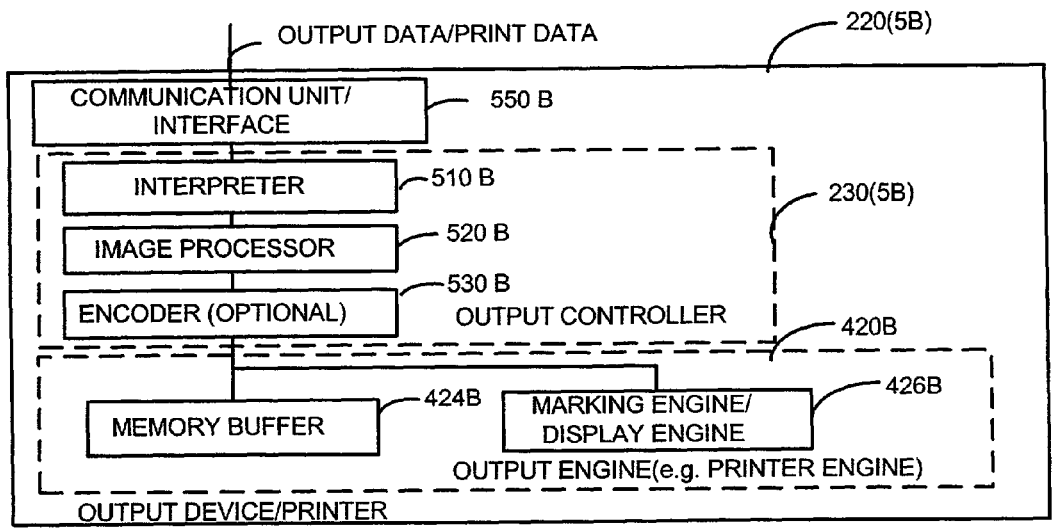
Figure 6:
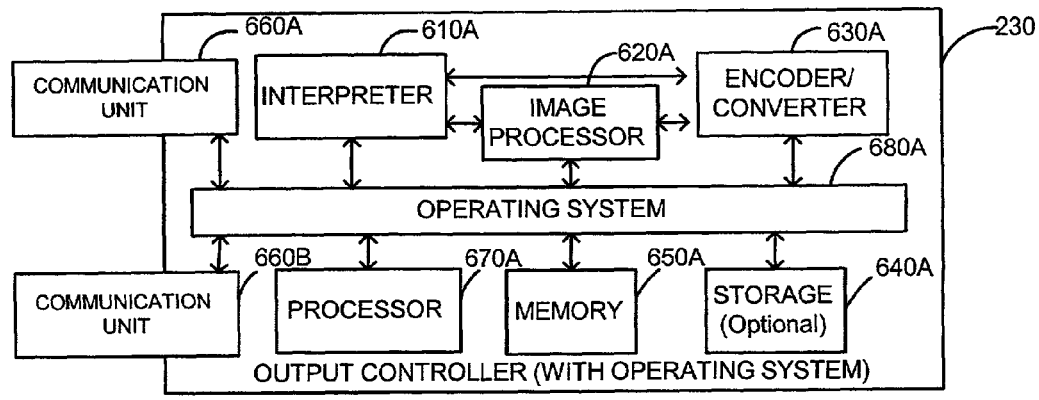
FIG. 6A is a schematic block diagram illustrating hardware/software components of an output controller in accordance with present invention. The output controller includes an operating system.
FIG. 6B is a second schematic block diagram illustrating hardware/software components of an output controller in accordance with present invention. The output controller does not include an operating system.
FIG. 6C is a third schematic block diagram illustrating hardware/software components of an output controller in accordance with present invention. The output controller combines the functionality of a printer controller and an output controller of present invention.
Figure 6:
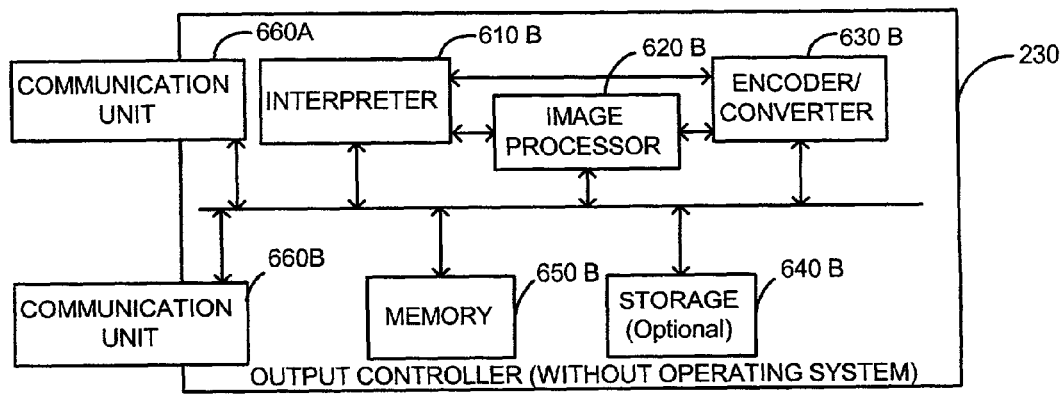
Figure 6:
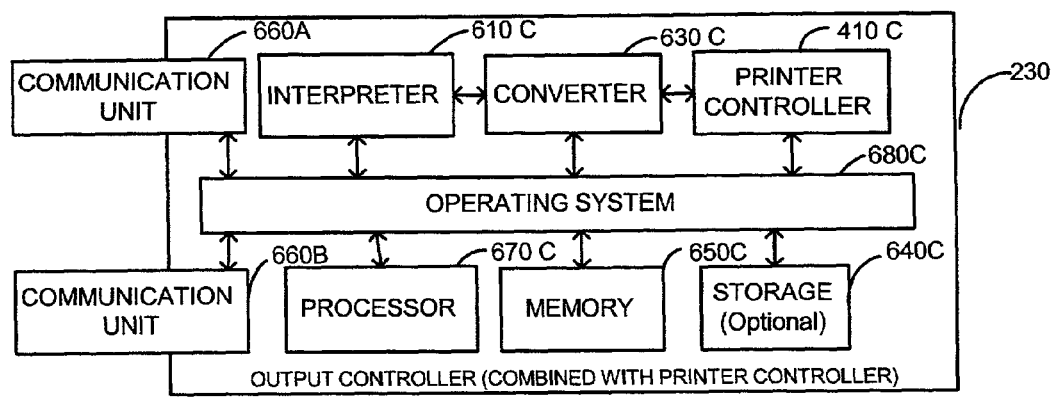

In one embodiment, output controller 230 does not include a communication unit, but rather utilizes or manages a communication unit residing in the associated output device 220 such as the illustration in FIG. 5. In another embodiment, output controller 230 may include or provide a communication unit to output device 220 as shown in FIG. 6. For example, an output controller 230 with a wireless communication unit may be installed internally or connected externally to a legacy printer to provide it with wireless communication capability that was previously lacking.

FIG. 6 includes three functional block diagrams illustrating the hardware/software components of output controller 230 in three different implementations. Each components of an output controller 230 may include software, hardware, or combination. For example, an output controller 230 may include components using one or more or combinations of an application-specific integrated circuit (ASIC), a digital signal processor (DSP), a field programmable gate array (FPGA), firmware, system on a chip, and various communication chip sets. Output controller 230 may also contain embedded processors 670 A with software components or embedded application software to implement its feature sets and functionalities.

Output controller 230 may contain an embedded operating system 680. With an operating system, some or all functionalities and feature sets of the output controller 230 may be provided by application software managed by the operating system. Additional application software may be installed or upgraded to newer versions in order to, for example, provide additional functionalities or bug fixes. FIG. 6A and FIG. 6C illustrates examples of implementation with an operating system 680 while FIG. 6B illustrates an example without the operating system 680 or the optional embedded processor 670.

Output controller 230 typically includes a memory unit 640, or may share a memory unit with, for example, printer controller 410. The memory unit and storage unit, such as ROM, RAM, flash memory and disk drive among others, may provide persistent or volatile storage. The memory unit or storage unit may store output device profiles, objects, codes, instructions or data (collectively referred to as software components) that implement the functionalities of the output controller 230. Part of the software components (e.g., output device profile) may be uploaded to information apparatus 200 during or before a data output operation.

An output controller 230 may include a processor component 670A and 670C, a memory component 650, an optional storage component 640, and an optional operating system component 680. FIG. 6 shows one architecture or implementation where the memory 650, storage 640, processor 670, and operating system 680 components, if exist, can be share or accessed by other operational components in the output controller 230 such as the interpreter 610 and image processor 650. FIG. 6 shows two communication units 660A and 660B included in the output controller 230; however, the output controller 230 of present invention may include any number of communication units 660. It is also possible that the output controller does not contain any communication unit but rather utilizes the communication unit of an output device.

The output controller 230 may be connected externally to an output device 220 or integrated internally into the output device 220. FIGS. 5A and 5B illustrate implementations of output controller 230 inside an output device 220. The output controller 230, however, may also be implemented as an external box or station that is wired or wirelessly connected to an output device 220. An output controller 230 implemented as an external box or station to an output device 220 may contain its own user interface. One example of such an implementation is a print server connected to an output device 220 in an output system 250. Another configuration and implementation is to integrate or combine the functionalities of an output controller 230 with an existing printer controller 410 (referred to as "combined controller") if the output device 220 is a printer as shown with reference to FIG. 7C or 7F. A combined controller can also be internally integrated or externally connected to output device 220, and include functionalities of both printer controller 410 (e.g., input interpretation and or raster image processing) and output controller 230 of present invention. One advantage of this configuration is that the functionalities or components of output controller 230 and printer controller 410 may share the same resources, such as processing unit, memory unit, etc. FIG. 6C illustrates an example of a combined controller implementation or output controller 230 where the printer controller 410C, interpreter 610C and converter 630C shares the use of the processor 670C, memory 650C and storage 640C, managed by an operating system 680C. Various exemplary implementations and configurations of an output controller 230 with respect to an output device 220 or output system 250 are illustrated in further detail with reference to FIG. 7.

Other possible implementations of output controller 230 may include, for example, a conventional personal computer (PC), a workstation, and an output server or print server. In these cases, the functionalities of output controller 230 may be implemented using application software installed in a computer (e.g., PC, server, or workstation), with the computer connected with a wired or wireless connection to an output device 220. Using a PC, server, workstation, or other computer to implement the feature sets of output controller 230 with application software is just another possible embodiment of the output controller 230 and in no way departs from the spirit, scope and process of the present invention.

The difference between output controller 230 and printer controller 410 should be noted. Printer controller 410 and output controller 230 are both controllers and are both dedicated hardware and or software for at least one output device 220. Output controller 230 refers to a controller with feature sets, capabilities, and functionalities of the present invention. A printer controller 410 may contain functions such as interpreting an input page description language, raster image processing, and queuing, among others. An output controller 230 may include part or all of the features of a printer controller 410 in addition to the feature sets, functionalities, capabilities, and processes of present invention.

Functionalities and components of output controller 230 for the purpose of providing universal data output may include or utilize:

Components and operations to receive output data from a plurality of information apparatus 200; the output data may include an intermediate output data containing at least one rasterized image related to the data content intended for output.

Components and operations to interpret and/or decode the intermediate output data.

Components and operations to process the intermediate output data. Such components and operations may include image processing functions such as scaling, segmentation, color correction, color management, GCR, image enhancement, decompression, decryption, and or halftoning among others.

Components and operations to generate an output-engine output data, the output-engine output data being in an output data format acceptable for input to an output engine.

Components and operations to send the output-engine output data to the output engine.

When associated with an output device 220 that includes a printer controller 410, the output controller of present invention may further include or utilize:

Components and operations to convert the intermediate output data into a printer-controller print data (e.g. a PDL such as PostScript and PCL), the printer-controller print data being in a format acceptable to a printer controller.

Components and operations to send printer-controller print data to one or more printer controllers.

In addition to the above components and functionalities, output controller 230 may further include one or more of the following:

Components and operations to communicate with one or more information apparatus 200 through a wired or wireless interface.

Components and operations to communicate and or manage a communication unit included in the output controller 230 or output device 220.

Components and operations to store at least part of an output device profile (a printer profile in case of a printer) in a memory component.

Components and operations to respond to service request from an information apparatus 200 by transmitting at least part of an output device profile to the information apparatus requesting service. The output controller 230 may transmit the output device profiles or object in one or multiple sessions.

Components and operations to broadcast or advertise the services provided by a host output device 220 to one or more information apparatus 200 that may request such services.

Components and operations to implement payment processing and management functions by, for example, calculating and processing payments according to the services requested or rendered to a client (information apparatus 200).

Components and operations to provide a user interface such as display screen, touch button, soft key, etc.

Components and operations to implement job management functions such as queuing and spooling among others.

Components and operations to implement security or authentication procedures. For example, the output controller 230 may store in its memory component (or shared memory component) an access control list, which specifies what device or user may obtain service from its host (or connected) output device 220. Therefore, an authorized information apparatus 200 may gain access after confirming with the control list.

When output controller 230 is implemented as firmware, or an embedded application, the configuration and management of the functionalities of output controller 230 may be optionally accomplished by, for example, using controller management software in a host computer. A host computer may be a desktop personal computer (PC), workstation, or server. The host computer may be connected locally or through a network to the output device 220 or the controller 230. Communication between the host computer and the output controller 230 can be accomplished through wired or wireless communication. The management application software in the host computer can manage the settings, configurations, and feature sets of the output controller 230. Furthermore, host computer's configuration application may download and or install application software, software components and or data to the output controller 230 for the purpose of upgrading, updating, and or modifying the features and capabilities of the output controller 230.

Output device 220 in one implementation includes or is connected to output controller 230 described above. Therefore, functionalities and feature sets provided by output controller 230 are automatically included in the functionalities of output device 220. The output device 220 may, however, implement or include other controllers and/or applications that provide at least partially the features and functionalities of the output controller 230.

Therefore, the output device 220 may include some or all of the following functionalities:

Components and operations to receive multiple service requests or queries (e.g., a service request, a data query, an object or component query etc.) from a plurality of information apparatus 200 and properly respond to them by returning components, which may contain data, software, instructions and/or objects.

Components and operations to receive output data from a plurality of information apparatus 200; the output data may include an intermediate output data containing one or more rasterized image related to the content intended for output.

Components and operations to interpret and/or decoding the intermediate output data.

Components and operations to process and/or convert the intermediate output data into a form (e.g. output-engine print data) suitable for rendering at an output engine associated with the output device.

Components and operations to render a representation or an image related to the content onto an output medium (e.g. substrate or a display screen).

An output device 220 may further comprise optionally one or more of the following functionalities:

Components and operations for establishing and managing a communication link with an information apparatus 200 requesting service; the communication link may include wired or wireless communication.

Components and operations for storing at least part of an output device profile (e.g. printer profile) in a memory component.

Components and operations to provide at least part of an output device profile (e.g., printer profile in case of a printer) to one or more information apparatus 200 requesting service. The output device 220 may transmit the output device profile in one or multiple sessions.

Components and operations to advertise or broadcast services provided or available to one or more information apparatus 200.

Components and operations to implement payment processing and management functions by, for example, calculating and processing payments according to the services requested by or rendered to a client (information apparatus 200).

Components and operations to implement job management functionalities such as queuing and spooling among others.

Components and operations to provide a user interface such as display screen touch button, soft key, power switch, etc.

Components and operations to implement security or authentication procedures. For example, the output device 220 may store in its memory component (or a shared memory component) an access control list, which specifies what device or user may obtain service from it. Therefore, an authorized information apparatus 200 may gain access after confirming with the control list.

FIGS. 7A-7F illustrate various alternative configurations and implementations of output controller 230 with respect to an output device 230. Printer is sometimes used as an exemplary output device 230 to demonstrate the various configurations. It should be understood, however, the output device 230 of present invention is not limited to printers.

Figure 4:
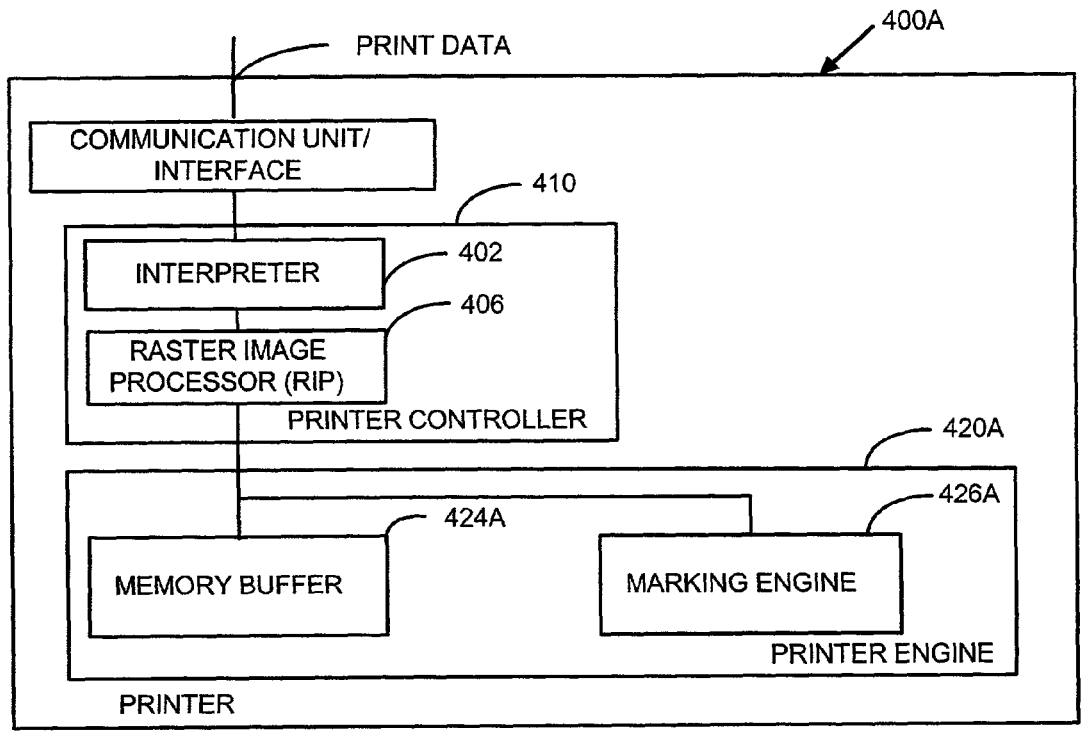
FIG. 4A is a block diagram of a conventional printing system or printer with a conventional printer controller.
FIG. 4B is a block diagram of a second conventional output system or output device.
Figure 4:
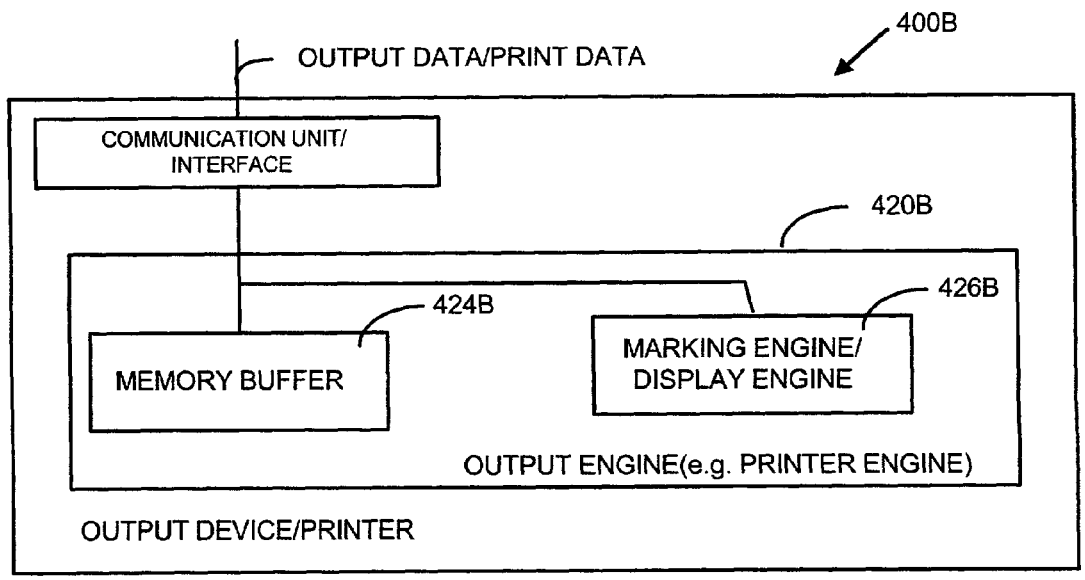

As described with reference to FIG. 4., a printer may or may not contain a printer controller 410. Printer 400A that includes a printer controller 410 typically has higher speed and is more expensive than printer 400B which does not include a printer controller 410.

Figure 7A:
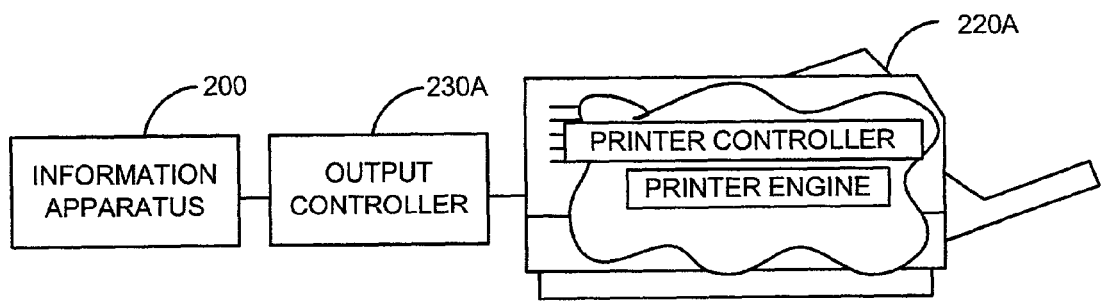
FIGS. 7A-7F illustrate various configurations and implementations of output controller with respect to an output device such as a printer.

FIG. 7A shows that output controller 230 may be cascaded externally to one or more printers (only one shown).

Information apparatus 200 communicates with output controller 230A, which then communicates with output device 220 such as a printer 220A. The communication link between the output controller 230A and the printer 220A may be a wired link or a wireless link, as described above. FIG. 6A and 6B illustrates two examples of functional component design of the output controller that can implement the configuration illustrated in FIG. 7A. The Image processor 620 in this implementation is optional.

Figure 7B:
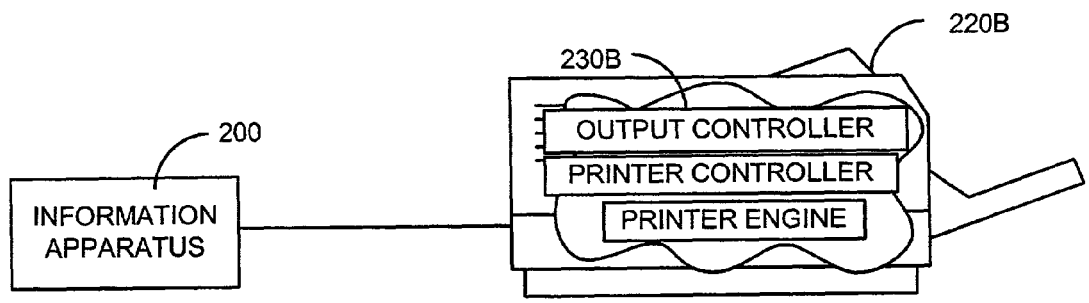

FIG. 7B shows another implementation in which output controller 230B is installed as one or more circuit boards or cards internally inside printer 220B. The output controller 230B may co-exist with printer controller 410 and other components of the printer 220B. One example of this implementation is to connect output controller 230B sequentially with the printer controller 310. FIG. 5A shows as an example of an implementation.

Figure 7C:
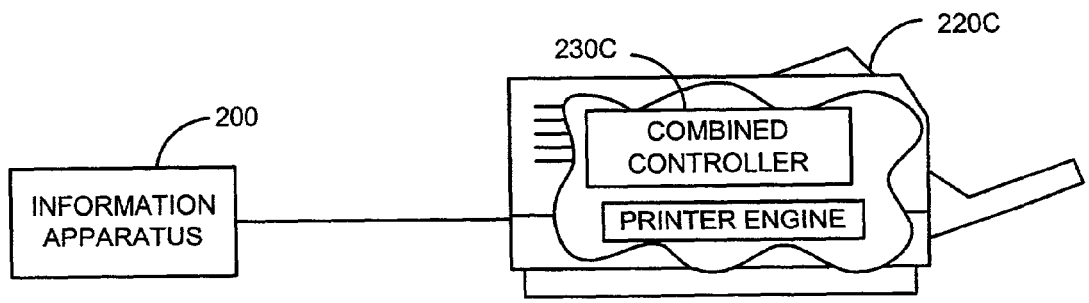

FIG. 7C shows another implementation in which the functionalities of output controller 230 and printer controller 410 are combined into a single controller (referred to as "combined controller") 230C. In this implementation, it is possible to reduce the cost of material when compared to implementing two separate controllers as shown in FIG. 7B. As an example, the combined controller 230C may share the same processors, memories, and storages to run the applications and functionalities of the two types of controllers and therefore, may have lower component costs when compared to providing two separate controllers. FIG. 6C illustrates an example of a combined controller functional component implementation.

Some printers do not include a raster image processor or printer controller 410, as illustrated in FIG. 4B. An example of this type of printer is a lower cost desktop inkjet printer. Input to an inkjet printer may consist of a compressed CMYK data (proprietary or published) with one or more bits per pixel input. To output to a printer that does not include a printer controller, a device specific software application or a printer driver is typically required in an information apparatus 200 to perform raster image processing operations. Accordingly, output controller 230 can be implemented into a variety of output devices 220 and/or output systems 250 including printers that do not have printer controllers for performing raster image processing operations.

Figure 7D:
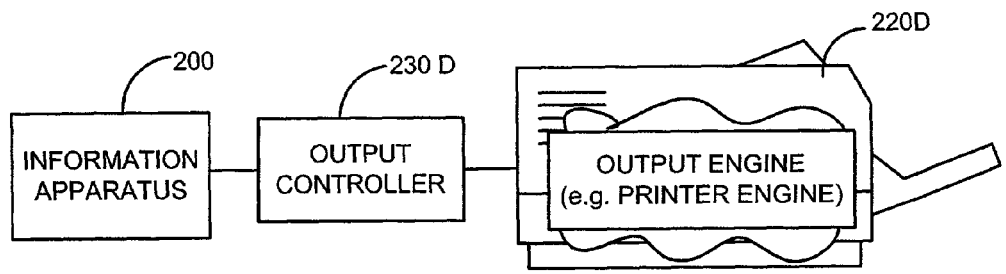
Figure 7E:
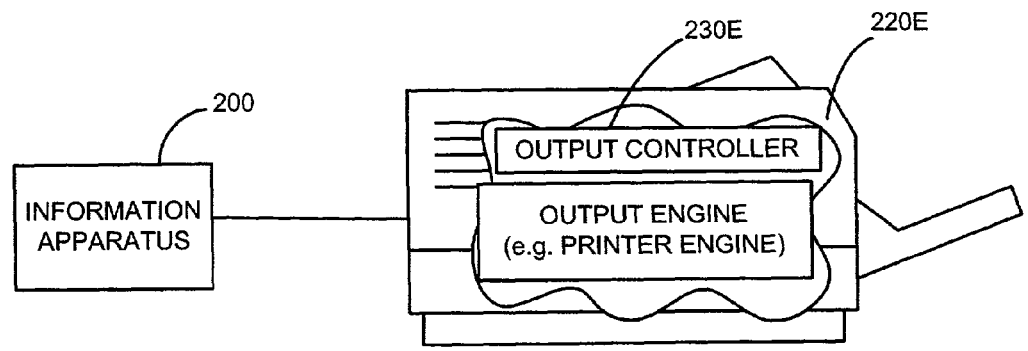

FIG. 7D and FIG. 7E illustrate two implementations of output controller 230 in an output device 220 or system 250. The output device 230 or system 250 may include a display device, a projection device, an audio output device or a printing device. In the case when the output device 220D or 220E is a printer, it does not include a printer controller. FIG. 7D illustrates an implementation of an output controller 230D installed as an external component or "box" to output device 220D. For example, the output controller 230 may be implemented as an application in a print server or as a standalone box or station. In this configuration, some or all of raster image processing operations may be implemented in the output controller 230D. Output controller 230D receives intermediate output data from an information apparatus 200 and generates output-engine output data that is acceptable to the output engine included in the output device 220D. The output controller 230D may send the output data to the output device 220D through a wired or wireless communication link or connection. FIGS. 6A and 6B illustrates two example of functional component design of the output controller that can implement the configurations for both FIGS. 7D and 7E.

FIG. 7E shows a fifth implementation of output controller 230E in which the output controller 230E is incorporated within output device 220E as one or more circuit boards or cards and may contain software and applications running on an embedded processor. As with output device 220D (FIG. 7D), output device 220E does not include a printer controller 410. Accordingly, the output controller 230E implements the functionalities and capabilities of present invention that may include part of or complete raster imaging processing operation.

Figure 7F:
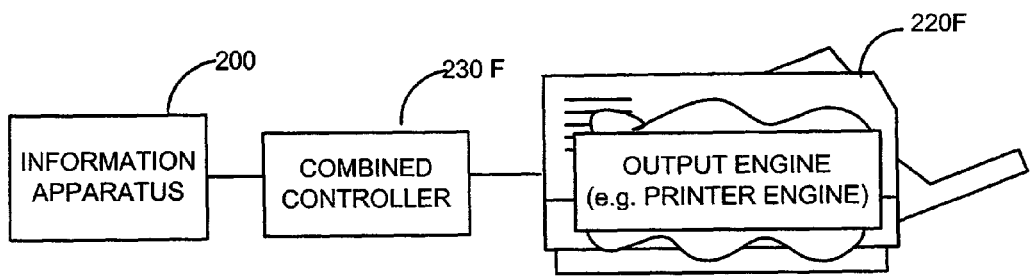

FIG. 7F shows a sixth implementation, an external combined controller 230F that integrates the functionalities of a printer controller 310 and an output controller into a single external combined controller component or "box" 230F. The two controller functions may share a common processor as well as a common memory space to run applications of the two types of controllers. Under this configuration, either information apparatus 200 or the combined controller 230F could perform or share at least part of raster image processing functionality. FIG. 6C shows an example of functional components of a combined controller 230F.

Another implementation of the combined controller 230F shown in FIG. 7F is to use an external computing device (PC, workstation, or server) running one or more applications that include the functionality of output controller 230 and printer controller 410.

The above are examples of different implementations and configurations of output controller 230. Other implementations are also possible. For example, partial functionalities of output controller 230 may be implemented in an external box or station while the remaining functionalities may reside inside an output device 220 as a separate board or integrated with a printer controller 410. As another example, the functionalities of output controller 230 may be implemented into a plurality of external boxes or stations connected to the same output device 220. As a further example, the same output controller 230 may be connected to service a plurality of output devices 220

Figure 8A:
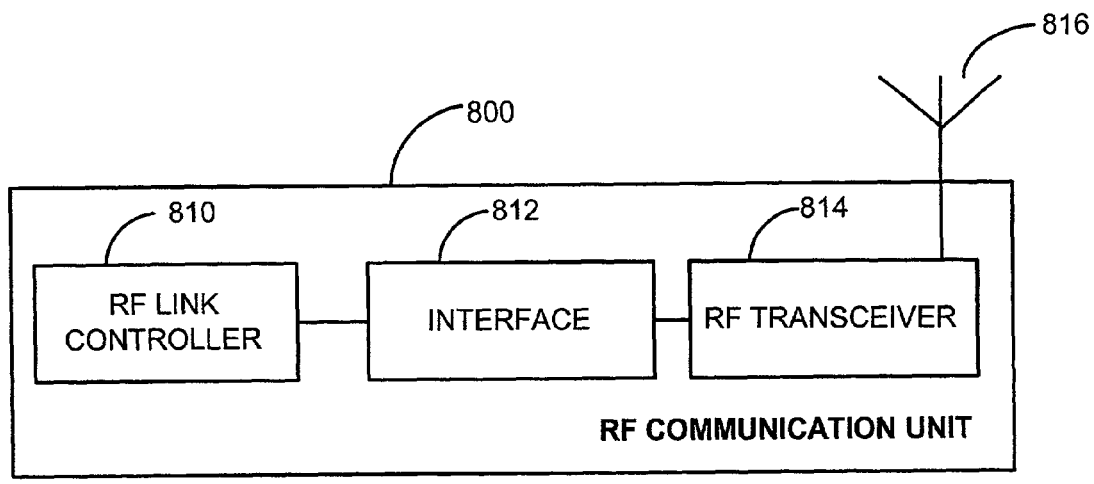
FIG. 8A is a block diagram illustrating an exemplary implementation of hardware/software components of wireless communication unit.
Figure 8B:
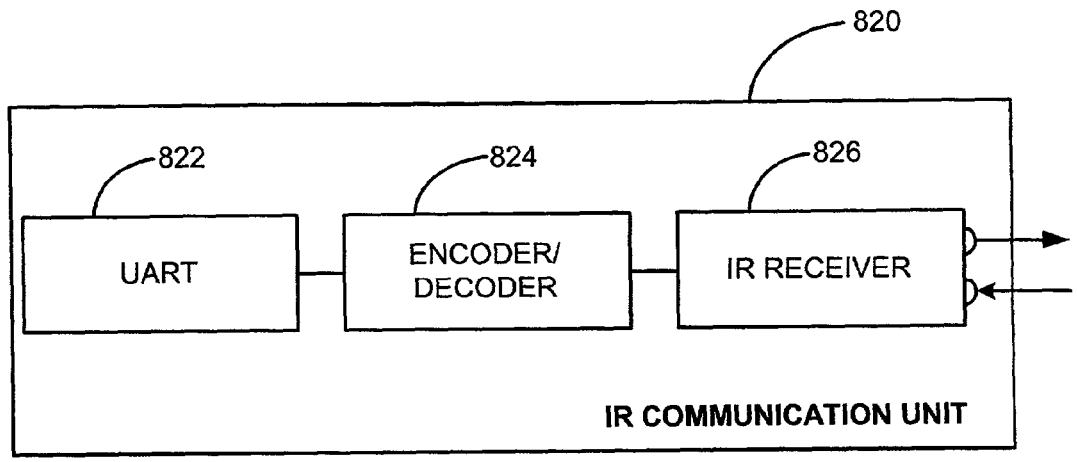
FIG. 8B is block diagram illustrating a second exemplary implementation of hardware/software components of wireless communication unit.

FIGS. 8A and 8B are block diagrams illustrating two possible configurations of hardware/software components of wireless communication units. These wireless communication units can be implemented and included in information apparatus 200, in output controller 230 and in output device 220. Referring to FIG. 8A, a radio adapter 800 may be implemented to enable data/voice transmission among devices (e.g., information apparatus 200 and output device 220) through radio links. An RF transceiver 814 coupled with antenna 816 is used to receive and transmit radio frequency signals. The RF transceiver 814 also converts radio signals into and from electronic signals. The RF transceiver 814 is connected to an RF link controller 810 by an interface 812. The interface 812 may perform functions such as analog-to-digital conversion, digital-to-analog conversion, modulation, demodulation, compression, decompression, encoding, decoding, and other data or format conversion functions.

RF link controller 810 implements real-time lower layer (e.g., physical layer) protocol processing that enables the hosts (e.g., information apparatus 200, output controller 230, output device 220, etc.) to communicate over a radio link. Functions performed by the link controller 810 may include, without limitation, error detection/correction, power control, data packet processing, data encryption/decryption and other data processing functions.

A variety of radio links may be utilized. A group of competing technologies operating in the 2.4 GHz unlicensed frequency band is of particular interest. This group currently includes Bluetooth, Home radio frequency (Home RF) and implementations based on IEEE 802.11 standard. Each of these technologies has a different set of protocols and they all provide solutions for wireless local area networks (LANs). Interference among these technologies could limit deployment of these protocols simultaneously. It is anticipated that new local area wireless technologies may emerge or that the existing ones may converge. Nevertheless, all these existing and future wireless technologies may be implemented in the present invention without limitation, and therefore, in no way depart from the scope of present invention.

Among the currently available wireless technologies, Bluetooth may be advantageous because it requires relatively lower power consumption and Bluetooth-enabled devices operate in piconets, in which several devices are connected in a point-to-multipoint system. Referring to FIG. 8B, one or more infrared (IR) adapters 820 may be implemented to enable data transmission among devices through infrared transmission. The IR adapters 820 may be conveniently implemented in accordance with the Infrared Data Association (IrDA) standards and specifications. In general, the IrDA standard is used to provide wireless connectivity technologies for devices that would normally use cables for connection. The IrDA standard is a point-to-point (vs. point-to-multipoint as in Bluetooth), narrow angle, ad-hoc data transmission standard.

Configuration of infrared adapters 820 may vary depending on the intended rate of data transfer. FIG. 8B illustrates one embodiment of infrared adapter 820. Transceiver 826 receives/emits IR signals and converts IR signals to/from electrical signals. A UART (universal asynchronous receiver/transmitter) 822 performs the function of serialization/deserialization, converting serial data stream to/from data bytes. The UART 822 is connected to the IR transceiver 826 by encoder/decoder (ENDEC) 824. This configuration is generally suitable for transferring data at relatively low rate. Other components (e.g., packet framer, phase-locked loop) may be needed for higher data transfer rates.

FIGS. 8A and 8B illustrate exemplary hardware configurations of wireless communication units. Such hardware components may be included in devices (e.g., information apparatus 200, output controller 230, output device 220, etc.) to support various wireless communications standards. Wired links, however, such as parallel interface, USB, Firewire interface, Ethernet and token ring networks may also be implemented in the present invention by using appropriate adapters and configurations.

Figure 9:
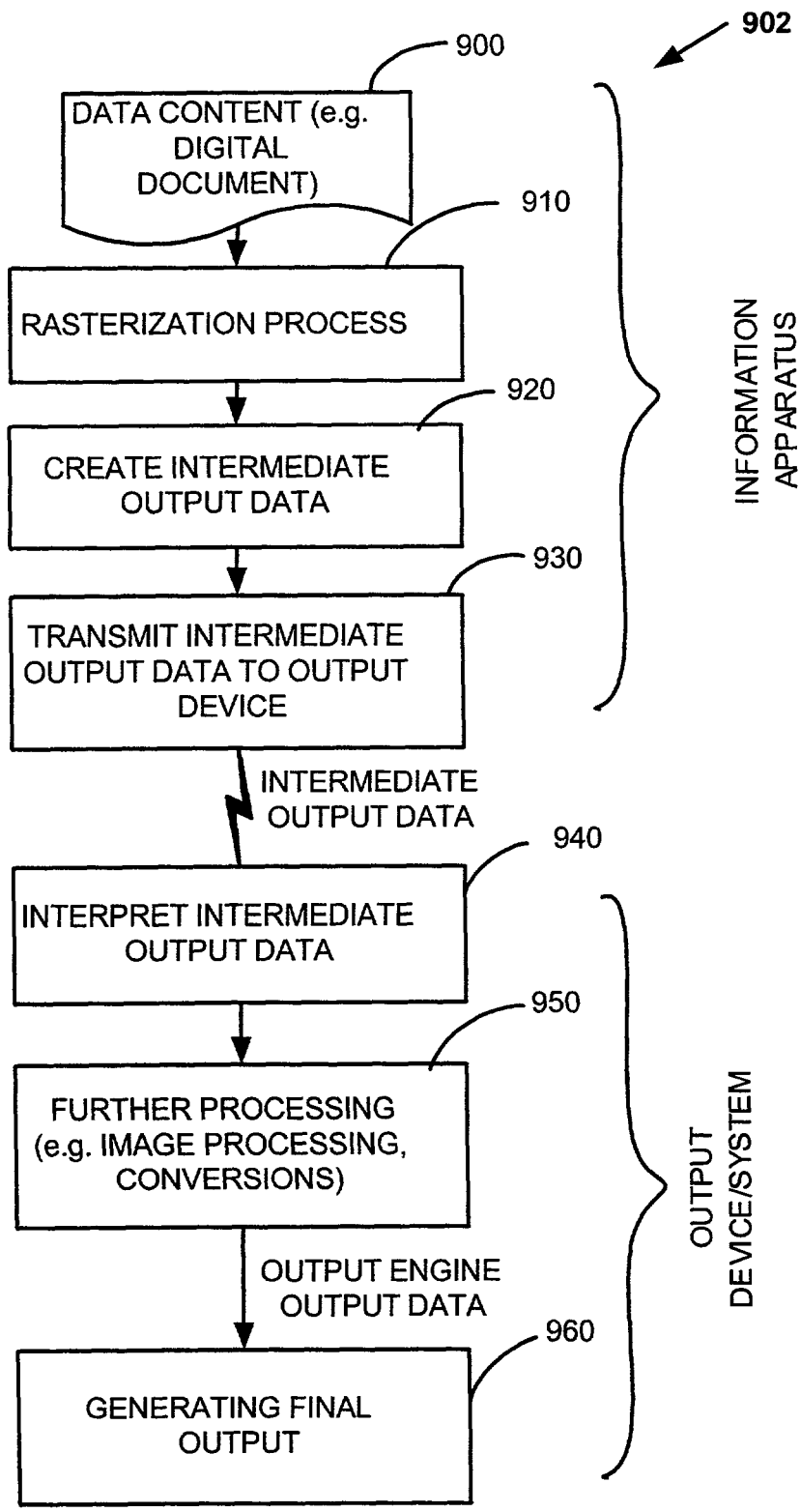
FIG. 9 is a flow diagram of a universal data output method and its corresponding raster imaging process of the present invention.

FIG. 9 is a logic flow diagram of an exemplary raster imaging process (RIP) 902 that can implement the universal output method of present invention. Content (e.g. digital document) 900 may be obtained and/or generated by an application running in an information apparatus 200. For example, a document browsing application may allow a user to download and or open digital document 900 stored locally or in a network node. As another example, a document creating or editing application may allow a user to create or edit digital documents in his/her information apparatus 200.

A client application 210 in the information apparatus may be in the form of a device driver, invoked by other applications residing in the information apparatus 200 to provide output service. Alternatively, the client application 210 of present invention may be an application that includes data output and management component, in addition of other functionalities such as content acquisitions, viewing, browsing, and or editing etc. For example, a client application 210 in an information apparatus 200 may itself include components and functions for a user to download, view and or edit digital document 900 in addition of the output management function described herein.

Raster image process method 902 allows an information apparatus 200 such as a mobile device to pervasively and conveniently output content (e.g. a digital document) to an output device 220 or system 250 that includes an output controller 230. A client application 210 in an information apparatus 200 may perform part of raster image processing operations (e.g. rasterization operation). Other operations of raster image processing such as halftoning can be completed by the output device 220 or by the output controller 230. In conventional data output methods, raster image processing is either implemented entirely in an information apparatus (e.g. a printer that does not include a printer controller with reference to FIG. 1A) or in an output device (e.g. a printer that includes a printer controller with reference to FIG. 1B). Present invention provides a more balanced approach where raster image process operations are shared between an information apparatus 200 and an output device 220 or system 250. For example, content 600 may be processed (e.g. raster image processed) by different components or parts of an overall output system from a client application 210 to an output controller 230 before being sent to an output engine or a printer engine for final output in step 960. Because the raster image processing operations are not completely implemented in the information apparatus 200, there is less processing demand on the information apparatus 200. Therefore, present RIP process may enable additional mobile devices with less memory and processing capability to have data output capability.

In step 910, rasterization operation, a content (e.g. digital document), which may include text, graphics, and image objects, is conformed or rasterized to image form according to one or more rasterization parameters such as output size, bit depth, color space, resolution, number of color channels etc. During the rasterization operation, text and vector graphics information in the content are rasterized or converted into image or bitmap information according to a given set of rasterization parameters. Image information in the content or digital document may be scaled and or interpolated to fit a particular output size, resolution and bit depth etc. The rasterization parameters are in general device dependent, and therefore may vary according to different requirements and attributes of an output device 220 and its output engine. There are many ways to obtain device dependent rasterization parameters, as described in more detail below with reference to FIG. 12A. Device dependent rasterization parameters, in one example, may be obtained from an output device profile stored in an information apparatus 200, an output device 220 or an output controller 230.

In an alternative implementation, rasterization parameters may be predetermined by a standard or specification. In this implementation, in step 910 the content 900 is rasterized to fit or match this predefined or standard rasterization parameters. Therefore, the rasterized output image becomes device independent. One advantage of being device independent is that the rasterized output image is acceptable with controllers, devices and/or output devices implemented or created with the knowledge of such standard or specification. A rasterized image with predefined or standardized attributes is usually more portable. For example, both the client application 210 and output device 220 or its output controller 230 may be preprogrammed to receive, interpret, and or output raster images based on a predefined standard and/or specification.

Occasionally, a predefined standard or specification for rasterization parameters may require change or update. One possible implementation for providing an easy update or upgrade is to store information and related rasterization parameters in a file or a profile instead of hard coding these parameters into programs, components or applications. Client application 210, output controller 230, and/or the output device 220 can read a file or a profile to obtain information related to rasterization parameters. To upgrade or update the standard specification or defaults requires only replacing or editing the file or the profile instead of replacing a software application or component such as the client application 210.

In step 920 the rasterized content in image form is encoded into an intermediate output data. The intermediate output data, which describes the output content, may include image information, instructions, descriptions, and data (e.g. color profile). The rasterized output image may require further processing including one or more of compression, encoding, encryption, smoothing, image enhancement, segmentation, color correction among others before being stored into the intermediate output data. The output image in the intermediate output data may be encoded in any image format and with any compression technique such as JPEG, BMP, TIFF, JBIG etc. In one preferred embodiment, a mixed raster content (MRC) format and its related encoding and/or compression methods are used to generate the output image. The advantages of using MRC over other image formats and techniques may include, for example, better compression ratio, better data information retention, smaller file size, and or relatively better image quality among others.

In step 930, the intermediate output data is transmitted to the output device 220 or output system 250 for further processing and final output. The transmission of the intermediate output data may be accomplished through wireless or wired communication links between the information apparatus 200 and the output device 220 and can be accomplished through one or multiple sessions.

In step 940, the output device 220 or output system 250 receives the transmitted intermediate output data. The output device 220 or output system 250 may include an output controller 230 to assist communicating with the information apparatus 200 and/or processing the intermediate output data. Output controller 230 may have a variety of configurations and implementations with respect to output device 220 as shown in FIG. 7A-7F. Interpretation process 940 may include one or more of parsing, decoding, decompression, decryption, image space conversion among other operations if the received intermediate output data requires such processing. An output image is decoded or retrieved from the intermediate output data and may be temporarily stored in a buffer or memory included in the output device/output system (220/250) or output controller 230 for further processing.

If the intermediate output data includes components with MRC format or encoding techniques, it may contain additional segmented information (e.g. foreground and background), which can be used to enhance image quality. For example, different techniques or algorithms in scaling, color correction, color matching, image enhancement, anti-aliasing and or digital halftoning among others may be applied to different segments or layers of the image information to improve output quality or maximize retention or recovery of image information. Multiple layers may later be combined or mapped into a single layer. These image processing and conversion components and/or operations can be included in the output controller 230 of present invention.

In step 950, the decoded or retrieved output image from the intermediate output data may require further processing or conversion. This may include one or more of scaling, segmentation, interpolation, color correction, GCR, black generation, color matching, color space transformation, anti-aliasing, image enhancement, image smoothing and or digital halftoning operations among others.

In an embodiment where the output device 220 does not include a printer controller, an output controller 230 or an output device 220 that includes output controller, after performing the remaining portion of RIP operations (e.g. color space conversion and halftoning) on the output image, may further convert the output data in step 950 into a form that is acceptable for input to a printer engine for rendering.

In an alternative embodiment where the output device 220 or the output system 250 includes a conventional printer controller, the output controller may simply decodes and or converts the intermediate output data (print data in this example) into format or language acceptable to the printer controller. For example, a printer controller may require as input a page description language (e.g. PostScript, PCL, PDF, etc.), a markup language (HTML, XML etc) or other graphics or document format. In these cases, the output controller 230 may interpret, decompress and convert the intermediate print data into an output image that has optimal output resolution, bit depth, color space, and output size related to the printer controller input requirements. The output image is then encoded or embedded into a printer-controller print data (e.g. a page description language) and sent to the printer controller. A printer-controller print data is a print data that is acceptable or compatible for input to the printer controller. After the printer controller receives the printer-controller print data, the printer controller may further perform operations such as parsing, rasterization, scaling, color correction, image enhancement, halftoning etc on the output image and generate an appropriate printer-engine print data suitable for input to the printer engine.

In step 960, the output-engine output data or printer-engine print data generated by the output controller 230 or the printer controller in step 950 is sent to the output engine or printer engine of the output device for final output.

Figure 10:
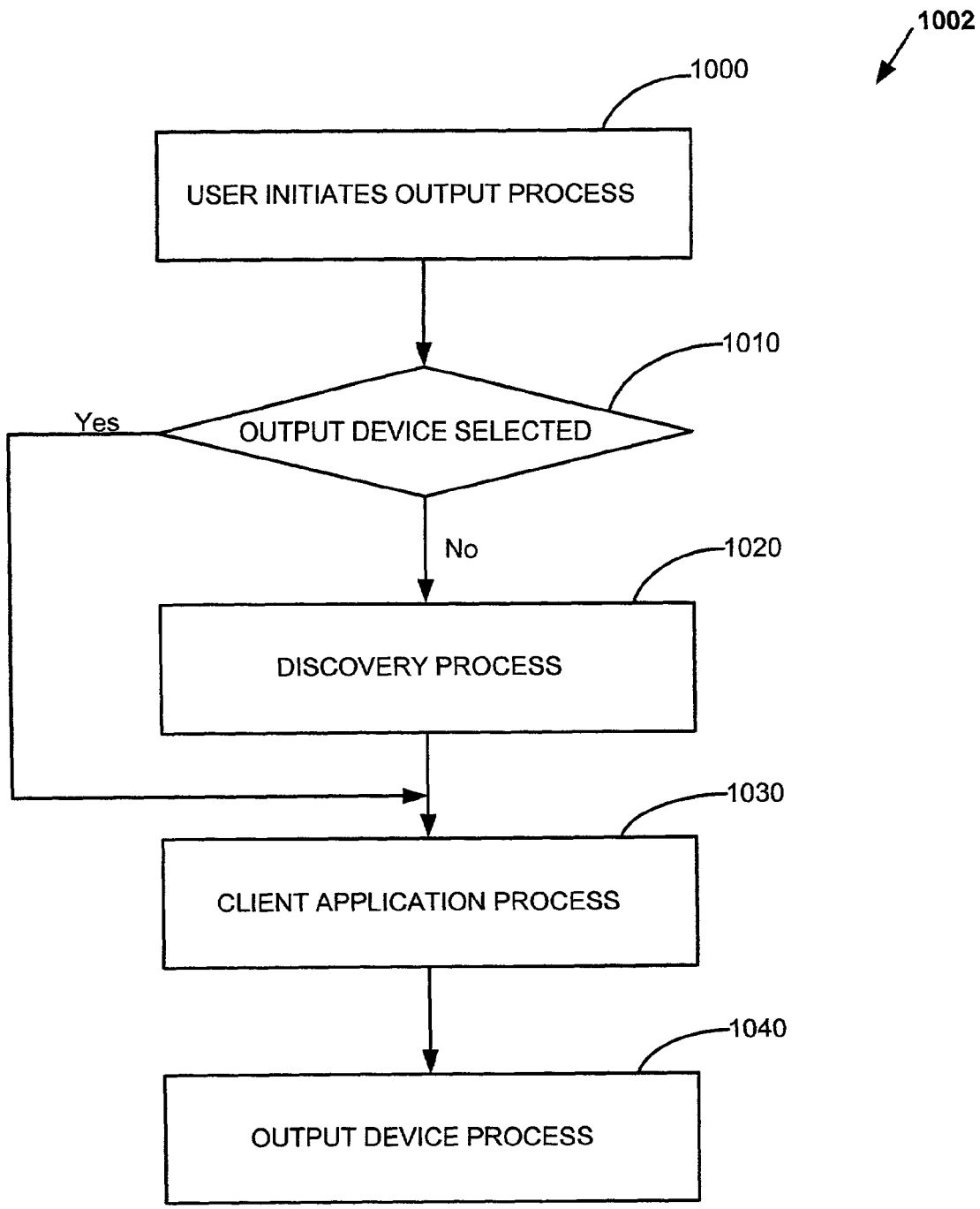
FIG. 10 is a block diagram of a universal data output method of the present invention with respect to the components, system and apparatus described with reference to FIG. 2.

FIG. 10 illustrates a flow diagram of a universal data output process of the present invention that includes the raster image processing illustrated with reference to FIG. 9. A universal data output process allows an information apparatus 200 to pervasively output content or digital document to an output device. The data output process may include or utilize:

A user interface component and operation where a user initiates an output process and provides an indication of the selected output content (e.g. digital document) for output.

A client application component or operation that processes the content indicated for output, and generates an intermediate output data. The intermediate output data may include at least partly a raster output image description related to the content.

An information apparatus component or operation that transmits the intermediate output data to one or more selected output device 220.

An output device component (e.g. output controller) or operation that interprets the intermediate output data and may further process or convert the output data into a form more acceptable to an output engine for rendering of the content.

With reference to FIG. 10, a user in step 1000 may initiate the universal output method or process 1002. Typically, a user initiates the output process by invoking a client application 210 in his/her information apparatus 200. The client application 210 may be launched as an independent application or it may be launched from other applications 205 (such as from a document browsing, creating or editing application) or as part of or component of or a feature of another application 205 residing in the same information apparatus 200. When launched from another application 205, such as the case when the client application is a device driver or helper application, the client application 210 may obtain information, such as the content (e.g. digital document) from that other application 205. This can be accomplished, for example, by one or combinations of messages or facilitated through an operating system or a particular object or component model etc.

During output process 1002, a user may need to select one or more output devices 220 for output service. An optional discovery process step 1020 may be implemented to help the user select an output device 220. During the discovery process step 1020, a user's information apparatus 200 may (1) search for available output devices 220; (2) provide the user with a list of available output devices 220; and (3) provide means for the user to choose one or more output devices 220 to take the output job. An example of a discovery process 1020 is described below in greater detail with reference to FIG. 11.

The optional discovery process 1020 may sometimes be unnecessary. For example, a user may skip the discovery process 1020 if he or she already knows the output device (e.g., printer) 220 to which the output is to be directed. In this case, the user may simply connect the information apparatus 200 to that output device 220 by wired connections or directly point to that output device 220 in a close proximity such as in the case of infrared connectivity. As another example, a user may pre-select or set the output device or devices 220 that are used frequently as preferred defaults. As a result, the discovery process 1020 may be partially or completely skipped if the default output device 220 or printer is found to be available.

In stage 1030, the client application may interact with output device 220, the user, and/or other applications 205 residing in the same information apparatus 200 to (1) obtain necessary output device profile and/or user preferences, (2) perform functions or part of raster image processing operations such as rasterization, scaling and color correction, and/or (3) convert or encode at least partially the rasterized content (e.g. digital document) into an intermediate output data. The processing and generation of the intermediate output data may reflect in part a relationship to an output device profile and/or user preferences obtained, if any. The intermediate output data generated by the client application 210 is then transmitted through wired or wireless local communication link(s) 240 to the output controller 230 included or associated with the selected output device 220 or output system 250. An exemplary client application process is described in greater detail with reference to FIG. 12.

In step 1040, the output controller 230 of present invention receives the intermediate output data. In the case where the selected output device 230 does not include a printer controller, the output controller 230 of present invention may further perform processing functions such as parsing, interpreting, decompressing, decoding, color correction, image enhancement, GCR, black generation and halftoning among others. In addition, the output controller 230 may further convert or conform the intermediate output data into a form or format suitable for the output engine (e.g. printer engine in the case of a printer). The generated output-engine output data from the output controller is therefore, in general, device dependent and acceptable for final output with the output engine (or the printer engine in case of a printer) included in the selected output device 220 or output system 250.

In the case where the selected output device 220 is a printer, and when the printer includes or is connected to a printer controller, the output controller 230 may generate the proper language or input format required to interface with the printer controller (referred to as printer-controller print data). The printer controller may for example require a specific input such as a page description language (PDL), markup language, or a special image or graphics format. In these cases, the output controller 230 in step 1040 may interpret and decode the intermediate output data, and then convert the intermediate output data into the required printer-controller print data (e.g. PDL such as PostScript or PCL). The printer-controller print data generated by the output controller is then sent to the printer controller for further processing. The printer controller may perform interpretation and raster image processing operations among other operations. After processing, the printer controller generates a printer-engine print data suitable for rendering at the printer engine.

Figure 13:
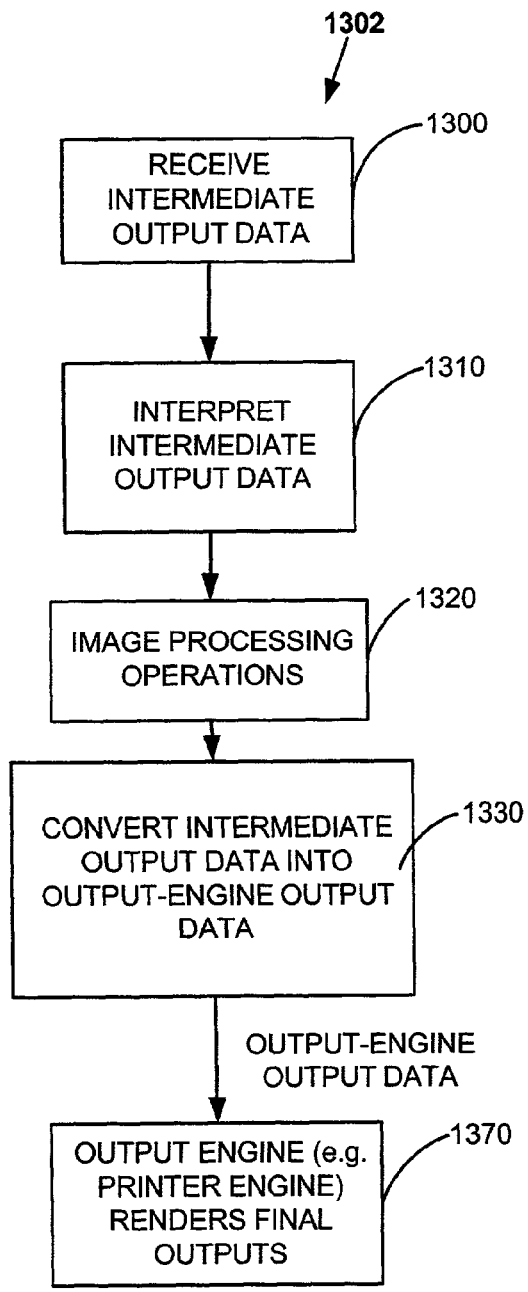
FIGS. 13A and 13B are flow diagrams of exemplary output device or output system process included in the output process of FIG. 10.
Figure 13:
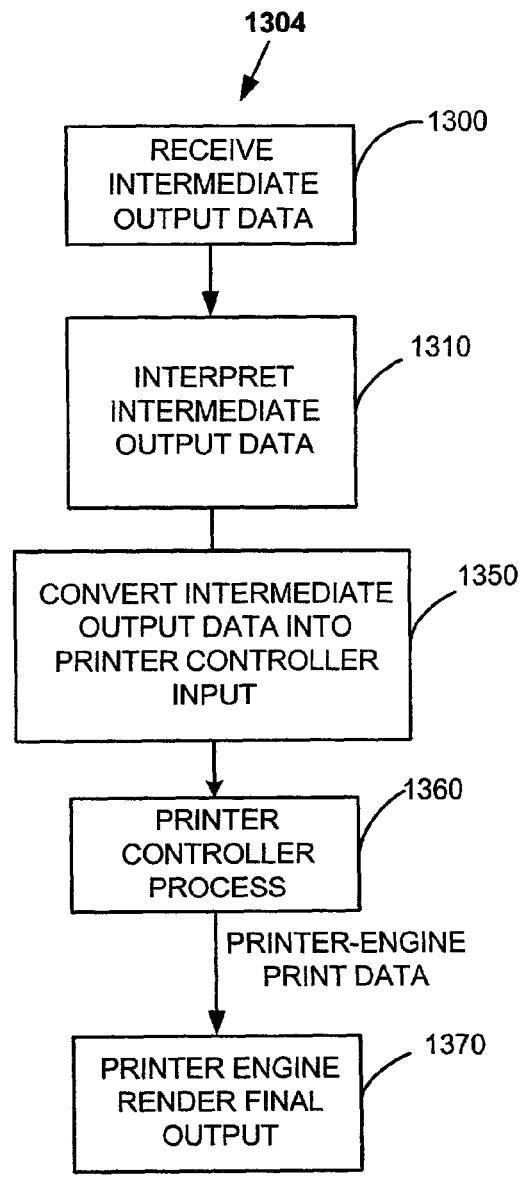

In either case, the output controller 230 or printer controller generates an output-engine output data that is suitable for sending to or interfacing with the output engine or the printer engine included in the output device for rendering. The output data may be temporarily buffered in components of the output device 220. An implementation of the output device process 1040 is described in greater detail with reference to FIG. 13.

The steps included in the universal pervasive output process 1002 may proceed automatically when a user requests output service. Alternatively, a user may be provided with options to proceed, cancel, or input information at each and every step. For example, a user may cancel the output service at any time by, for example, indicating a cancellation signal or command or by terminating the client application 210 or by shutting down the information apparatus 200 etc.

Figure 11:
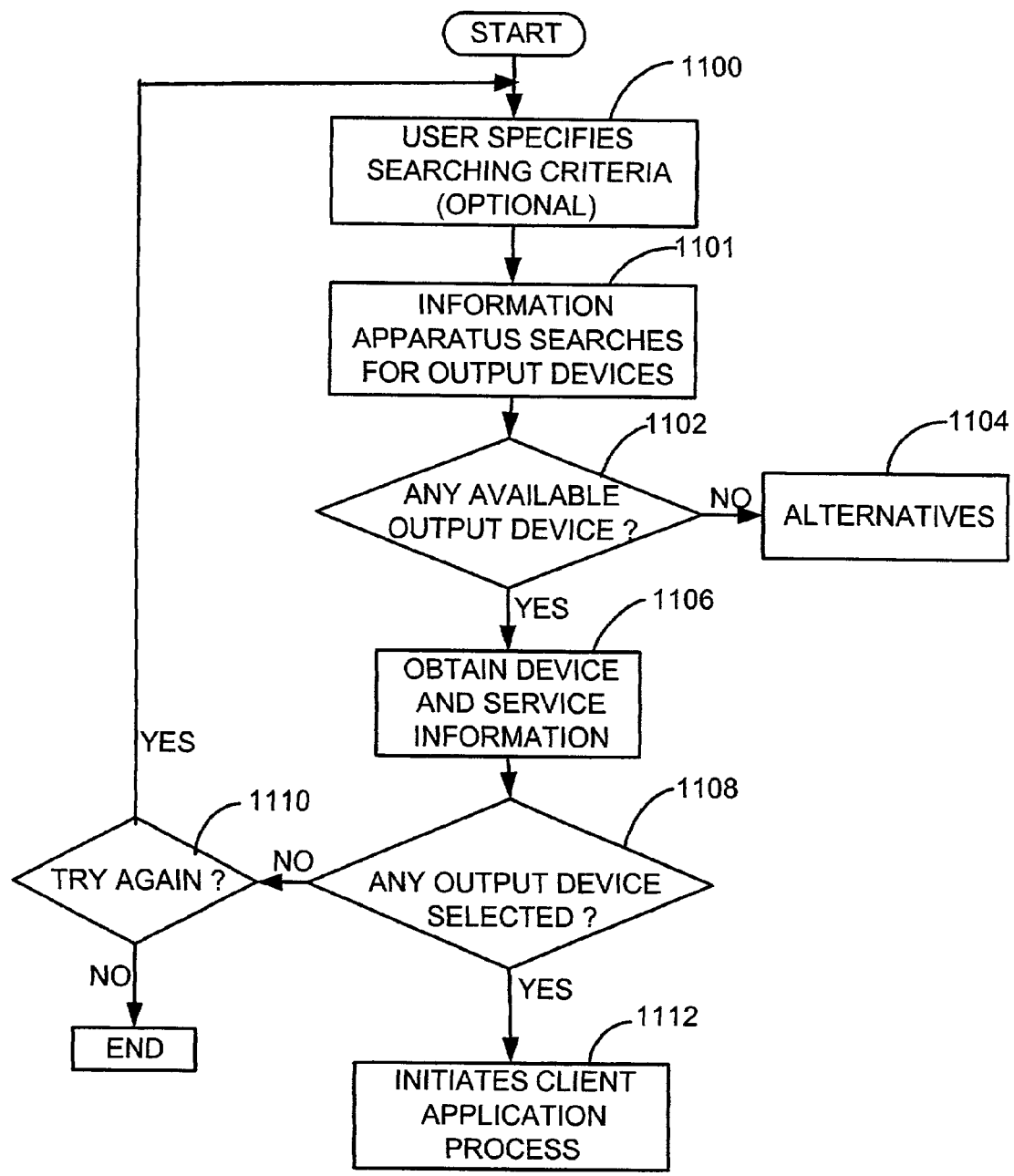
FIG. 11 is a flow diagram illustrating one way of implementing a discovery process optionally included in the output process of FIG. 10.

FIG. 11 is a flow diagram of an example of a discovery process 720, which may be an optional step to help a user locate one or more output devices 220 for an output job. The discovery process 1020 may, however, be skipped partially or entirely. Implementation of discovery process 1020 may require compatible hardware and software components residing in both the information apparatus 200 and the output device 220. The information apparatus 200 may utilize the client application 210 or other application 205 in this process. The discovery process 1020 may include:

An information apparatus 200 communicating with available output devices 220 to obtain information and attributes relating to the output device 220 and or its services such as output device capability, feature sets, service availability, quality of service, condition.

An Information apparatus 200 provides the user information on each available and or compatible output devices 220.

A user selects or the client application 210 (automatically or not) selects one or more output devices 220 for the output service from the available or compatible output devices 220.

Various protocols and or standards may be used during discovery process 1020. Wireless communication protocols are preferred. Wired communication, on the other hand, may also be implemented. Examples of applicable protocols or standards may include, without limitation, Bluetooth, HAVi, Jini, Salutation, Service Location Protocol, and Universal Plug-and-play among others. Both standard and proprietary protocols or combination may be implemented in the discovery process 1020. However, these different protocols, standards, or combination shall not depart from the spirit and scope of present invention.

In one implementation an application (referred here for simplicity of discussion as a "communication manager," not shown) residing in the information apparatus 200 helps communicate with output device 220 and manages service requests and the discovery process 1020. The communication manager may be a part of or a feature of the client application 210. Alternatively or in combination, the communication manager may also be a separate application. When the communication manager is a separate application, the client application 210 may have the ability to communicate, manage or access functionalities of the communication manager.

The discovery process 1020 may be initiated manually by a user or automatically by a communication manager when the user requests an output service with information apparatus 200.

In the optional step 1100, a user may specify searching or matching criteria. For example, a user may indicate to search for color printers and or printers that provide free service. The user may manually specify such criteria each time for the discovery process 1020. Alternatively or in combination, a user may set default preferences that can be applied to a plurality of discovery processes 1020. Sometimes, however, no searching criteria are required: the information apparatus 200 may simply search for all available output devices 220 that can provide output service.

In step 1101, information apparatus 200 searches for available output devices 220. The searching process may be implemented by, for example, an information apparatus 200 (e.g. with the assistance of a communication manager) multi-casting or broadcasting or advertising its service requests and waiting for available output devices 220 to respond. Alternatively or in combination, an information apparatus 200 may "listen to" service broadcasts from one or more output devices 220 and then identify the one or more output devices 220 that are needed or acceptable. It is also possible that multiple output devices 220 of the same network (e.g., LAN) register their services with a control point (not shown). A control point is a computing system (e.g., a server) that maintains records on all service devices within the same network. An information apparatus 200 may contact the control point and search or query for the needed services.

In step 1102, if no available output device 220 is found, the communication manager or the client application 210 may provide the user with alternatives 1104. Such alternatives may include, for example, aborting the discovery process 1020, trying discovery process 1020 again, temporarily halting the discovery process 1020, or being notified when an available output device 220 is found. As an example, the discovery process 1020 may not detect any available output device 220 in the current wired/wireless network. The specified searching criteria (if any) are then saved or registered in the communication manager. When the user enters a new network having available output devices 220, or when new compatible output devices 220 are added to the current network, or when an output device 220 becomes available for any reason, the communication manager may notify the user of such availability.

In step 1106, if available output devices 220 are discovered, the communication manager may obtain some basic information, or part of or the entire output device profile, from each discovered output device 220. Examples of such information may include, but not limited to, device identity, service charge, subscription, service feature, device capability, operating instructions, etc. Such information is preferably provided to the user through the user interface (e.g., display screen, speaker, etc.) of information apparatus 200.

In step 1108, the user may select one or more output devices 220 based on information provided, if any, to take the output job. If the user is not satisfied with any of the available output device 220, the user may decline the service. In this case, the user may be provided with alternatives such as to try again in step 1110 with some changes made to the searching criteria. The user may choose to terminate the service request at any time. In step 1112, with one or more output devices 220 selected or determined, the communication link between information apparatus 200 and the selected output device or devices 220 may be "locked". Other output devices 220 that are not selected may be dropped. The output process 1020 may then proceed to the client application process of step 1030 of FIG. 10.

FIG. 12A is a flow diagram of an exemplary client application process with reference to step 1030 of FIG. 10. A client application process 1202 for universal output may include or utilize:

A client application 210 that obtains content (e.g. digital document) intended for output.

A client application 210 that obtains output device parameters (e.g. rasterization parameters, output job parameters). One example of implementation is to obtain the output device parameters from an output device profile (e.g. printer profile), which includes device dependent parameters. Such profile may be stored in an output controller 230, output device 220 or information apparatus 200.

A client application 210 that may optionally obtain user preferences through (1) user's input (automatic or manual) or selections or (2) based on preset preference or pre-defined defaults or (3) combination of the above.

A client application 210 that rasterizes at least part of the content intended for output (e.g. a digital document) according to one or more rasterization parameters obtained from previous steps such as through output device profile, user selection, predefined user preferences, predefined default or standard etc.

A client application 210 that generates an intermediate output data containing at least part of the rasterized image related at least partly to the content intended for output.

A client application that transmits the intermediate output data to an output device 220 or output controller 230 for further processing and or final output.

A client application 210 may obtain content (e.g. digital document) 900 or a pointer or reference to the content in many ways. In a preferred embodiment, the client application 210 is in the form of a device driver or an independent application, and the content or its reference can be obtained by the client application 210 from other applications 205 in the same information apparatus 200. To illustrate an example, a user may first view or download or create a digital document by using a document browsing, viewing and or editing application 205 in his/her information apparatus 200, and then request output service by launching the client application 210 as a device driver or helper application. The client application 210 communicates with the document browsing or editing application to obtain the digital document or reference to the digital document. As another example, the client application 210 is an independent application and it launches another application to help locate and obtain the digital document for output. In this case, a user may first launch the client application 210, and then invoke another application 205(e.g. document editing and or browsing application) residing in the same information apparatus 200 to view or download a digital document. The client application 210 then communicates with the document browsing or editing application to obtain the digital document for output.

In another embodiment, the client application 210 itself provides multiple functionalities or feature sets including the ability for a user to select the content (e.g. digital document) for output. For example, the client application 210 of present invention may provide a GUI where a user can directly input or select the reference or path of a digital document that the user wants to output.

In order to perform rasterization operation on content (e.g. digital document) 900, the client application 210 in step 1210 needs to obtain device dependent parameters of an output device 220 such as the rasterization parameters. Device dependent parameters may be included in an output device profile. A client application 210 may obtain an output device profile or rasterization parameters in various ways. As an example, an output device profile or rasterization parameters can be obtained with one or combination of the following:

- The client application communicates with an output device 220 to upload output device profile or information related to one or more rasterization parameters.
- The client application 210 obtains the output device profile from a network node (e.g. server).
- A user selects an output device profile stored in the user's information apparatus 200.
- The client application 210 automatically retrieves or uses a default profile, predefined standard values or default values among others.
- The client application 210 obtains output device parameters by calculating, which may include approximation, based at least partly on the information it has obtained from one or combination of an output device 220, a user, default values, and a network node.

It is important to note that step 1210 is an optional step. In some instance, part of or the entire output device profile or related device dependent information may have been already obtained by the client application 210 during the prior optional discovery process (step 1020 in FIG. 10). In this case, step 1210 may be partially or entirely skipped.

In one implementation, the client application 210 communicates with one or more output devices 220 to upload output device profiles stored in the memory or storage components of those one or more output devices 220 or their associated one or more output controllers 230. In some instance, the uploaded output device profile may contain partially or entirely references or pointers to device parameters instead of the device parameters themselves. The actual output device parameters may be stored in a network node or in the information apparatus 200, where they can be retrieved by the client application 210 or by other applications 205 using the references or pointers. It should be noted that a plurality of information apparatuses 200 may request to obtain output device profile or profiles from the same output device 220 at the same time or at least during overlapping periods. The output device 220 or its associated output controller 230 may have components or systems to manage multiple communication links and provide the output device profile or profiles concurrently or in an alternating manner to multiple information apparatuses 200. Alternatively, an output device 220 may provide components or systems to queue the requests from different information apparatuses 200 and serve them in a sequential fashion according to a scheme such as first come first served, quality of service, etc. Multi-user communication and service management capability with or without queuing or spooling functions may be implemented by, for example, the output controller 230 as optional feature sets.

In another implementation, one or more output device profiles may be stored locally in the information apparatus 200. The client application 210 may provide a GUI where a user can select a profile from a list of pre-stored profiles. As an example, the GUI may provide the user with a list of output device names (e.g. makes and models), each corresponding to an output device profile stored locally. When the user selects an output device 220, the client application 210 can then retrieve the output device profile corresponding to the name selected by the user.

In certain cases, during a discovery or communication process described earlier, the client application 210 may have already obtained the output device ID, name, or reference or other information in a variety of ways described previously. In this case, the client application 210 may automatically activate or retrieve an output device profile stored in the information apparatus 200 based on the output device ID, name, or reference obtained without user intervention.

In yet another implementation, the client application 210 may use a set of pre-defined default values stored locally in a user's information apparatus 200. Such defaults can be stored in one or more files or tables. The client application 210 may access a file or table to obtain these default values. The client application 210 may also create or calculate certain default values based on the information it has obtained during previous steps (e.g. in optional discovery process, based on partial or incomplete printer profile information obtained, etc). A user may or may not have an opportunity to change or overwrite some or all defaults.

Finally, if, for any reason, no device dependent information is available, the client application 210 may use standard output and rasterization parameters or pre-defined default parameters. The above illustrates many examples and variations of implementation, these and other possible variations in implementation do not depart from the scope of the present invention.

In step 1220, the client application 210 may optionally obtain user preferences. In one exemplary implementation, the client application 210 may obtain user preferences with a GUI (graphical user interface). For simplicity, a standard GUI form can be presented to the user independent of the make and model of the output device 220 involved in the output process. Through such an interface, the user may specify some device independent output parameters such as page range, number of cards per page, number of copies, etc. Alternatively or in combination, the client application 210 may also incorporate output device-dependent features and preferences into the GUI presented to the user. The device-dependent portion of the GUI may be supported partly or entirely by information contained in the output device profile obtained through components and processes described in previous steps. To illustrate, device dependent features and capabilities may include print quality, color or grayscale, duplex or single sided, output page size among others.

It is preferred that some or all components, attributes or fields of user preferences have default values. Part or all default values may be hard-coded in software program in client application 210 or in hardware components. Alternatively, the client application 210 may also access a file to obtain default values, or it may calculate certain default values based on the information it has obtained during previous steps or components (e.g. from an output device profile). A user may or may not have the ability to pre-configure, or change or overwrite some or all defaults. The client application 210 may obtain and use some or all defaults with or without user intervention or knowledge.

In step 1230, the client application 210 of present invention performs rasterization operation to conform a content (e.g. a digital document), which may includes objects and information in vector graphics, text, and images, into one or more output images in accordance with the rasterization parameters obtained in previous steps. During rasterization process, text and vector graphics object or information in the content is rasterized or converted into image or bitmap form according to the given set of rasterization parameters. Image information in the content may require scaling and interpolation operations to conform the rasterization parameters. Rasterization process may further include operations such as scaling, interpolation, segmentation, image transformation, image encoding, color space transformation etc. to fit or conform the one or more output images to the given set of rasterization parameters such as target output size, resolution, bit depth, color space and image format etc.

In step 1240, the client application 210 generates an intermediate output data that includes the rasterized one or more output images. The intermediate output data of the present invention may contain image information, instructions, descriptions, and data such as color profile among others. Creating and generating intermediate output data may further include operations such as compression, encoding, encryption, smoothing, segmentation, scaling and or color correction, among others. The image or images contained in an intermediate output data may be variously encoded and/or implemented with different image formats and/or compression methods (e.g. JPEG, BMP, TIFF, JBIG etc or combination). One preferred implementation is to generate or encode the output image in the intermediate output data with mixed raster content (MRC) description. The use of MRC in the data output process of present invention provides opportunities to improve the compression ratio by applying different compression techniques to segmented elements in the content. In addition, MRC provides opportunities to maintain more original content information during the encoding process of the output image and, therefore, potentially improve output quality.

In step 1250, the client application 210 transmits intermediate output data to an output device 220 through local communication link 240. The communication link may be implemented with wired or wireless technologies and the transmission may include one or multiple sessions.

It should be recognized that FIG. 12A illustrates one example of a client application process 1030 in the data output method 1002 of present invention. Other implementations with more or less steps are possible, and several additional optional processes not shown in FIG. 12 may also be included in the client application process 1030. Use of these different variations, however, does not result in a departure from the scope of the present invention. As an example, an optional authentication step may be included when the selected output device 220 provides service to a restricted group of users. Various authentication procedures may be added in step 1210 when client application 210 obtains output device profile by communicating with an output device or an output controller. As another example, authentication procedures may also be implemented in step 1250 when the client application transmits intermediate output data to one or more output devices 220 or output controllers 230. A simple authentication may be implemented by, for example, comparing the identity of an information apparatus 200 with an approved control list of identities stored in the output device 220 or output controller 230. Other more complex authentication and encryption schemes may also be used. Information such as user name, password, ID number, signatures, security keys (physical or digital), biometrics, fingerprints, voice among others, may be used separately or in combination as authentication means. Such identification and or authentication information may be manually provided by user or automatically detected by the selected output device or devices 220 or output controller 230. With successful authentication, a user may gain access to all or part of the services provided by the output device 220. The output device profile that the client application 210 obtains may vary according to the type or quality of service requested or determined. If authentication fails, it is possible that a user may be denied partially or completely access to the service. In this case, the user may be provided with alternatives such as selecting another output device 220 or alternative services.

Another optional process is that a user may be asked to provide payment or deposit or escrow before, during or after output service such as step 1210 or 1250 with reference to FIG. 12. Examples of payment or deposit may include cash, credit card, bankcard, charge card, smart card, electronic cash, among others. The output controller 220 may provide payment calculation or transaction processing as optional feature sets of present invention.

FIG. 12B illustrates another exemplary client application output process 1030 with which an information apparatus 200 can pervasively and universally output content to one or more output devices 220 associated with or equipped with an output controller 230 of present invention.

The process illustrated in FIG. 12B is similar to the process described in FIG. 12A except that step 1210, obtaining output device profile, is skipped. In this embodiment, the client application 210 utilizes a set of hard-coded, standard or predefined output device parameters including rasterization parameters with which the client application 210 can perform rasterization operation and other required image processing functions. Users may be provided with the option of changing these parameters or inputting alternative parameters. Rasterization parameters include output size, output resolution, bit depth, color space, color channels, scale factors etc. These pre-defined parameters typically comply with a specification or a standard. The same specification and standard may also defined or describe at least partly the intermediate output data. Predefined standard parameters can be stored in a file or profile in an information apparatus 200, an output controller 230, and/or in an output device 220 for easy update or upgrade.

In client output process 1204, since the rasterization parameters are predefined, the client application 210 may not need to upload printer profiles from the selected output device 230. Consequently, no two-way communication between the information apparatus 200 and the output device or devices 220 is necessary in this process 1204 when compared with process 1202 illustrated in FIG. 12A. The client application 210 performs rasterization operation 1225 based on standard and/or predefined parameters and generates a rasterized output image with predefined or standard properties of those rasterization parameters. The resulting intermediate output data, which includes at least one rasterized output image, is transmitted from the information apparatus 200 to an output device 220 in step 1250 or to its associated output controller 230 for rendering or output. The intermediate output data generated in process 1202 in general is less device dependent compared to the intermediate output data generated in the process 1202 shown in FIG. 12A. The output controller 230 included or associated with the output device 220 may be preprogrammed to interpret the raster output image, which includes properties or attributes that correspond to those standard or predefined parameters.

The standard or predefined rasterization parameters may be hard coded or programmed into the client application 210 and/or the output controller 230. However, instead of hard coding those parameters, one technique to facilitate updates or changes is to store those standard parameters in a default file or profile. The standard or predefined parameters contained in the file or profile can be retrieved and utilized by applications in an information apparatus 200 (e.g. client application 210) and/or by applications or components in an output device 220 or the output controller 230. In this way, any necessary updates, upgrades or required changes to those predefined or standard parameters can be easily accomplished by replacing or modifying the file or profile instead of modifying or updating the program, application or components in the information apparatus 200, output device 220 and/or output controller 230.

A client application process 1204 providing universal output capability to information apparatus 200 may include or utilize:
 A client application 210 that obtains content (e.g. digital document) intended for output.
 A client application 210 that optionally obtains user preferences (in step 1220) through (1) user's input (automatic or manual) or selections or (2) based on preset preference or predefined defaults or (3) combination of the above.
 A client application 210 that rasterizes content (in step 1230 or 1225) according to pre-defined or standard rasterization parameters.
 A client application 210 that generates intermediate output data (in step 1240) for rendering or output at an output device 220; the intermediate output data containing at least partially a rasterized image related to the content intended for output.
 A client application 210 that transmits the intermediate output data to an output device 220 (in step 1250) for further processing and final output.

One advantage of the client output process 1204 of FIG. 12B compared to the process 1202 illustrated in FIG. 12A is that the generated intermediate output data is in general less device dependent. The device independent attribute allows the intermediate output data to be more portable and acceptable to more output devices equipped or associated with output controllers. Both data output processes (1202 and 1204) enable universal output; allowing a user to install a single client application 210 or components in an information apparatus 200 to provide output capability to more than one output device 220.

FIG. 13A illustrates one example of an output device process 1302 and its associated raster imaging method of present invention. In this output device process 1302, an output device 220 is capable of receiving an intermediate output data from an information apparatus 200. The output device process 1302 and its operations may include or utilize:
 An output device/system or output controller that receives intermediate output data (in step 1300). The intermediate output data includes at least partially a raster output image describing at least part of the content for rendering at the output device 220 or system 250.
 An output device/system or output controller that interprets (in step 1310) the intermediate output data; in one preferred embodiment, the intermediate output data includes an output image utilizing one or more MRC formats or components.
 An output device/system or output controller that performs image processing operation (in step 1320) on the raster image. The image processing operation may include but not limited to image decompression, scaling, halftoning, color matching, among others.
 An output device/system or output controller that converts and or generates (in step 1330) output-engine output data that is in a format or description suitable for input to an output engine (e.g. printer engine in case of a printer) included in an output device 220.
 An output engine in an output device 220 that renders or generates a final output (e.g. the output-engine output data) in step 1370.

The output device 220 or output system 250 may include an output controller 230 internally or externally to assist the management and operation of the output process 1302. As shown in FIG. 7, there are many possible configurations and implementations of an output controller 230 associated to an output device 220 Herein and after, output controller 230 is regarded as an integral part of the output device to which it is attached. Hence, the following described output device operations may be partially or completely performed by the output controller associated with it.

In step 1300, output device process 1302 is initiated by client application 210 transmitting an intermediate output data to output device 220 or output system 250. In step 1310, the output device 220 reads and interprets the intermediate output data, containing at least one raster output image relating to the content intended for output. During the reading and interpretation process 1310, the output device 220 may include components that parse the intermediate output data and perform operations such as decompression, decoding, and decryption among others. The output image may be variously encoded and may include one or more compression methods.

In the event that the method of image encoding includes MRC format, then, in one example implementation, during decoding and mapping of the output image in step 1310, the lower resolution layer and information in an image that includes MRC may be mapped, scaled or interpolated to a higher-resolution output image to produce a better image quality. Therefore, step 1310, in the event that the intermediate output data includes MRC component, each layer in an MRC image can be decompressed, processed, mapped and combined into a single combined output image layer. Step 1310 may also include scaling, color space transformation, and/or interpolation among others. In addition to the possibility of mapping methods using different scaling and interpolation ratio with different layers, another advantage of using MRC is that segmentation information contained in MRC can be utilized to apply different image processing and enhancement techniques to data in different layers of an MRC image in step 1320.

In step 1320, the output device 220 may further perform image processing operations on the decoded output image. These image processing operations may include, for example, color correction, color matching, image segmentation, image enhancement, anti-aliasing, image smoothing, digital watermarking, scaling, interpolation, and halftoning among others. The image processing operations 1320 may be combined or operated concurrently with step 1310. For example, while each row, pixel, or portion of the image is being decoded and or decompressed, image processing operations 1320 is applied. In another implementation, the image processing 1320 may occur after the entire output image or a large portion of the image has been decoded or decompressed.

If the intermediate output data includes MRC component, then in step 1320, there are additional opportunities to improve image quality. An image encoded in MRC contains segmented information that a traditional single layer image format does not usually have. As an example, foreground can be in one layer, and background in another. As another example, chrominance information may be in one layer and luminance may be in another. This segmented information in MRC may be used to apply different or selective image processing methods and algorithms to different layers or segments to enhance image quality or retain or recover image information. Different image processing techniques or algorithms may include color matching, color correction, black generation, halftoning, scaling, interpolation, anti-aliasing, smoothing, digital watermarking etc. For example, one can apply calorimetric color matching to foreground information and perceptual color matching to background information or vice versa. As another example, error diffusion halftoning can be applied to foreground and stochastic halftoning can be applied to background or vice versa. As yet another example, bi-cubic interpolation can be applied to a layer and bi-linear or minimum distance interpolation can be applied to a different layer.

In step 1330, the output device 220 or the output controller 230 may convert the processed image (e.g. halftoned) into a form acceptable to the output engine of output device 220. This conversion step is optional, depending on the type, format and input requirement of a particular output device engine (e.g. printer engine in case of a printer). Different output engines may have different input raster image input requirements. As an example different output engines may require different input image formats, number of bits or bytes per pixel, compression or uncompressed form, or different color spaces (e.g. such as RGB, CMY, CMYK, or any combination of Hi-Fi color such as green, orange, purple, red etc). Incoming raster image data can be encoded in a row, in a column, in multiple rows, in multiple columns, in a chunk, in a segment, or a combination at a time for sending the raster data to the output engine. In some cases, step 1330 may be skipped if the result of step 1320 is already in a form acceptable to the output device engine. In other cases, however, further conversion and or processing may be required to satisfy the specific input requirement of a particular output device engine.

It is important to note that the above described processing from step 1310 to step 1330 may require one or more memory buffers to temporarily store processed results. The memory buffer can store or hold a row, a column, a portion, or a chunk, of the output image in any of the steps described above. Storing and retrieving information into and from the memory buffer may be done sequentially, in an alternating fashion, or in an interlaced or interleaved fashion among other possible combinations. Step 1310 to step 1330 operations can be partially or completely implemented with the output controller 230.

In step 1370, the output device engine included in the output device 220 or output system 250 receives the output-engine output data generated in step 1330 or step 1320. The output-engine output data is in a form that satisfies the input requirements and attributes of the output engine, such as color space, color channel, bit depth, output size, resolution, etc. The output engine then takes this output-engine output data and outputs or renders the data content through its marking engine or display engine.

One advantage of data output method 1002 that includes output device process 1302 is that it has less processing requirements on an information apparatus 200 compared to conventional process with reference to FIG. 1A, and therefore, enables more information apparatus 200 with relatively lower processing power and memory space to have output capability.

For example, some image processing functions, such as halftoning (e.g. error diffusion) may require substantial processing and computing power. In data output process 1002 that includes output device process 1302, halftoning is performed in step 1320 by an output device component (e.g. the output controller 230) included in the output device 220 or the output system 250, not in the information apparatus 200; therefore reducing the computational requirements for the information apparatus 200. Another advantage of data output 1302 is that the intermediate output data is less device dependent than the output data generated by conventional output method 102 with reference to FIG. 1A. The device independence provides opportunity to allow a single driver or application in an information apparatus 200 to output intermediate output data to a plurality of output devices 220 that include output controllers 230.

Some output devices 220 may contain a printer controller 410. An example of this type of output device or printer is a PostScript printer or PCL printer among others. FIG. 13B illustrates an example of an output device process 1304 with a printer that includes a printer controller 410. As discussed in FIG. 1, a printer with a printer controller requires input such as page description language (e.g. PostScript, PCL etc.), markup language (HTML, XML etc), special image format, special graphics format, or a combination, depending on the type of the printer controller.

There are many printing system configurations for providing the data output capability and process to a printer or a printing system that includes a printer controller. In one example, the existing printer controller in the output device 220 may incorporate the feature sets provided by the output controller to form a "combined controller" as described previously with reference to FIGS. 7C and 7F. In another example, the output controller 230 of present invention may be connected sequentially or cascaded to an existing printer controller; the output controller 230 can be internally installed (with reference to FIG. 7B) or externally connected (with reference to FIG. 7A) to the output device 220. For output device 220 that includes a printer controller, the output controller 230 may simply decode the intermediate output data in step 1310 and then convert it into a form acceptable for input to the printer controller in step 1350.

An output device process 1304 and operations for an output device 220 or system 250 that includes a printer controller 410 may include or utilize:

An output controller 230 or components in an output device 220 or system 250 that receives an intermediate print data or output data (with reference to step 1300), the intermediate print data includes at least a raster image related at least in part to the content for rendering at the output device 220.

An output controller 230 or components in an output device 220 or system 250 that interprets the intermediate output data (with reference to step 1310); in one preferred embodiment, the intermediate output data includes an output image utilizing one or more MRC format or components.

An output controller 230 or components in an output device 220 or system 250 that converts the intermediate output data into a printer-controller print data (with reference to step 1350); the printer-controller print data includes a format or language (e.g. PDL, PDF, HTML, XML etc.) that is acceptable or compatible to the input requirement of a printer controller.

A printer controller or components in an output device 220 or system 250 that receives a printer controller print data; the printer controller may parse, interpret and further process (e.g. rasterization, scaling, image enhancement, color correction, color matching, halftoning etc.) and convert the printer-controller print data into a printer-engine print data (with reference to step 1360); the printer-engine print data comprising of a format or description acceptable for input to a printer engine in the output device 220 or the output system 250.

A printer engine or components in an output device 220 or system 250 that renders or generates a final output (with reference to step 1370) with the input printer engine print data.

In output device process 1304, step 1300 (receiving intermediate output data) and step 1310 (interpret intermediate output data) are identical to step 1300 and step 1310 in output device process 1302, which have been described in previous sections with reference to FIG. 13A.

In step 1350, the output controller 230 converts the intermediate print data into a printer-controller print data that is in a form compatible or acceptable for input to a printer controller. For example, a printer controller may require as input a specific page description language (PDL) such as PostScript. The output controller 230 then creates a PostScript file and embeds the output image generated or retrieved in step 1310 into the PostScript file. The output controller 230 can also create and embed the output image from step 1310 into other printer controller print data formats, instructions or languages.

In step 1360, the printer controller receives printer-controller print data generated in step 1350 that includes an acceptable input language or format to the printer controller. The printer controller may parse, interpret, and decode the input printer-controller print data. The printer controller may further perform raster image processing operations such as rasterization, color correction, black generation, GCR, anti-aliasing, scaling, image enhancement, and halftoning among others on the output image. The printer controller may then generate a printer-engine print data that is suitable for input to the printer engine. The type and or format of printer-engine print data may vary according to the requirement of a particular printer engine.

It is important to note that the above described process from step 1310 to step 1360 may require one or more memory buffer to temporarily store processed results. The memory buffer can store or hold a row, a column, a portion, or a chunk, of the output image in any of the steps described above. Storing and retrieving information into and from the memory buffer may be done sequentially, alternated, or in an interlaced or interleaved fashion among other possible combinations. Process and operations of step 1310 to step 1360 can be implemented with output controller 230.

In step 1370, the printer engine included in the output device 220 or output system 250 generates or renders the final output based on the printer-engine print data generated in step 1360. For example, the printer-engine print data may be in CMY, CMYK, and RGB etc, and this may be in one or more bits per pixel format, satisfying the size and resolution requirement of the printer engine. The printer engine included the output device 220 may take this print data and generate or render an output page through its marking engine.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope of the following claims and equivalents thereto.

Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. Specifically, but without limitation, a reference in a claim to an or one output device or system, to an or one image, or to a or one rasterization parameter is not intended to exclude from the scope of the claim a structure or method having, including, employing or supplying two or more output devices or system, images or rasterization parameters.

The invention claimed is:

1. A mobile wireless information apparatus method for managing output of digital content at a wireless output device, the mobile wireless information apparatus including:
    an operating system;
    a processor;
    one or more client application(s) executable by the processor at the mobile wireless information apparatus for providing one or more functionalities to the mobile wireless information apparatus, the one or more functionalities of the one or more client application(s) facilitated, at least partly, by the operating system included in the mobile wireless information apparatus, and the one or more client application(s) enabling a user viewing or selecting at least part of the digital content at the mobile wireless information apparatus;
    a display screen;
    a graphical user interface over the display screen of the mobile wireless information apparatus for interacting with the user;
    one or more wireless communication units for wireless communication;
the mobile wireless information apparatus method comprising:
    obtaining, by the one or more client application(s) at the mobile wireless information apparatus, the digital content, the digital content includes at least one of video content or audio content;
    (1) opening a short range wireless communication channel at the one or more wireless communication units of the mobile wireless information apparatus for short range wireless device communication;

(2) wirelessly searching, at the mobile wireless information apparatus, over said short range wireless communication channel in (1), for one or more wireless output devices that are available for providing output service;

(3) receiving, at the mobile wireless information apparatus and over the short range wireless communication channel, a device dependent attribute that corresponds to a wireless output device found in the wireless search in (2) over the short range wireless communication channel, and the device dependent attribute includes at least one of a name, a brand, a model, a device identity, an address, a voice, security information, or a device profile, individually or in any combination, corresponding to the wireless output device found in the wireless search;

(4) receiving an indication of a selection, over the graphical user interface at the mobile wireless information apparatus, the wireless output device found in the wireless search, and the selection of the wireless output device found in the wireless search based, at least in part, on the device dependent attribute received in (3);

(5) establishing, with at least one wireless communication unit of the one or more wireless communication units and at the mobile wireless information apparatus, a wireless communication link between the mobile wireless information apparatus and the selected wireless output device in (4), the wireless communication link being compatible, at least partly, with at least one protocol within IEEE 802.11 wireless standards or within Bluetooth standards;

(6) encoding output data, at the mobile wireless information apparatus, the output data being related to at least part of the digital content obtained by the one or more client application(s) and the digital content includes at least one of video content or audio content, and the output data including one or more of a published standard, a proprietary standard, a format, a protocol, or a language, individually or in any combination, that is acceptable for wireless transmitting to the selected wireless output device; and (7) wirelessly transmitting, from the mobile wireless information apparatus, at least part of the encoded output data in (6) over the established wireless communication link in (5) to the selected wireless output device for rendering or outputting at least part of the digital content at the selected wireless output device; and wherein the mobile wireless information apparatus is at least one of a laptop computer, a digital camera, an e-book, a smart phone, or an information pad, and the selected wireless output device is at least one of an audio output device, a speaker, a projection device, a display device, a television, or a controller box connected to a television, individually or in any combination, and the mobile wireless information apparatus is a distinct device from the selected wireless output device.

2. The method according to claim 1, wherein the wireless communication link is compatible with at least part of IEEE 802.11 wireless standards for wireless local area network communications and the establishing of the wireless communication link is over a wireless local area network from the mobile wireless information apparatus to the selected wireless output device, and the establishing of the wireless communication link further includes implementing a security procedure with one or more of a user name, a password, an ID number, a security key, a biometric, a fingerprint, or a voice, individually or in any combination.

3. A wireless information apparatus that includes a wireless rendering procedure for transferring digital content from the wireless information apparatus to a wireless output device by wireless communication that is compatible, at least partly, with at least one protocol within IEEE 802.11 wireless standards or within Bluetooth standards, the digital content being stored locally at the wireless information apparatus, or being accessible, at least partly, by the wireless information apparatus, or being downloadable from a server over a network to the wireless information apparatus, and the wireless information apparatus including:

a wireless communication unit supporting short range wireless communication with one or more wireless devices, the one or more wireless devices being distinct devices from the wireless information apparatus, a display screen, a graphical user interface for interacting with a user over the display screen, an operating system, a processor, one or more client applications executable at the wireless information apparatus for providing one or more functionalities to the wireless information apparatus, the one or more functionalities of the one or more client applications facilitated at least partly by the operating system included in the wireless information apparatus, and wherein the wireless information apparatus being configured for or operable for:

receiving, by the one or more client applications running at the wireless information apparatus and over the graphical user interface of the wireless information apparatus, at least an indication related to a selected digital content for rendering, the selected digital content being video digital content or audio digital content, individually or in any combination;

wirelessly discovering a wireless output device over a short range wireless communication channel via the wireless communication unit of the wireless information apparatus, the discovered wireless output device is a distinct device from the wireless information apparatus;

obtaining, at the wireless information apparatus over the short range wireless communication channel, at least an indication related to the discovered wireless output device, the at least an indication including at least one of a name, a brand, a model, security information, a device identity, an address, a voice, and a device profile, individually or in any combination, related to the discovered wireless output device;

selecting, at the wireless information apparatus, the discovered wireless output device based, at least in part, on the at least an indication related to the discovered wireless output device obtained;

implementing, at the wireless information apparatus, a security or an authentication procedure for establishing a restricted wireless connection between the wireless information apparatus and the selected wireless output device;

conforming output data, at the wireless information apparatus, the output data being related to at least part of the selected digital content, and the output data including one or more of a published standard, a proprietary standard, a format, a protocol, or a language, individually or in any combination, that is acceptable for wireless transferring to the selected wireless output device over the restricted wireless connection; and wirelessly transferring at least part of the output data over the restricted wireless connection from the wireless information apparatus to the selected wireless output device for wireless rendering at the selected wireless output device the at least part of the selected digital content, the restricted wireless connection is compatible, at least partly, with at least one protocol within IEEE 802.11 wireless standards or within Bluetooth standards.

4. The apparatus according to claim 3 in which said security or authentication procedure comprises at least one of a direct short range close proximity radio wireless communication, a name, a password, an ID number, signatures, security keys (physical or digital), biometrics, fingerprints, a voice, identification information, or authentication information, individually or in any combination; and wherein the security or authentication procedure includes (1) an input from a user, or (2) automatically detected by the selected wireless output device, individually or in any combination.

5. The apparatus according to claim 3 in which the security or authentication procedure further comprising obtaining a security key, the obtaining of said security key comprises at least one of: (1) inputting by the user, or (2) retrieving a key that was store in the wireless information apparatus, or (3) automatically detecting by the wireless information apparatus or by the wireless output device.

6. The apparatus according to claim 3 in which the selected wireless output device is at least one of an output controller externally connectable, by wired or wireless connection, to a display device, a projection device, a television, a monitor, or an audio output device, individually or in any combination.

7. The apparatus according to claim 4 in which the wireless information apparatus is a smart phone and wherein the smart phone is further operable for opening a short range wireless communication channel at the wireless communication unit of the wireless information apparatus for wirelessly searching a wireless output device, the short range wireless communication channel is a short range wireless communication based on close proximity to the wireless output device.

8. The method according to claim 1 in which the short range wireless communication channel is compatible with at least part of a protocol within:
  (1) IEEE 802.11 wireless protocol standards for establishing a direct short range wireless device connection between the mobile wireless information apparatus and the wireless output device; or
  (2) Bluetooth specifications; and
wherein the mobile wireless information apparatus method further comprises:
  obtaining, by the mobile wireless information apparatus, authentication information that includes one or more of a security key, a name, an ID, a voice, a fingerprint, or a password, individually or in any combination; and
  utilizing the obtained authentication information to establish a restricted wireless communication link between the mobile wireless information apparatus and the selected wireless output device.

9. The method of claim 1 in which conforming at the mobile wireless information apparatus at least part of the digital content into an output data includes using as least in part the said device dependent attribute received over the wireless communication channel from the selected wireless output device.

10. The method according to claim 1 wherein the encoding of the output data related to at least part of the digital content includes at least one of an encryption operation or a decryption operation.

11. The method of claim 1 in which the device profile includes information relating to at least one of quality of service, billing, pricing, security, identification and compatibility associated with the wireless output device.

12. The apparatus according to claim 7 wherein the wireless information apparatus is able to wirelessly transfer at least part of the selected digital content from the wireless information apparatus to the selected wireless output device without depending on synchronizing the selected digital content with a conventional personal computer (PC) that is a distinct device from the wireless information apparatus and the selected wireless output device.

13. The apparatus according to claim 12 wherein the wireless information apparatus is further configured for or operable for:
  obtaining, at the mobile wireless information apparatus over the short range wireless communication channel, at least one attribute that corresponds to the discovered wireless output device found in the wireless search; and
  the conforming of the output data includes using, at least in part, the at least one attribute obtained over the short range wireless communication channel.

14. The apparatus according to claim 3 in which the wireless communication between the wireless information apparatus and the selected wireless output device includes the wireless information apparatus wirelessly communicating via a wireless output controller that is either: (1) internally included in the selected wireless output device, or (2) externally connected to the selected wireless output device via a wired connection or a wireless connection.

15. The apparatus according to claim 7 in which the wireless communication unit is further compatible, at least partly, with part of IEEE 802.11 wireless standards for accessing wireless local area network for establishing the restricted wireless connection between the wireless information apparatus and the wireless output device over a wireless local area network, and wherein implementing the security or the authentication procedure includes automatically providing to the selected wireless output device one or more of a user name, a password, a voice, a fingerprint, an ID number, a security key, individually or in any combination.

16. The apparatus according to claim 3 in which the selected wireless output device is one or more of a television, an audio output device, a display device, a projection device, a monitor, or an output controller connectable to a television, individually or in any combination.

17. A wireless information apparatus configured for wireless displaying or playing of digital content at an output device by wireless communication with a wireless output controller device that is wire connected to the output device, the wireless information apparatus including:
  a display screen,
  a graphical user interface over the display screen of the wireless information apparatus for interacting with a user,
  an operating system,
  a processor,
  one or more wireless communication units with at least one wireless communication unit supporting wireless communication that is compatible, at least partly, with at least one protocol within IEEE 802.11 wireless standards or within Bluetooth standards for wireless communication with the wireless output controller device, the wireless information apparatus being operable for:

opening, via the one or more wireless communication units of the wireless information apparatus, a wireless communication channel for wireless communication with a wireless output controller device, the wireless communication channel being a short range wireless communication from the wireless information apparatus to the wireless output controller device, the wireless output controller device being a distinct device from the wireless information apparatus, and the wireless output controller device is wire connected to the output device;

wirelessly searching, at the wireless information apparatus over the wireless communication channel, for the wireless output controller device that is available within short range for wireless communication with the wireless information apparatus;

receiving, at the wireless information apparatus over a short range wireless communication, at least an attribute from the wireless output controller device found in the wireless search, and the at least an attribute being at least one of a name, a brand, a model, security information, a device identity, an address, a voice, authentication information, or a device profile, individually or in any combination;

establishing a wireless connection between the wireless information apparatus and the wireless output controller device subsequent to receiving, at the wireless information apparatus, the at least an attribute from the wireless output controller device, the wireless connection being via the at least one wireless communication unit supporting wireless communication that is compatible, at least partly, with at least one protocol within IEEE 802.11 wireless standards or within Bluetooth standards;

encoding, at the wireless information apparatus, output data related to at least part of the digital content that includes at least one of audio content or video content, individually or in any combination, the output data including one or more of a published standard, a proprietary standard, a format, a protocol, or a language, individually or in any combination, that is acceptable for wireless transmitting to the wireless output controller device over the wireless connection; and wirelessly transmitting, via the at least one wireless communication unit, at least part of the encoded output data over the established wireless connection from the wireless information apparatus to the wireless output controller device for rendering or outputting of at least part of the digital content at the output device; and wherein, the output device is at least one of a television, a projection device, a display device, a speaker, or an audio output device, individually or in any combination, and both the wireless output controller device and the output device are distinct devices from the wireless information apparatus.

18. The method according to claim 17 in which the mobile wireless information apparatus includes at least one of a desktop computer, a laptop computers a networked computer, a hand-held computer, an Internet enabled mobile phone, a smart phone, an Internet appliance, and an Internet pad, individually or in any combination.

19. The apparatus according to claim 18 in which the wireless output controller device is included internally in the output device.

20. The apparatus according to claim 18 in which the output device is a television, and the wireless output controller device is either : (1) connectable externally to the television via a wired connection, or (2) included internally in the television.

21. The method according to claim 17 in which the mobile wireless information apparatus further includes a memory component and a mobile operation system and the audio and video content is stored locally in the memory component of the mobile wireless information apparatus and the client accesses the digital audio or video content locally for sending to the wireless output device over the wireless communication channel, the access of the audio or video content facilitated at least partly by the mobile operation system in the mobile wireless information apparatus.

22. The method according to claim 17, further comprising:

obtaining a security key;
sending the security key over the wireless communication channel for authentication;
receiving over the wireless communication channel at least an indication related to a successful security key authentication; and
utilizing the authenticated security key to establish restricted wireless access to the selected wireless output device.

23. A non-transitory computer readable storage medium containing software that is executable, at least partly, by a processor at a mobile information apparatus for managing wireless output of digital content at a wireless output device by wireless communication, the wireless communication from the mobile information apparatus to the wireless output device being compatible, at least partly, with at least one protocol within IEEE 802.11 wireless standards or within Bluetooth standards, and the wireless output device being a distinct device from the mobile information apparatus, and the mobile information apparatus including:

wireless communication circuitry that includes at least a wireless communication unit for wireless communication,
a display screen,
a processor,
an operating system, and
the software when executed, at least partly, by the processor and facilitated, at least partly, by the operating system, performs a method at the mobile information apparatus, comprising:

wirelessly searching, with the wireless communication unit and over a short range wireless communication channel, for a wireless output device that is available for establishing wireless communication with the mobile information apparatus;

receiving, at the mobile information apparatus and over the short range wireless communication channel, an attribute corresponding to the wireless output device found in the wireless search, the attribute being at least one of a name, a brand, a model, security information, a device identity, an address, or a device profile, individually or in any combination;

selecting, at the mobile information apparatus, the wireless output device found in the search based, at least in part, on the attribute received over the short range wireless communication channel;

implementing an authentication procedure or a security procedure for establishing a wireless connection between the mobile information apparatus and the selected wireless output device;

establishing, subsequent to implementing the authentication procedure or the security procedure, the wireless connection between the mobile information apparatus and the selected wireless output device, the establishing of the wireless connection is via the wireless communication circuitry that is compatible, at least partly, with at least one protocol within IEEE 802.11 wireless standards or within Bluetooth standards;

obtaining, by the mobile information apparatus, at least part of the digital content, the digital content includes at least one of audio content or video content, individually or in any combination, and the digital content is stored locally at the mobile information apparatus or is downloaded, at least partly, from a server over the Internet to the mobile information apparatus;

conforming, at the mobile information apparatus, at least part of the digital content into output data, the output data related to at least part of the digital content and including one or more of a published standard, a proprietary standard, a format, a protocol, or a language, individually or in any combination, that is acceptable for wireless transmitting to the selected wireless output device; and wirelessly transmitting, via the wireless communication circuitry, at least part of the output data over the wireless connection from the mobile information apparatus to the selected wireless output device for output or rendering of at least part of the digital content, the digital content includes at least one of audio content or video content, individually or in any combination; and wherein the selected wireless output device is at least one of the following: an audio output device, a display device, a projection device, a television, or an output controller connectable to a television, individually or in any combination.

24. The non-transitory computer readable storage medium according to claim 23, wherein wirelessly searching for a wireless output device includes one or more searching criteria, the one or more searching criteria including one or more of searching for the one or more wireless output devices: (1) that can provide wireless output service, or (1) based on close proximity of the one or more wireless output devices to the mobile information apparatus; and wherein each wireless output device found in the wireless search satisfying, at least partly, the one or more searching criteria.

25. The non-transitory computer readable storage medium according to claim 23 in which the establishing of the wireless connection includes establishing at least one of the following, individually or in any combination:

(1) a direct wireless communication compatible with at least part of IEEE 802.11 wireless standards or Bluetooth standards from the mobile information apparatus to the selected wireless output device; or (2) a wireless local area network connection operable by the mobile information apparatus for accessing a wireless local area network that is compatible, at least in part, with part of IEEE 802.11 wireless standards.

26. The non-transitory computer readable storage medium according to claim 23 in which implementing the authentication procedure or the security procedure includes obtaining authentication information or security information that includes one or more of a security key, a name, an ID, a voice, or a password, individually or in any combination, and the obtaining of the authentication information or security information being either one of (1) an input received from a user, or (2) automatically detected by the mobile information apparatus or by the selected wireless output device.

27. A non-transitory computer readable medium containing software that is executable by a wireless information apparatus for outputting digital content from a wireless information apparatus to a wireless output controller device associated with a television or an audio output device, the wireless information apparatus including:

a display screen, a graphical user interface over the display screen of the wireless information apparatus for interacting with a user, an operating system, a processor, one or more wireless communication units with at least one wireless communication unit supporting wireless local area network communication with the wireless output controller device, the wireless output controller device being a distinct device from the wireless information apparatus, wherein the software, when executed, at least partly, by the processor at the wireless information apparatus and facilitated, at least partly, by the operating system, causes the wireless information apparatus to execute a method, comprising:

establishing, via the one or more wireless communication units, a wireless connection between the wireless information apparatus and the wireless output controller device that is associated with a television or an audio output device, the wireless connection further being compatible, at least partly, with at least one protocol within IEEE 802.11 wireless standards or within Bluetooth standards;

implementing a security or authentication procedure that includes transmitting one or more of a user name, a password, an ID number, a security key, or a voice, individually or in any combination, over the wireless connection between the wireless information apparatus and the wireless output controller device; and subsequent to having implemented the security or authentication procedure, establishing a wireless local area network connection, between the wireless information apparatus and the wireless output controller device, the wireless local area network connection being established via the at least one wireless communication unit that is compatible, at least partly, with at least one protocol within IEEE 802.11 wireless standards for wireless local area networks;

receiving, over the graphical user interface of the wireless information apparatus, at least an indication related to a selected digital content for rendering or outputting, the selected digital content includes at least one of audio content or video content, individually or in any combination; and wirelessly transferring output data related, at least partly, to the selected digital content and over the established wireless local area network connection from the wireless information apparatus to the wireless output controller device for rendering or outputting of at least part of the selected digital content at a television or an audio output device that is associated with the wireless output controller device.

28. The medium according to claim 27 in which the wireless information apparatus is embodied at least as one of a laptop computer, a networked computer, a hand-held computer, an Internet enabled mobile phone, a smart phone, an Internet appliance, a digital camera, an e-book, or an information pad, individually or in any combination; and wherein the establishing of the wireless connection further includes a short range wireless communication based on close proximity of the wireless information apparatus to the wireless output controller device.

29. The medium according to claim 27 in which the wireless output controller device is associated with a television and is included internally in the television.

30. The medium according to claim 28 wherein the wireless output controller device is connectable externally to a television or an audio output device either via at least one of a wired connection interface or a wireless connection.

31. The medium according to claim 27 wherein the wireless connection is a direct wireless communication compatible, at least partly, with at least one protocol within IEEE 802.11 wireless standards or within Bluetooth specifications, and wherein prior to establishing the wireless communication connection, the wireless information apparatus further implements a device discovering operation, via the one or more wireless communication units at the wireless information apparatus, to wirelessly discover the wireless output controller device.

32. A mobile information apparatus configured for managing wireless output of digital content at a selected wireless output device, the mobile information apparatus including:
one or more wireless communication units for wireless communication;
a display screen;
a graphical user interface over the display screen of the mobile information apparatus for interacting with a user;
a processor;
an operating system; and
one or more client applications that is executable by the processor at the mobile information apparatus and facilitated, at least partly, by the operating system, for providing one or more functionalities to the mobile information apparatus;
a wireless device discovery component, via the one or more wireless communication units, for wirelessly discovering a wireless output device that is within short range or close proximity to the mobile information apparatus and that is available for providing output service;
an authentication or security processing component for implementing an authentication procedure or security procedure, the authentication procedure or security procedure for establishing a secure wireless connection between the mobile information apparatus and the discovered wireless output device, the secure wireless connection being compatible, at least partly, with at least one protocol within Bluetooth or within IEEE 802.11 wireless standards;
an output data generation component, for processing at least part of the digital content into output data that is acceptable for wireless transferring to the discovered wireless output device;
a wireless transport component for wireless transferring, via the one or more wireless communication units and from the mobile information apparatus to the discovered wireless output device, at least part of the output data; and wherein, subsequent to establishing the secure wireless connection from the mobile information apparatus to the discovered wireless output device, the one or more client applications installed at the mobile information apparatus are operable for:
receiving, over the graphical user interface of the mobile information apparatus, at least an indication related to a selected digital content for rendering or outputting at the discovered wireless output device, the selected digital content includes at least one of audio content or video content, individually or in any combination;
using the output data generation component for processing at least part of the selected digital content into output data that is acceptable for transferring over the secure wireless connection to the discovered wireless output device, the output data conforms, at least partly, to one or more of a published standard, a proprietary standard, a format, a protocol, or a language, individually or in any combination;
using the transport component for wireless transferring at least part of the output data over the established secure wireless connection from the mobile information apparatus to the discovered wireless output device for output or rendering of at least part of the selected digital content; and
wherein the discovered wireless output device is a distinct device from the mobile information apparatus and the discovered wireless output device is at least one of the following: a television, a wireless output controller connectable to a television, a projection device, a display device, or an audio output device, individually or in any combination.

33. The apparatus according to claim 32 in which the mobile information apparatus is embodied at least as one of a smart phone, an Internet appliance, a digital camera, an e-book, or an information pad, individually or in any combination; and wherein the one or more one or more client applications at the mobile information apparatus is further operable for:
providing, over the graphical user interface, a list of one or more discovered wireless output devices that have been previously wirelessly discovered by the wireless device discovering component; and
receiving at least an indication of a selected wireless output device from the list of one or more discovered wireless output devices provided over the graphical user interface, and
wherein, in the establishing of the secure wireless connection between the mobile information apparatus and the discovered wireless output device, the discovered wireless output device is the selected wireless output device.

34. The apparatus according to claim 33 in which the establishing of the secure wireless connection includes at least one of the following, individually or in any combination:
(1) a direct wireless communication compatible, at least partly, with IEEE 802.11 wireless standards, the direct wireless communication is directly from the mobile information apparatus to the discovered wireless output device; or
(2) a wireless local area network compatible, at least partly, with IEEE 802.11 wireless standards, and the establishing of the secure wireless connection includes the mobile information apparatus accessing a wireless local area network.

35. The apparatus according to claim 34 in which the authentication procedure or security procedure includes at least one of an identification number, a name, a password, a voice, a fingerprint, or a short range close proximity direct wireless communication.

36. A non-transitory computer readable recording medium containing software that is executable for managing wireless output of digital content from a mobile information apparatus to one or more wireless output devices by wireless communication, the one or more wireless output devices being distinct devices from the mobile information apparatus, the digital content including at least one of audio content or video content, individually or in any combination, and the mobile information apparatus including:

wireless communication circuitry for wireless communication;

a display screen;

a graphical user interface over the display screen of the mobile information apparatus for interacting with a user;

a processor;

an operating system; and wherein the software when executed, at least partly, by the processor at the mobile information apparatus, performs a digital content output method that comprises:

opening a wireless communication channel, with the wireless communication circuitry at the mobile information apparatus, for wireless communication;

wirelessly discovering, with the wireless communication circuitry and over the wireless communication channel, a wireless output device that is available for establishing wireless communication with the mobile information apparatus;

implementing, at the mobile information apparatus, an authentication procedure or a security procedure for establishing wireless communication between the mobile information apparatus and the wireless output device that has been wirelessly discovered, the authentication procedure or the security procedure includes obtaining one or more of a user name, a password, an ID number, a security key, a biometric, a fingerprint, or voice, individually or in any combination;

establishing, via the wireless communication circuitry, a wireless communication connection between the mobile information apparatus and the wireless output device subsequent to having successfully implemented the authentication procedure or the security procedure, the wireless communication connection from the mobile information apparatus to the wireless output device being compatible, at least partly, with at least one protocol within IEEE 802.11 wireless standards or within Bluetooth standards;

receiving, over the graphical user interface of the mobile information apparatus, at least an indication related to a selected digital content that includes at least one of audio content or video content, individually or in any combination, for rendering at the wireless output device;

wirelessly transmitting, via the wireless communication circuitry, at least part of output data that is related to at least part of the selected digital content, over the wireless communication connection from the mobile information apparatus to the wireless output device for output or rendering of at least part of the selected digital content that includes at least one of audio content or video content, individually or in any combination; and wherein the wireless output device is at least one of a television, a display device, an audio output device, or a wireless output controller connectable to a television or display device, individually or in any combination, and the wireless communication connection is compatible, at least partly, with at least one protocol within IEEE 802.11 wireless standards or within Bluetooth standards.

37. The non-transitory computer readable storage medium according to claim 36, wherein wirelessly discovering the wireless output device includes one or more searching criteria, the one or more searching criteria including one or more of searching for one or more wireless output devices: (1) that can provide wireless output service, or (2) based on close proximity of the one or more wireless output devices to the mobile information apparatus; and wherein each wireless output device found in the wireless search satisfying, at least partly, the one or more searching criteria.

38. The non-transitory computer readable storage medium according to claim 36 in which the opening of the wireless communication channel includes: (1) a direct wireless communication compatible with at least part of IEEE 802.11 wireless standards, or (2) a wireless communication compatible with at least part of Bluetooth standards.

39. The non-transitory computer readable storage medium according to claim 38 in which the establishing of the wireless communication connection includes the mobile information apparatus accessing a wireless local area network that is compatible, at least in part, with part of IEEE 802.11 wireless standards.

40. The non-transitory computer readable storage medium according to claim 36 in which implementing the authentication procedure or the security procedure includes obtaining, by the mobile information apparatus or by the wireless output device, one or more of a user name, a password, an ID number, a security key, or voice, individually or in any combination.

* * * * *

UNITED STATES PATENT AND TRADEMARK OFFICE
CERTIFICATE OF CORRECTION

| | | |
|---|---|---|
| PATENT NO. | : 9,836,257 B2 | Page 1 of 4 |
| APPLICATION NO. | : 10/053765 | |
| DATED | : December 5, 2017 | |
| INVENTOR(S) | : William Ho Chang and Christina Ying Liu | |

It is certified that error appears in the above-identified patent and that said Letters Patent is hereby corrected as shown below:

On the Title Page

The Abstract (57), delete:
"A method of transferring digital content from a mobile wireless information apparatus such as a smart phone, an information Pad, or a digital Pad to a wireless output device associated with a television by short range wireless communication. The method may include downloading video digital content from the Internet to the mobile wireless information apparatus and may open a short range wireless communication that is compatible with IEEE802.11 or with Bluetooth.TM. standard for output. The method may select a wireless output device associated with the television. Subsequently, the information apparatus may conform the digital content into an output data for transferring the output data over the short range wireless connection to the selected wireless output device associated with the television for output.";
And insert:
--Mobile apparatus that includes functions for wireless displaying, streaming, or playing of digital content over air to output devices (e.g., televisions, television controllers, audio devices, speakers) are herein disclosed and enabled. The wireless connection may be compatible with a protocol within IEEE 802.11 standards and/or Bluetooth specifications, including using a direct wireless connection, or an intelligent wireless display, or a wireless local area network. The mobile apparatus may wirelessly search and discover output devices for establishing a wireless connection, and/or encode, conform, or compress at least part of the digital content into output data for wireless transfer of at least part of the digital content to an output device. The mobile apparatus includes laptops, smart phones, digital cameras, e-books, Internet appliances, or Information Pads, and may also include software applications that facilitate wireless display, stream, control, share, or playing of digital content at the output device over air.--.

In the Claims

In Column 42, Line 42, delete "an operating system" and insert --operating system software--; Line 49, after "operating system" insert --software--; Line 67, delete "at" and insert --using--.

Signed and Sealed this
Twenty-second Day of May, 2018

Andrei Iancu
*Director of the United States Patent and Trademark Office*

CERTIFICATE OF CORRECTION (continued)
U.S. Pat. No. 9,836,257 B2

In Column 43, Line 24, delete "with" and insert --using--; Line 26, delete "and at" and insert --of--; Line 31, after "within" insert --Bluetooth specifications or--; Lines 31-32, delete "or within Bluetooth standards"; Line 36, after "application(s)" insert --,--; Line 52, after "pad," insert --individually or in any combination,--.

In Column 44, Line 1, delete "with" and insert --that includes--; Line 7, delete "that" and insert --, the wireless communication--; Line 9, delete "standards" and insert --specifications--; Line 23, delete "an" and after "system" insert --software--; Line 29, after "facilitated" insert --,--; Line 29, after "partly" insert --,--; Line 30, after "system" insert --software--; Line 51, delete "and" and insert --or--; Line 59, delete "an".

In Column 45, Line 3, after "the" insert --established--; Lines 4-5, after "over the" insert --established--; Line 9, after "content," insert --and wherein--; Line 9, after "the" insert --established--; Line 12, delete "standards" and insert --specifications--; Line 26, delete "the" and insert --a--; Line 27, delete "store" and insert --stored--; Line 29, after "device" insert --, individually or in any combination--; Line 32, after "wired" insert --connection--; Line 38, delete "a" and insert --the--; Line 60, after "establish" insert --the wireless communication link, the wireless communication link is--.

In Column 45, Lines 63-65 and Column 46, Lines 1-3, delete:
"9. The method of claim 1 in which conforming at the mobile wireless information apparatus at least part of the digital content into an output data includes using as least in part the said device dependent attribute received over the wireless communication channel from the selected wireless output device.";
And insert:
--9. The method according to claim 1 in which encoding of the output data at the mobile wireless information apparatus is related, at least in part, to the device dependent attribute received over the short range wireless communication channel from the selected wireless output device.--.

In Column 46, Line 7, after "operation" insert --, individually or in any combination--.

In Column 46, Lines 8-11, delete:
"11. The method of claim 1 in which the device profile includes information relating to at least one of quality of service, billing, pricing, security, identification and compatibility associated with the wireless output device.";
And insert:
--11. The method according to claim 1 in which the wireless searching for one or more wireless output devices over the short range wireless communication channel is based on close proximity of the mobile wireless information apparatus to the one or more wireless output devices.--.

In Column 46, Line 23, delete "mobile"; Line 34, after "either" insert --one of--; Line 45, delete "the"; Line 58, after "connected" insert --or is connectable--; Line 64, delete "an" and after "system" insert --software--.

CERTIFICATE OF CORRECTION (continued)
U.S. Pat. No. 9,836,257 B2

In Column 47, Line 3, after "Bluetooth", delete "standards" and insert --specifications--; Line 10, after "with", delete "a" and insert --the--; Line 40, delete "standards" and insert --specifications--; Line 49, after "device", insert --or the output device--; Line 63, delete "method" and insert --apparatus--; Line 63, delete "mobile"; Line 64, delete "includes" and insert --is embodied--; Line 64, after "at least" insert --as--; Lines 65-66, delete "desktop computer, a laptop computers a networked computer, a hand-held computer, an Internet enabled mobile".

In Column 48, Line 1, delete the first word "phone,"; Lines 1 and 2, delete "and an Internet pad"; Line 1, after "appliance," insert --an e-book, a digital camera, or an information pad--; Line 8, after "either" insert --one of--.

In Column 48, Lines 11-20, delete:
"21. The method according to claim 17 in which the mobile wireless information apparatus further includes a memory component and a mobile operation system and the audio and video content is stored locally in the memory component of the mobile wireless information apparatus and the client accesses the digital audio or video content locally for sending to the wireless output device over the wireless communication channel, the access of the audio or video content facilitated at least partly by the mobile operation system in the mobile wireless information apparatus.";
And insert:
--21. The apparatus according to claim 17 wherein the establishing of the wireless connection includes accessing a wireless local area network that is compatible, at least in part, with part of IEEE 802.11 wireless standards for wireless local area networks; and
    wherein the short range wireless communication is at least one of the following, individually or in any combination:
    (1) a direct wireless communication that is compatible with at least part of IEEE 802.11 wireless standards from the wireless information apparatus to the wireless output controller device, or
    (2) a wireless communication that is compatible with at least part of Bluetooth specifications, or
    (3) a short range, close proximity wireless communication.--.

In Column 48, Lines 21-31, delete:
"22. The method according to claim 17, further comprising:
    obtaining a security key;
    sending the security key over the wireless communication channel for authentication;
    receiving over the wireless communication channel at least an indication related to a successful security key authentication; and
    utilizing the authenticated security key to establish restricted wireless access to the selected wireless output device.";
And insert:
--22. The apparatus according to claim 17 in which, prior to establishing the wireless connection, the wireless information apparatus is further operable for:
    obtaining, either by receiving an input from the user manually or by detecting automatically, security or authentication information that includes one or more of a user name, a password, an ID number, a security key, a biometric, a fingerprint, or a voice, individually or in any combination; and

CERTIFICATE OF CORRECTION (continued)
U.S. Pat. No. 9,836,257 B2 utilizing the security or authentication information obtained to establish the wireless connection between the wireless information apparatus and the wireless output controller device or the output device.--.

In Column 48, Line 40, delete "standards" and insert --specifications--; Line 48, delete "an"; Line 48, after "system" insert --software;--; Line 48, delete ","; Line 49, insert --wherein-- before "the software"; Line 51, after "system" insert --software--.

In Column 49, Line 6, delete "selected"; Line 14, after "Bluetooth", delete "standards" and insert --specifications--; Line 20, delete "downloaded" and insert --obtained--; Line 47, replace the second "(1)" with --(2)--; Line 58, delete "standards" and insert --specifications--; Line 59, delete "selected".

In Column 50, Line 6, delete "selected"; Line 18, delete "an"; Line 18, after "system" insert --software--; Line 28, after "system" insert --software--; Line 36, after "within" insert --Bluetooth specifications or within--; Lines 36-37, delete "or within Bluetooth standards".

In Column 51, Line 17, after "wireless connection" insert --interface--; Line 38, delete "an"; Line 38, after "system" insert --software--; Line 41, after "system" insert --software--; Line 57, after "Bluetooth" insert --specifications--; Line 59, delete ",".

In Column 52, Line 21, delete "established"; Line 22, after "connection" insert --established--; Line 42, after "by" insert --using--; Line 58, after "with" insert --Bluetooth specifications or with--.

In Column 53, Line 5, after "communication" insert --, individually or in any combination--; Line 23, delete "an" and after "system" insert --software--; Line 27, delete "with" and insert --using--; Line 53, delete "standards" and insert --specifications--.

In Column 54, Line 8, after "circuitry," delete "at least part of"; Line 10, after "connection" insert --established--; Line 22, delete "standards" and insert --specifications--; Line 35, after "includes" insert --at least one of--; Line 38, delete "standards" and insert --specifications--.

(12) INTER PARTES REVIEW CERTIFICATE (3388th)

United States Patent
Chang et al.

(10) Number: US 9,836,257 K1
(45) Certificate Issued: Jan. 25, 2024

(54) MOBILE INFORMATION APPARATUS THAT INCLUDES INTELLIGENT WIRELESS DISPLAY, WIRELESS DIRECT DISPLAY, OR TRANSFER OF DIGITAL CONTENT FOR PLAYING OVER AIR THE DIGITAL CONTENT AT SMART TELEVISIONS, TELEVISION CONTROLLERS, OR AUDIO OUTPUT DEVICES

(75) Inventors: William Ho Chang; Christina Ying Liu

(73) Assignee: FLEXIWORLD TECHNOLOGIES, INC.

Trial Number:

IPR2022-00775 filed Apr. 8, 2022

Inter Partes Review Certificate for:

Patent No.: 9,836,257
Issued: Dec. 5, 2017
Appl. No.: 10/053,765
Filed: Jan. 18, 2002

The results of IPR2022-00775 are reflected in this inter partes review certificate under 35 U.S.C. 318(b).

INTER PARTES REVIEW CERTIFICATE
U.S. Patent 9,836,257 K1
Trial No. IPR2022-00775
Certificate Issued Jan. 25, 2024

AS A RESULT OF THE INTER PARTES REVIEW PROCEEDING, IT HAS BEEN DETERMINED THAT:

Claims 27 and 28 are found patentable.

\* \* \* \* \*